(12) United States Patent   (10) Patent No.: US 8,300,935 B2
Distante et al.   (45) Date of Patent: Oct. 30, 2012

(54) METHOD AND SYSTEM FOR THE DETECTION AND THE CLASSIFICATION OF EVENTS DURING MOTION ACTIONS

(75) Inventors: Arcangelo Distante, Bari (IT); Massimiliano Nitti, Bitritto Ba (IT); Tiziana Rita D'Orazio, Bari (IT); Marco Leo, Bari (IT); Ettore Stella, Bari (IT); Nicola Mosca, Bari (IT); Paolo Spagnolo, Bari (IT)

(73) Assignees: Federazione Italiana Giuoco Calcio, Rome (IT); Consiglio Nazionale Delle Ricerche, Rome (IT)

( * ) Notice: Subject to any disclaimer, the term of this patent is extended or adjusted under 35 U.S.C. 154(b) by 1170 days.

(21) Appl. No.: 11/918,775

(22) PCT Filed: Apr. 19, 2006

(86) PCT No.: PCT/IB2006/051209
§ 371 (c)(1),
(2), (4) Date: Oct. 18, 2007

(87) PCT Pub. No.: WO2006/111928
PCT Pub. Date: Oct. 26, 2006

(65) Prior Publication Data
US 2009/0060352 A1 Mar. 5, 2009

(30) Foreign Application Priority Data
Apr. 20, 2005 (IT) .............................. RM2005A0192

(51) Int. Cl.
*G06K 9/34* (2006.01)
*G06K 9/00* (2006.01)
*G06K 9/46* (2006.01)
*G06K 9/62* (2006.01)

(52) U.S. Cl. ........ 382/173; 382/103; 382/180; 382/190; 382/224; 382/225

(58) Field of Classification Search .................. 382/157, 382/190, 224, 103, 180
See application file for complete search history.

(56) References Cited

U.S. PATENT DOCUMENTS

| | | | |
|---|---|---|---|
| 6,625,310 B2* | 9/2003 | Lipton et al. | 382/173 |
| 6,721,454 B1* | 4/2004 | Qian et al. | 382/224 |
| 2004/0125877 A1* | 7/2004 | Chang et al. | 375/240.28 |
| 2005/0169529 A1* | 8/2005 | Owechko et al. | 382/190 |

OTHER PUBLICATIONS

Xu, M. et al., "Architecture and algorithms for tracking football players with multiple cameras," IEE Proceedings Vision, Image & Signal Processing, vol. 152, Issue 2, pp. 232-241, Apr. 8, 2005.*

(Continued)

*Primary Examiner* — Anand Bhatnagar
*Assistant Examiner* — Soo Park
(74) *Attorney, Agent, or Firm* — Nixon & Vanderhye P.C.

(57) ABSTRACT

The present invention relates to a system for detecting and classifying events during motion actions, in particular "offside" event in the football game. The system allows determining such event in a real-time and semi-automatic context, by taking into account the variability of the environmental conditions and of the dynamics of the events which can be traced back to the offside. The present invention proposes itself with a not-invasive technique, compatible with the usual course of the match.

37 Claims, 29 Drawing Sheets

OTHER PUBLICATIONS

Assfalg, J. et al., "Semantic annotation of soccer videos: Automatic highlights identification," Computer Vision Image Understanding 92, 2-3, pp. 285-385, 2003.*

Xu, L. et al., "Segmentation and tracking of multiple moving objects for intelligent video analysis," BT Technology Journal, vol. 22, No. 3, Jul. 2004.*

Xie, L., et al., "Structure analysis of soccer video with domain knowledge and hidden Markov models," Pattern Recognition Letters, vol. 25, No. 7, pp. 767-775, May 2004.*

Agouris, P. et al., "Differentiating and modeling multiple moving objects in motion imagery datasets," International Archives of the Photogrammetry, Remote Sensing and Spatial Information Sciences, vol. 34, 2002.*

* cited by examiner

FIG. 6A frame aquired at time t
FIG. 6B frame aquired at time t+0.16s
FIG. 6C frame aquired at time t+0.33s
FIG. 6D frame aquired at time t+0.5s
FIG. 6E frame aquired at time t+0.66s
FIG. 6F frame aquired at time t+0.83s Image Wavelet decomposition layout Image Wavelet decomposition until level 3

METHOD AND SYSTEM FOR THE DETECTION AND THE CLASSIFICATION OF EVENTS DURING MOTION ACTIONS

This application is the U.S. national phase of International Application No. PCT/IB2006/051209 filed 19 Apr. 2006 which designated the U.S. and claims priority to IT RM2005A000192 filed 20 Apr. 2005, the entire contents of each of which are hereby incorporated herein by reference.

The present invention relates to a system and method for the detection and the classification of events during motion actions in order to detect violations of the game rules, in particular of the so-called "offside" rule in the football game.

Upon developing the present invention, it has been evaluated which were:
  the imaging and calculation technologies adequate for the purpose;
  the modes to operate therewith, both of automatic or manual type;
  the modes for using the system by the referee and two linesmen;
  the performances and the cost of the whole system.

By way of introduction, and of example, hereinafter the offside rules according FIFA regulations are shown and the human errors in determining the offside are analysed. Further in the present invention, to simplify the description the offside event and the determination thereof will be continued to be referred to. However, it is to be meant that the present invention will have to be considered able to be applied to other events, obviously with obvious and consequent differences in the implementation, due to the differences in the regulations, without this modifying the core of the invention itself or altering the inventive concept.

Being in an offside position is not a violation on itself.

A footballer is in offside position when he is nearest to the line of the opposing goal both with respect to the ball and to the penultimate opponent. On the contrary, a footballer is not in offside position when:
  he is in his half of the game field, or
  he is in line with the penultimate opponent, or
  he is in line with the two last opponents.

The offside position of a footballer must be punished only if, when the ball is touched or played by one of his team-mates, the footballer, according to the referee's opinion, takes active part to the game:
  by intervening in the game, or
  by influencing an opponent,
  or by taking advantage from this position.

On the contrary, there is no offside violation when a footballer receives directly the football:
  upon goal-kick, or
  upon throw-in, or
  upon corner-kick."

Currently, there are no tools for helping the referee and the two linesmen in detecting the violation and therefore there is a high level of discretionary power of the referees themselves.

The fundamental problems in the offside detection are:
  detecting the ball and the moment wherein a footballer plays it in favour of a team-mate;
  determining the position of the footballers in the field at the passage time; and
  verifying if, when the ball is played, the position of whoever receives the passage is irregular.

The present invention aims at solving the typically found problems in order to determine such violations, by providing a method for the detection and the classification of events violating predetermined rules.

The present invention also relates to a system for detecting and classifying events violating predetermined rules.

Additional object of the present invention is a program for computers.

The present invention allows evaluating in a concrete and objective way typical events of the football game or other sports, in a real-time context and/or in a semiautomatic context by taking into account the variability of the environmental conditions and of the dynamics of the events tracing back to the offside.

The proposed technological solutions are of not invasive kind and they are compatible with the usual match course.

Additional advantages, as well as the features and the application modes of the present invention will be evident from the following detailed description of a preferred embodiment thereof, illustrated by way of example and not for limitative purposes, by referring to the figures of the enclosed drawings, wherein.

Figure 4:
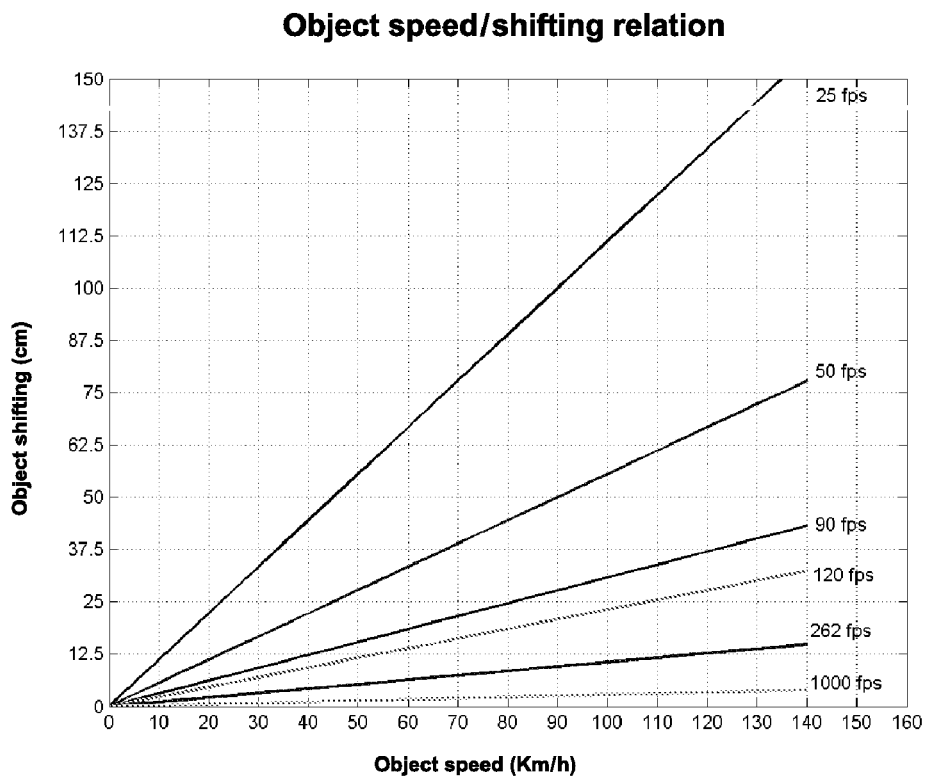
Figure 5:
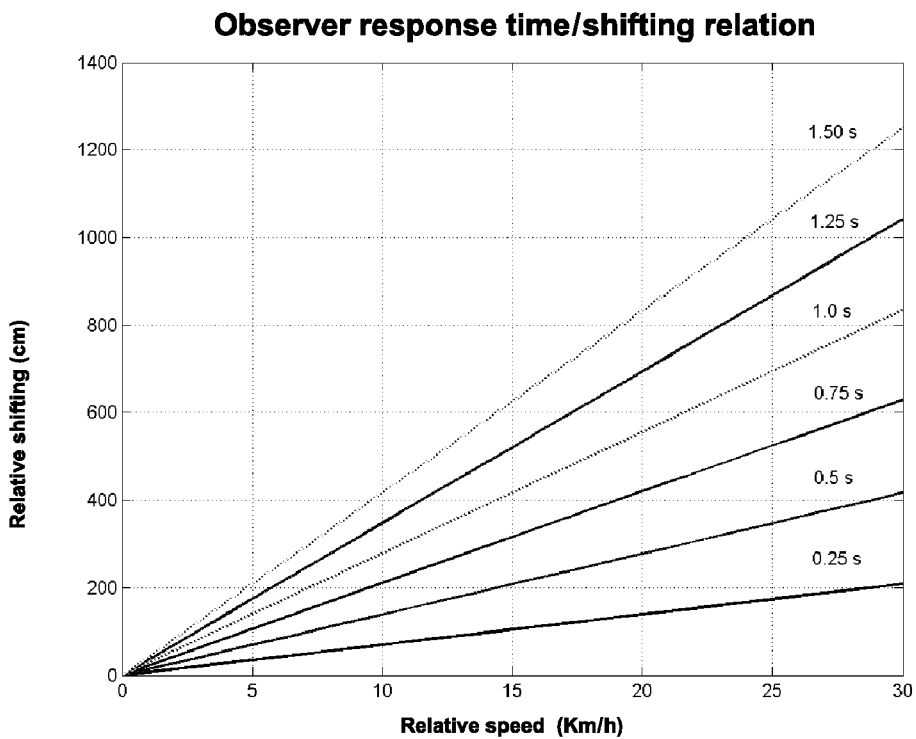
Figure 6:
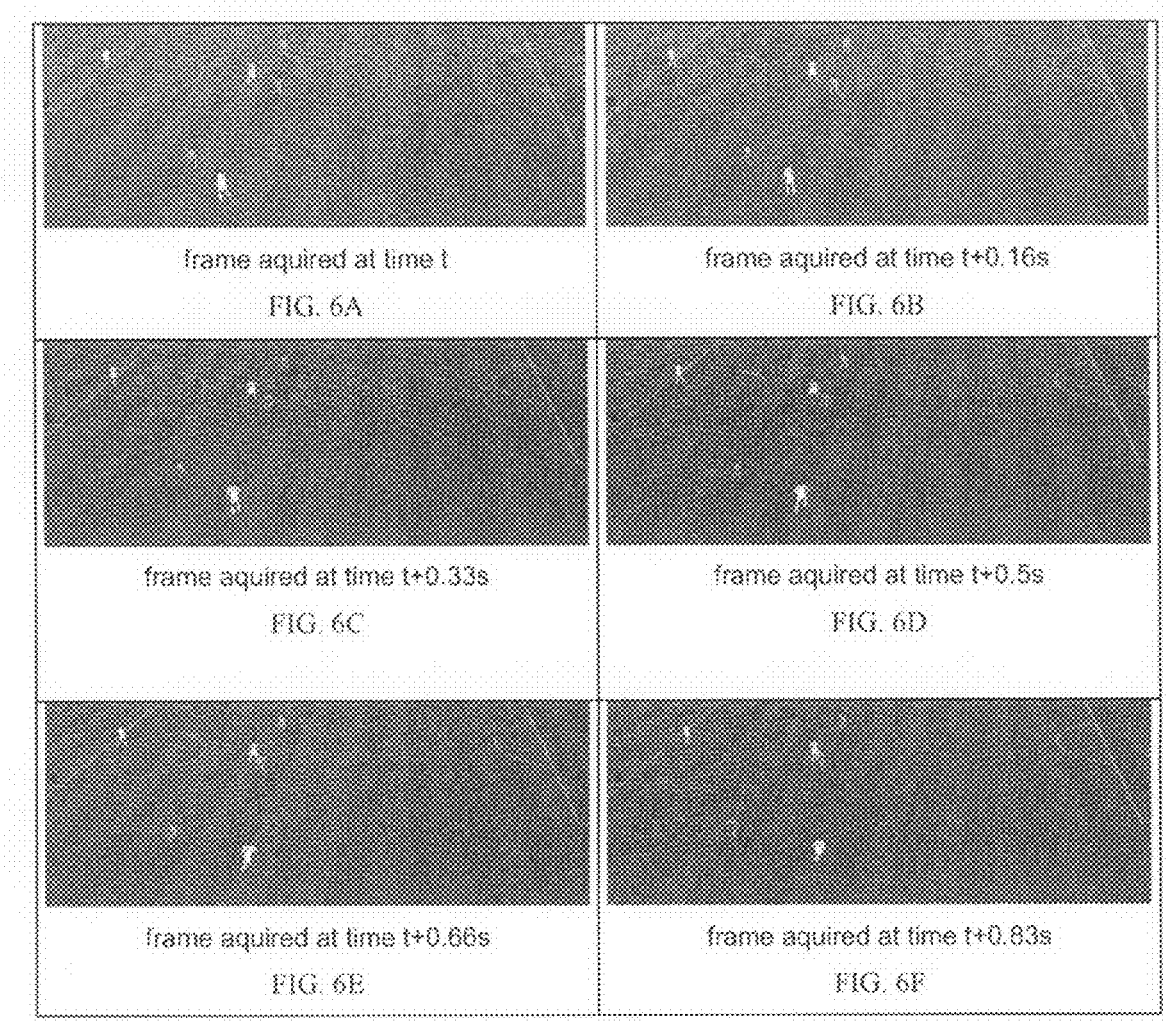
Figure 7:
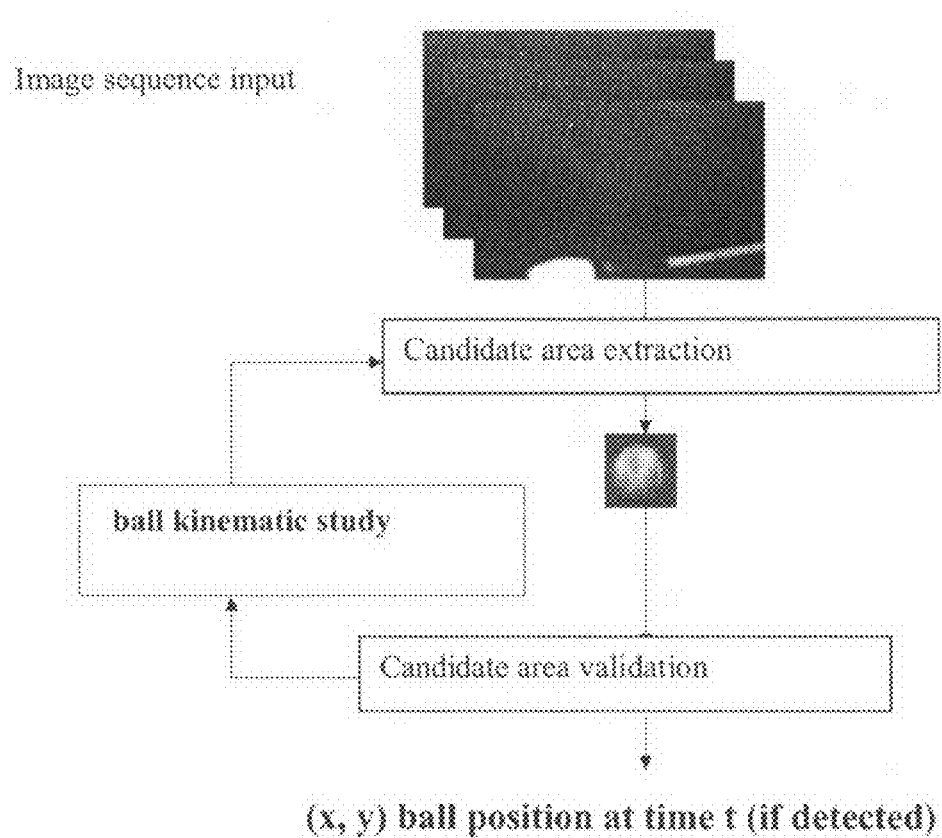
Figure 8A:
Figure 8B:
Figure 9A:
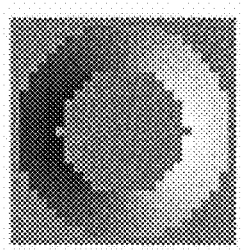
Figure 9B:
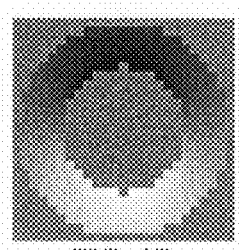
Figures 10A, 10B, 10C:
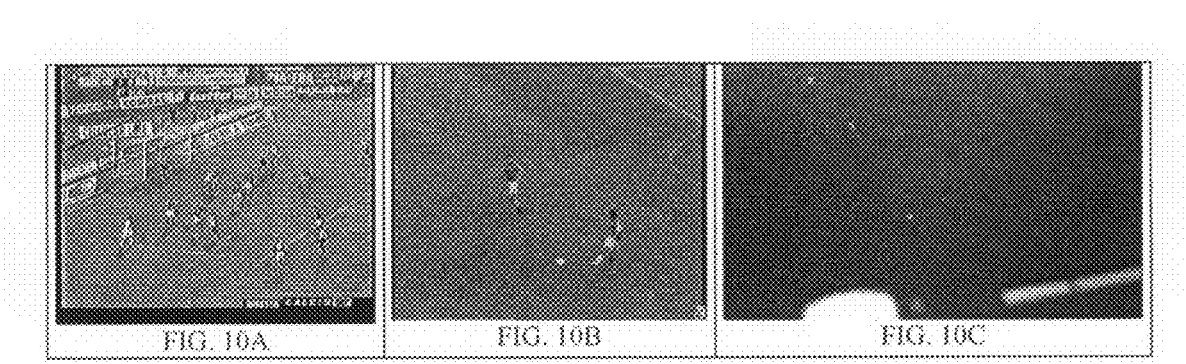
Figure 11:
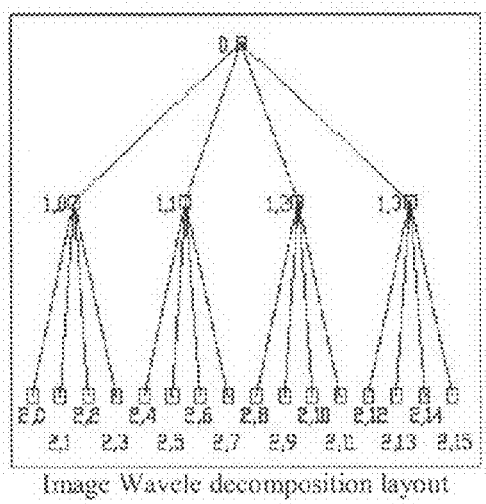
Figure 12:
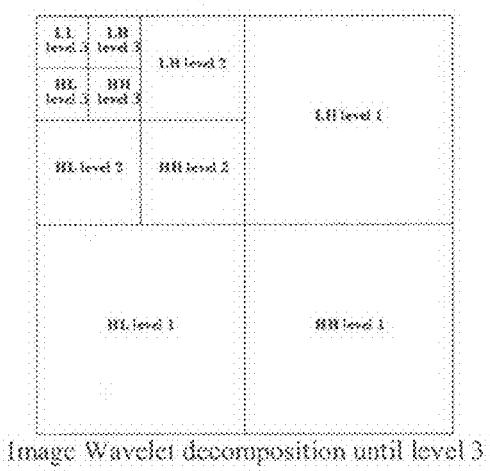
Figure 13:
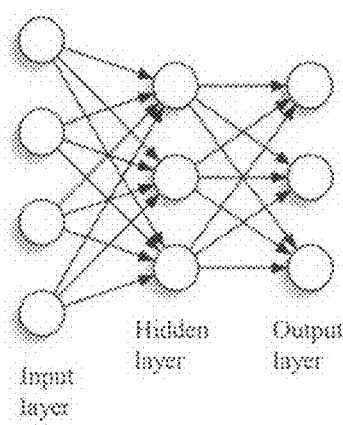
Figure 14:
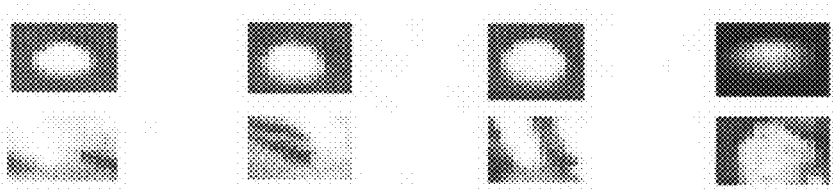
Figure 15:
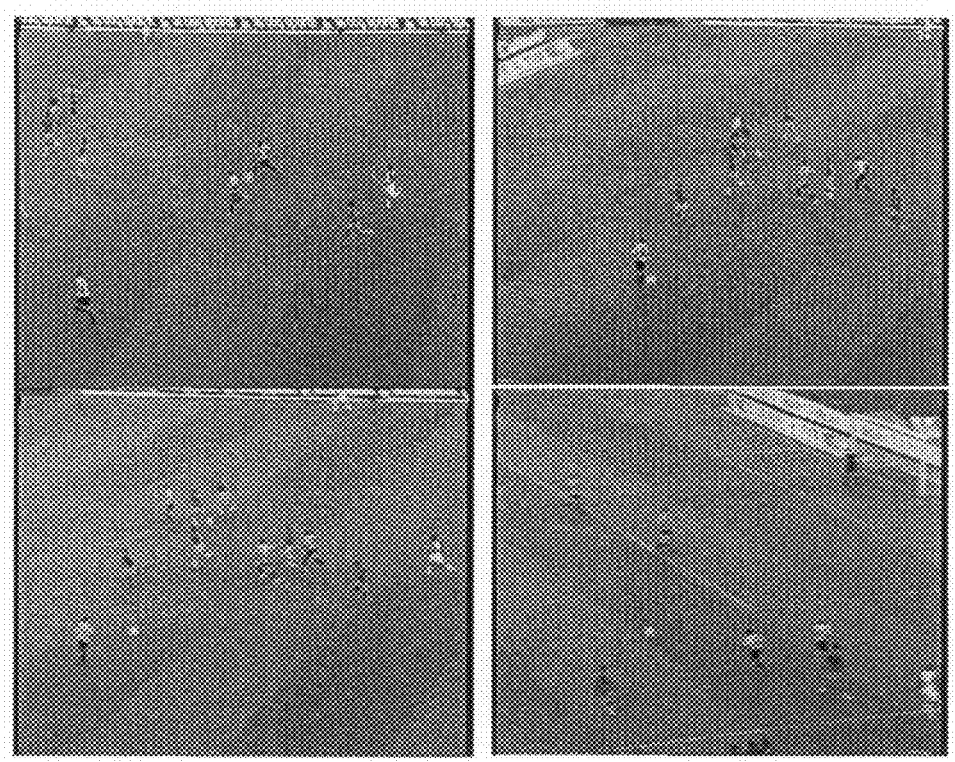
Figure 16:
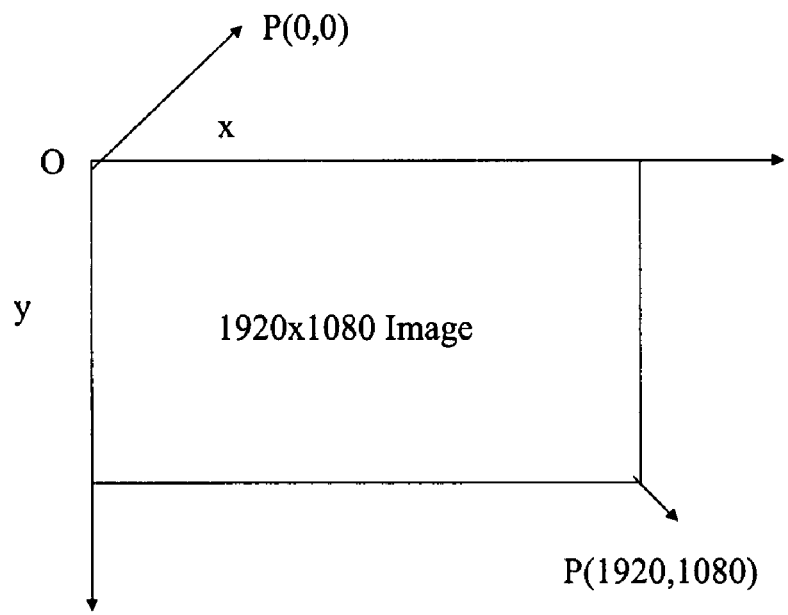
Figure 17:
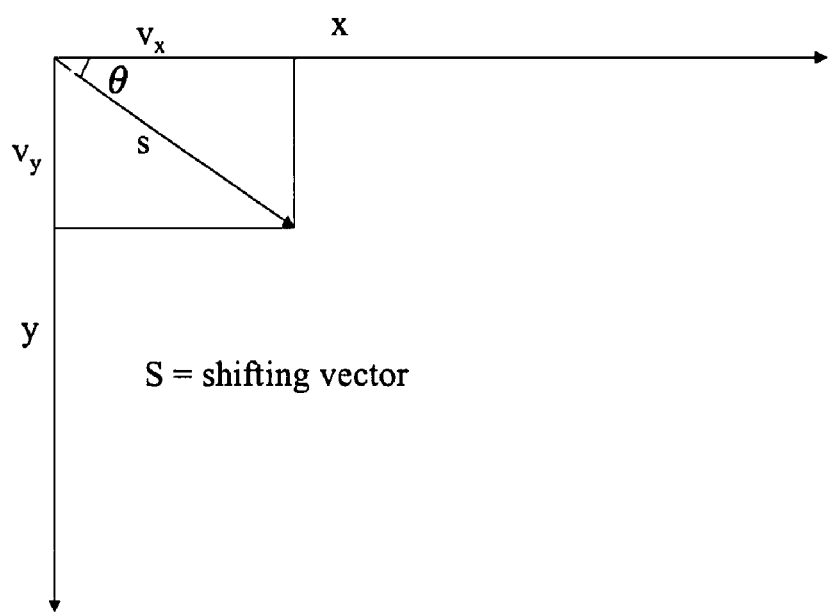
Figure 18:
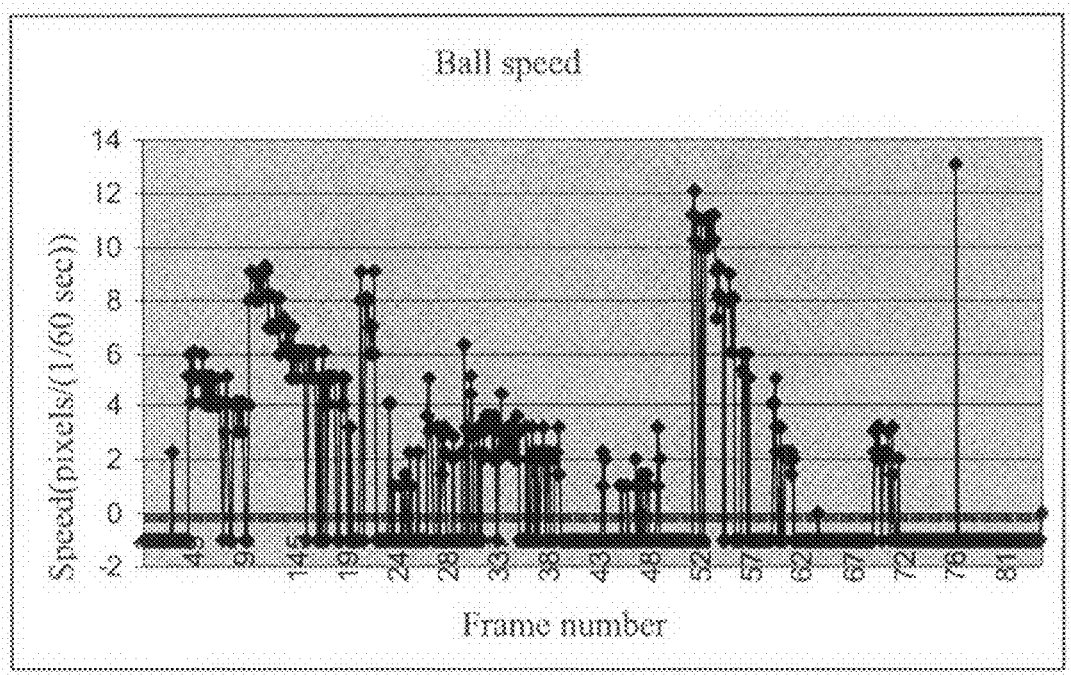
Figure 19:
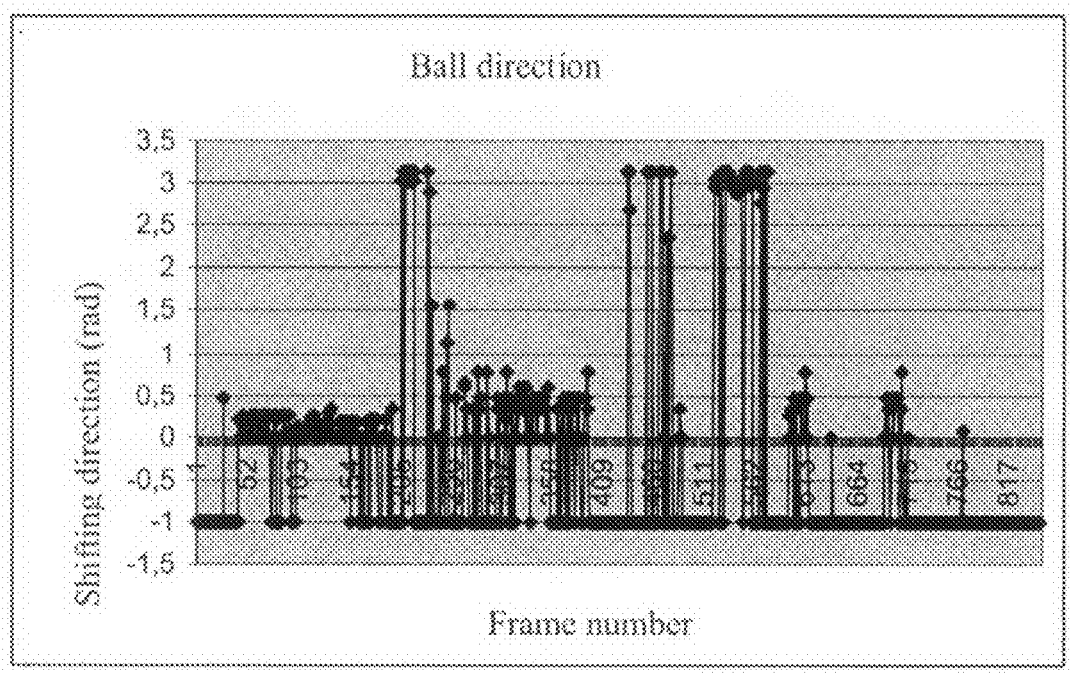
Figure 20A:
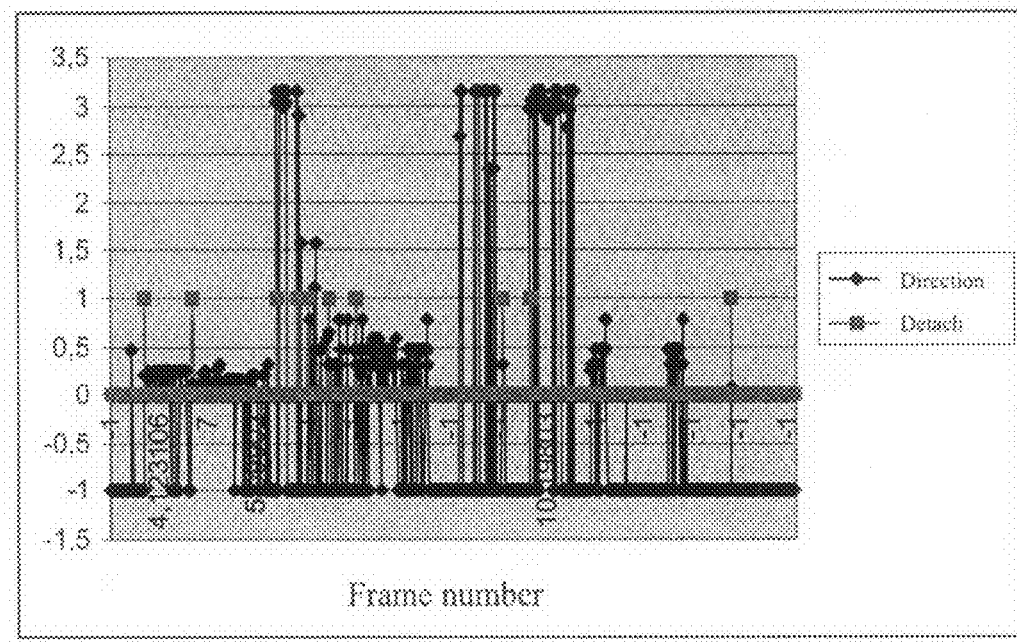
Figure 20B:
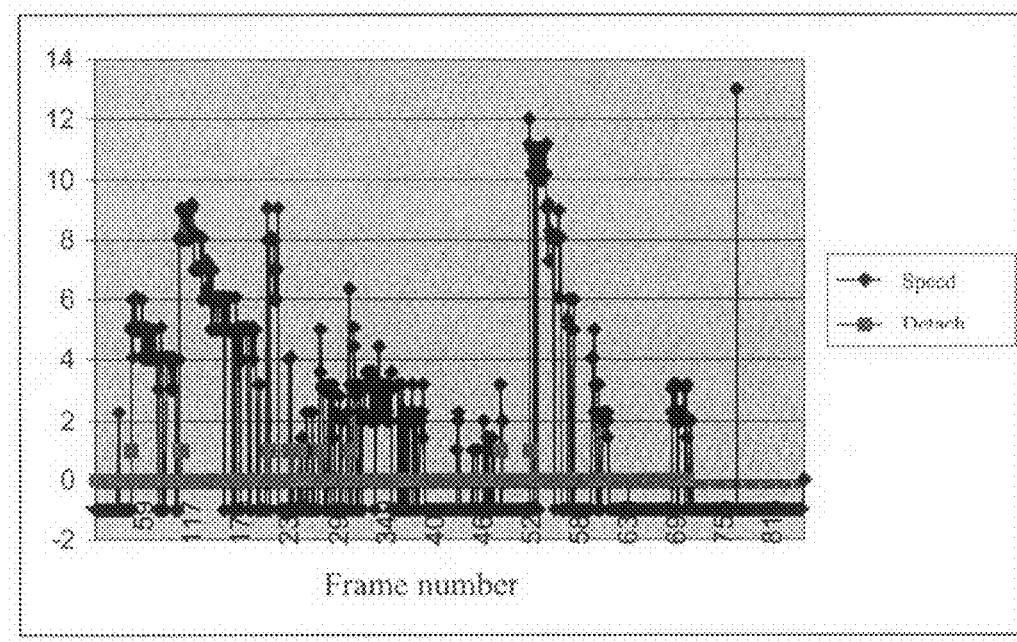
Figure 21:
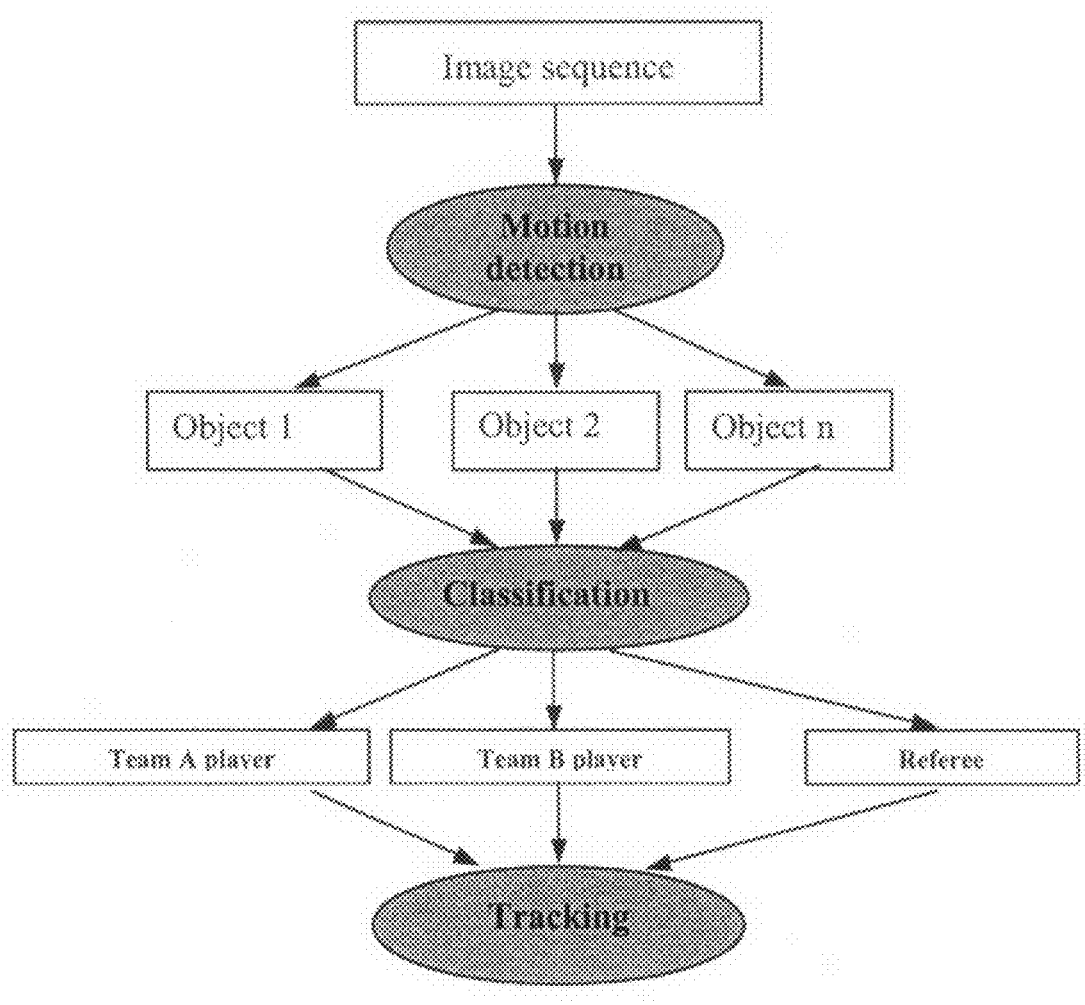
Figure 22:
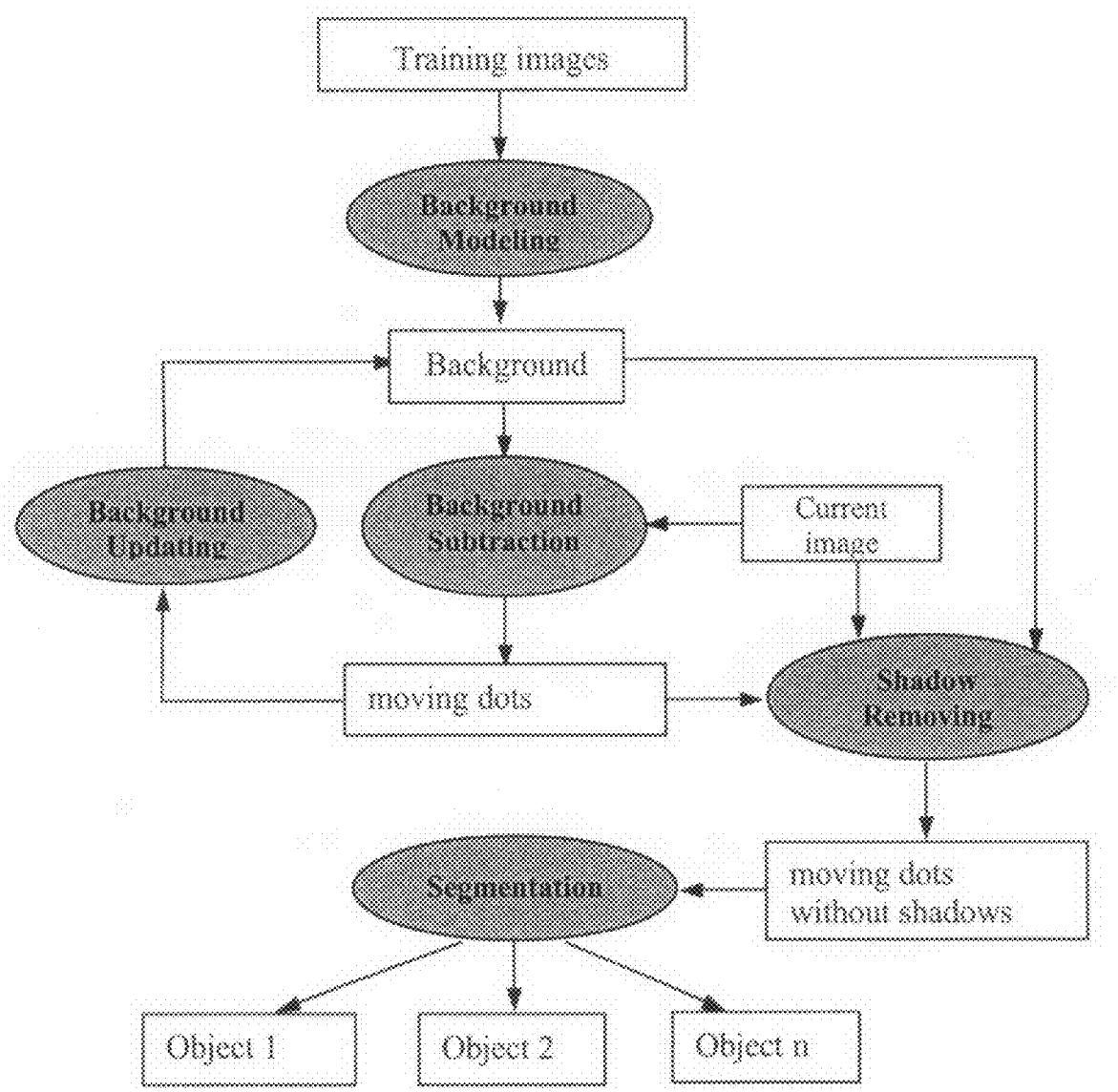
Figure 23:
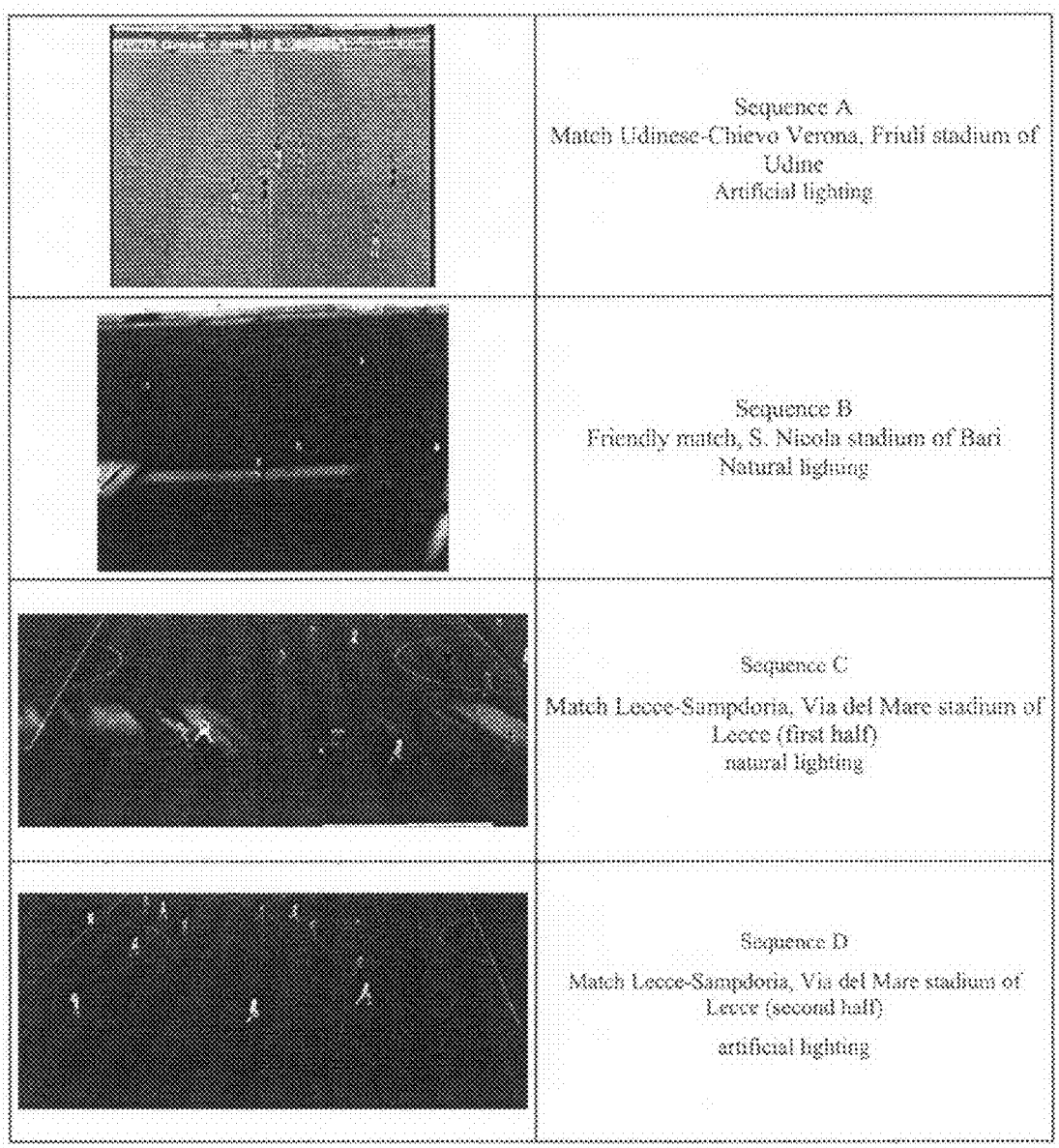
Figure 24:
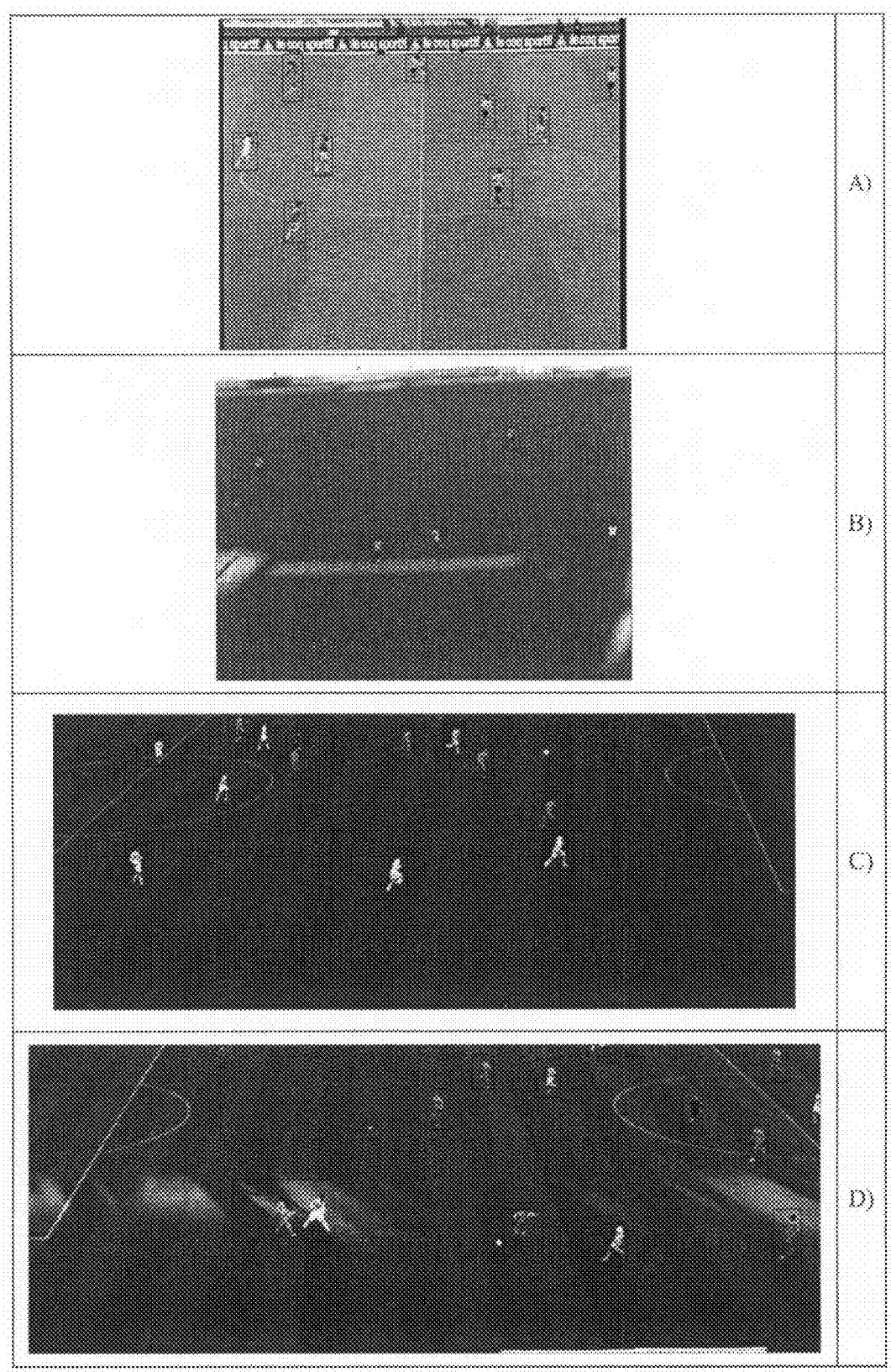
Figure 25:
Figure 26:
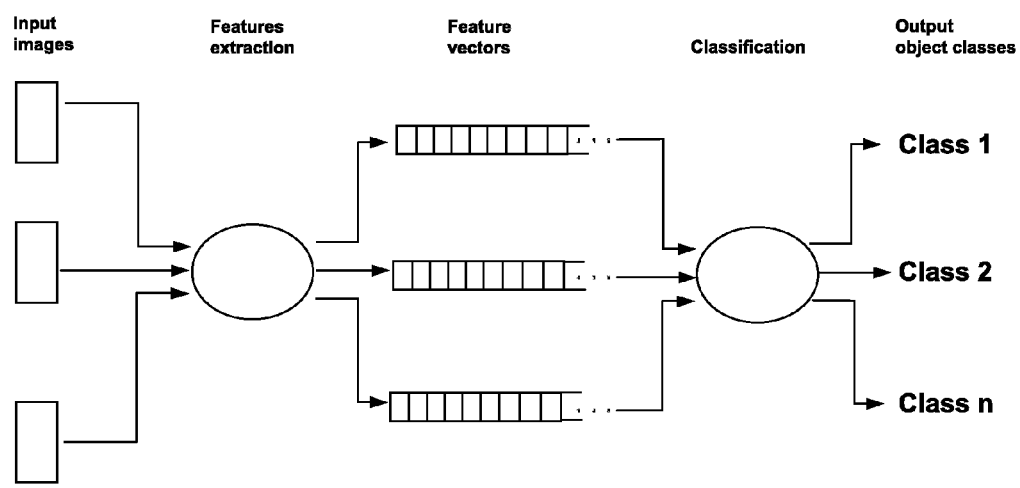
Figure 27:
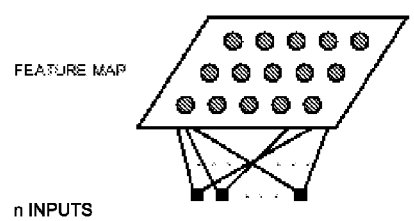
Figure 28:
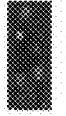
Figure 29:
Figure 30:
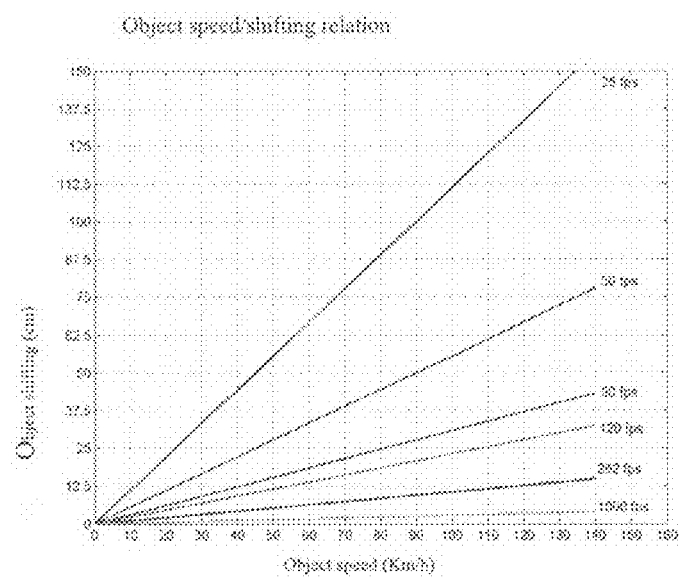
Figure 31:
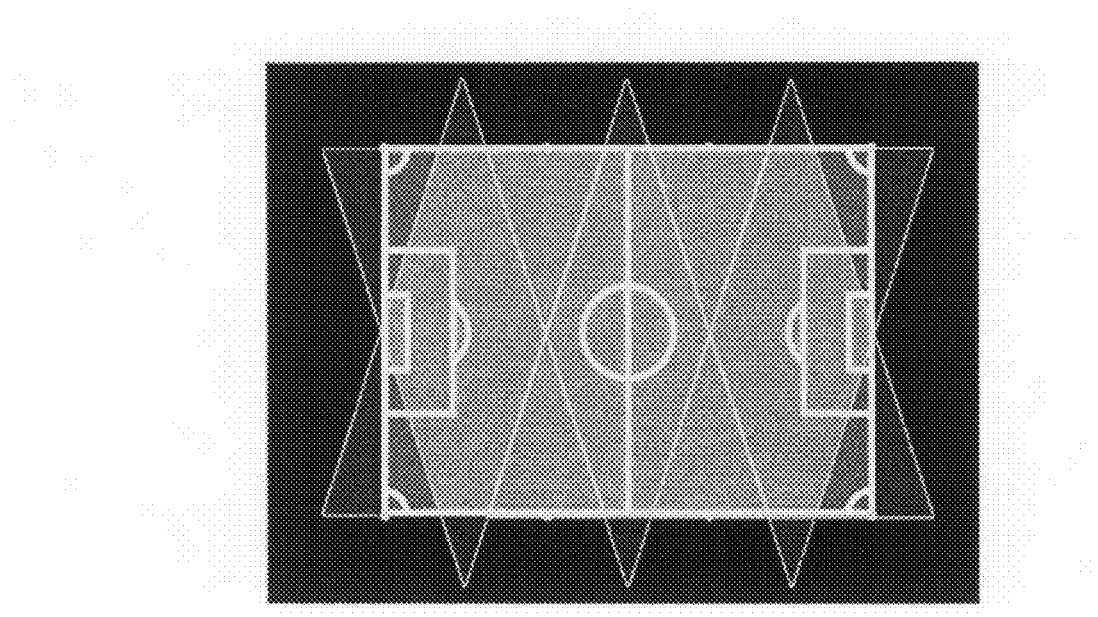
Figure 32:
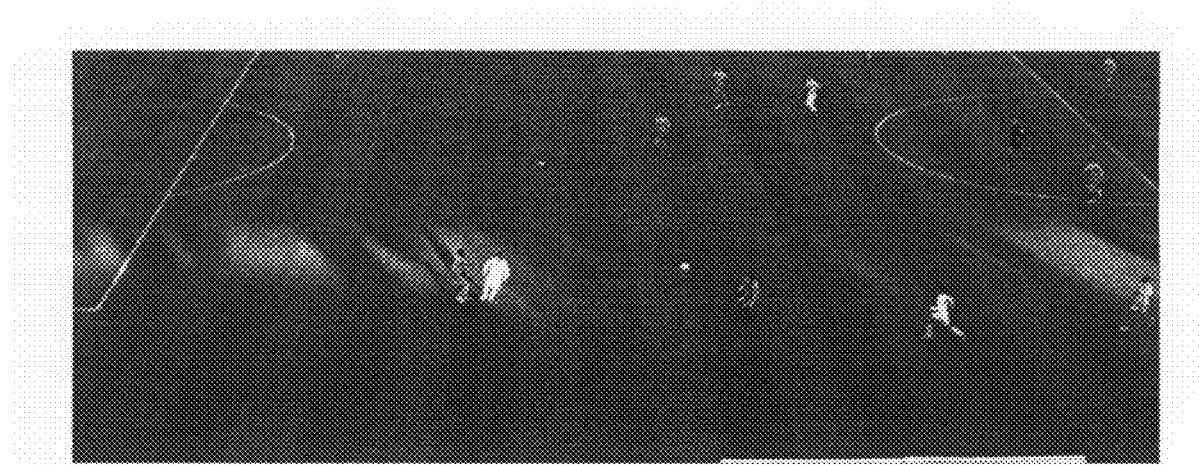
Figure 33:
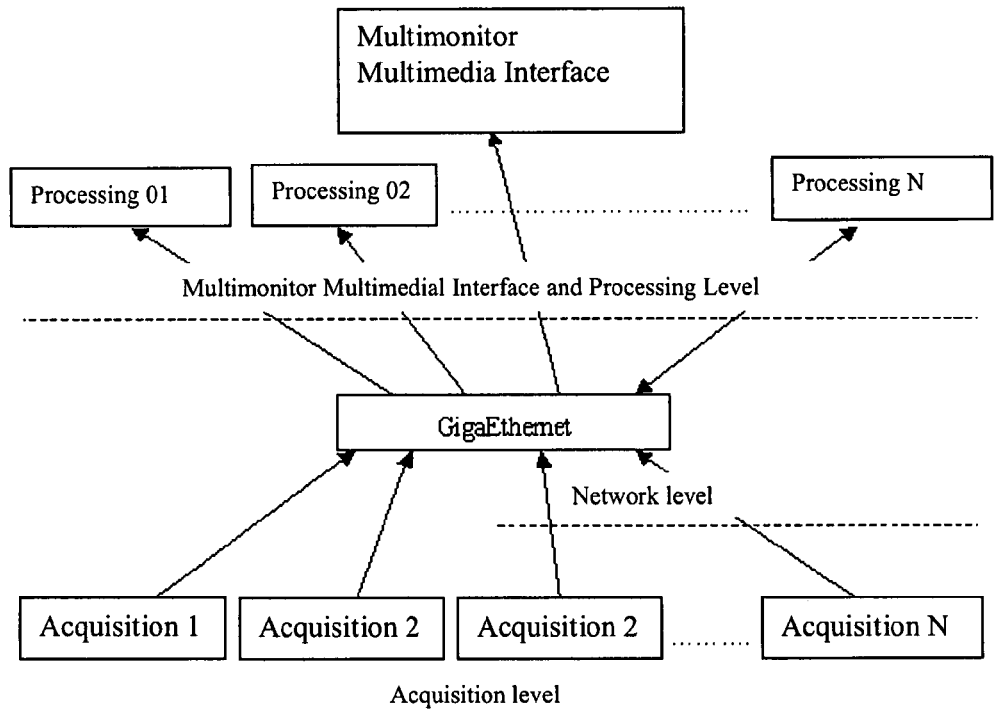
Figure 34:
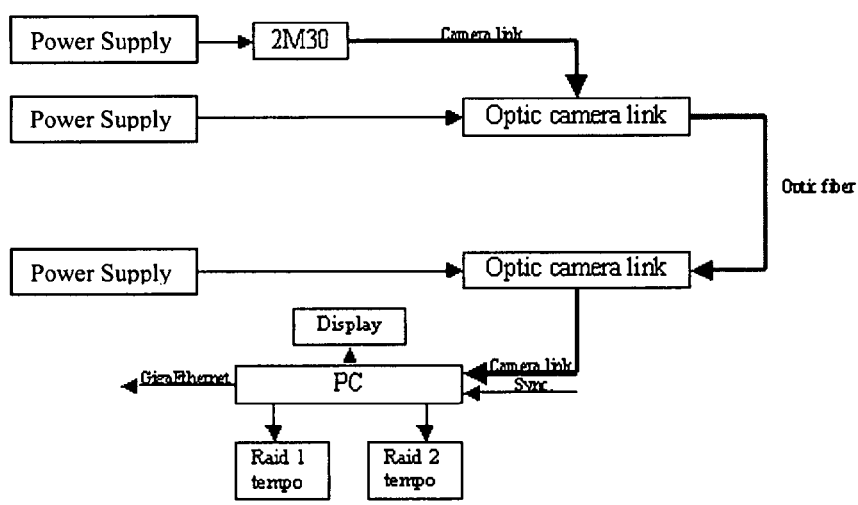
Figure 39:
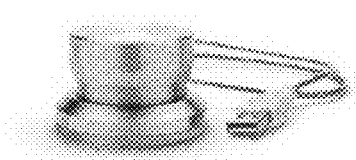
Figure 40:
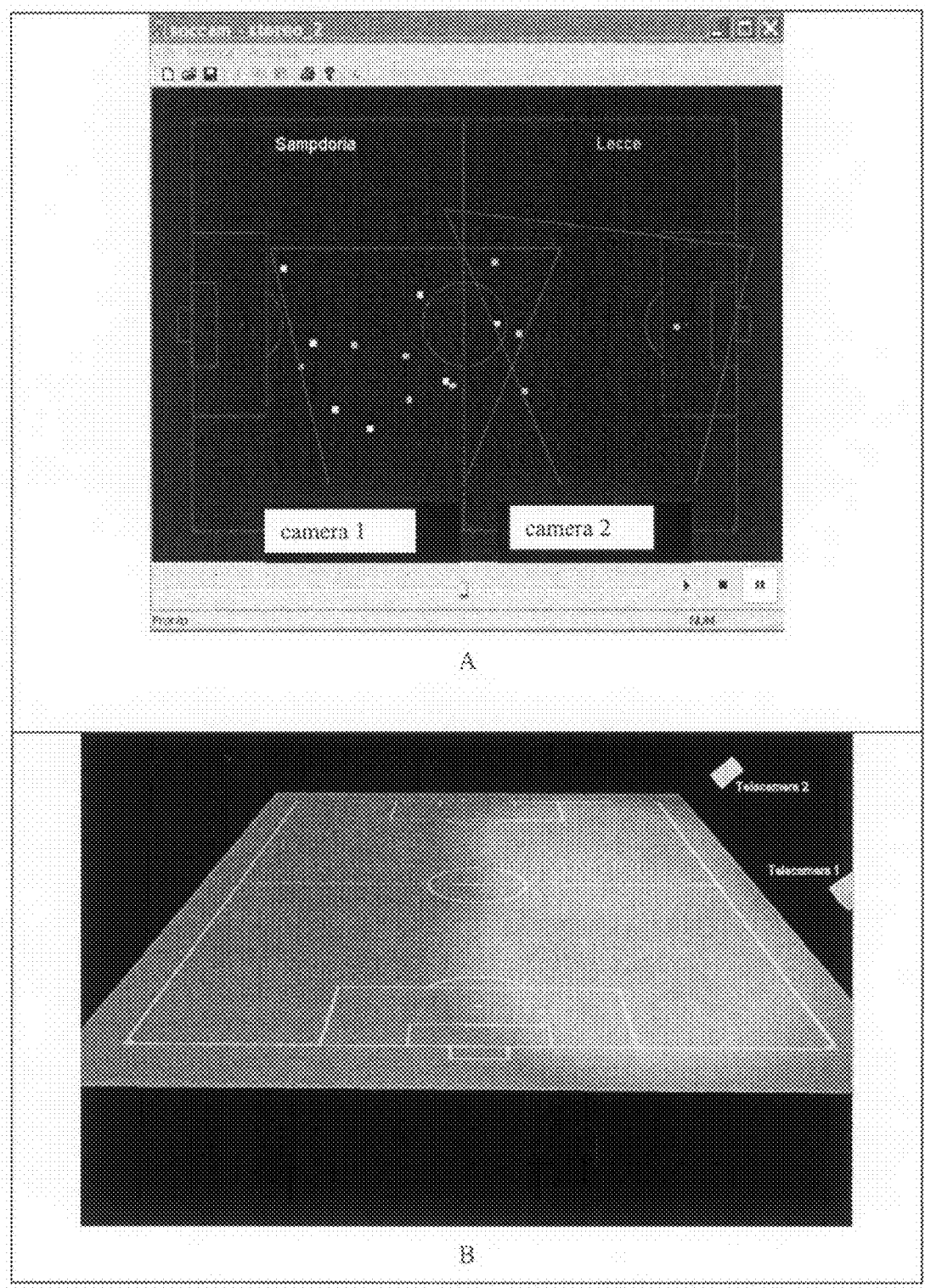

FIGS. 3A to 3H schematize the possible perspectives which can occur by considering the various positions of players with respect to the linesman's observations points;

FIG. 4 is a graph showing the relationship between speed and shifting of an object;

FIG. 5 is a graph showing the relationship between shifting and response time;

FIGS. 6A to 6F reproduce some photograms extracted from a match of the football championship series A 2004/2005;

FIG. 7 is a general layout of the methods according to the present invention;

FIGS. 8A and 8B illustrate the variation of the ball appearance upon varying the contour conditions;

FIGS. 9A and 9B show two examples of convolution masks;

FIGS. 10A to 10C show some images utilized in the experiments;

FIG. 11 is a wavelet decomposition layout of an image;

FIG. 12 represents a wavelet decomposition of an image until the level 3;

FIG. 13 is an example of neural network;

FIG. 14 shows some positive examples (first line) and negative examples (second line) used to train a neural network;

FIG. 15 shows some images wherefrom the ball has been positively extracted by means of Hough transform and then recognized by means of neural approach;

FIG. 16 represents a reference system;

FIG. 17 shows the vectorial calculation;

FIG. 18 is a graph of the ball speed with respect to the captured frames;

FIG. 19 is a graph of the ball direction with respect to the captured frames;

FIGS. 20A and 20B are similar to the previous ones (17 and 18) furthermore with the addition of the automatic detections of the detachment event;

FIG. 21 is a flow chart of the salient steps of the process for detecting and classifying the subjects in the field;

FIG. 22 schematizes a Motion Detection algorithm;

FIG. 23 shows some image sequences processed according to the present invention;

FIG. 24 shows the results of the segmentation phase;

FIG. 25 shows the result of a operation for removing the shadows;

FIG. 26 schematizes the steps for extracting the features and for classifying according to the present invention;

FIG. 27 is a schematization of a SOM network;

FIG. 28 shows examples of correctly classified players;

FIG. 29 proposes a case wherein the classifier fails;

FIG. 30 shows the graph of the relation speed versus shifting of the football and frame rate;

FIG. 31 illustrates a possible arrangement of the cameras with respect to the field;

FIG. 32 is an image acquired during a football match;

FIGS. 33 and 34 show schematically the system architecture according to the present invention;

FIGS. from 35 to 38 show the implementation of a multimedial workstation according to the present invention and the shown interface views;

FIG. 39 shows a device of joggle type used in the present invention;

FIG. 40 shows virtual views of the playing field reproduced onto the supervision unit; and FIGS. 41 to 47 show some examples of image processed according to the present invention.

Hereinafter in the present description the figures mentioned above will be referred to.

Figure 1A:
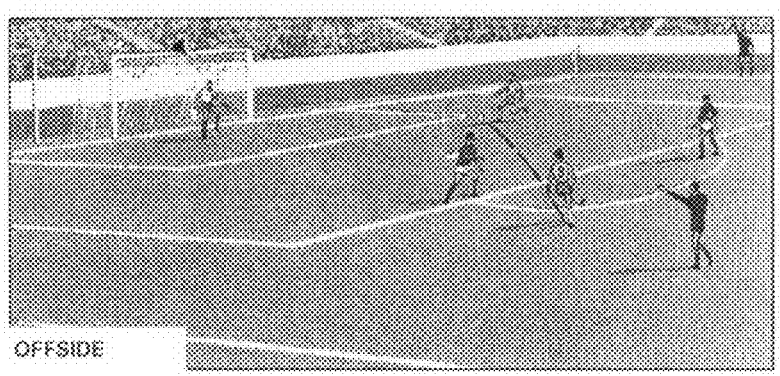
FIGS. 1A to 1I illustrate different game situations corresponding or not to violations of the offside rule.

In particular, FIG. 1A relates to the case wherein the attacker receiving the ball from the team-mate with the shirt number 9, is in punishable offside position since he is nearer to the line of ball opposing goal and of the penultimate defender and this allow him to take advantage of his position.

Figure 1B:
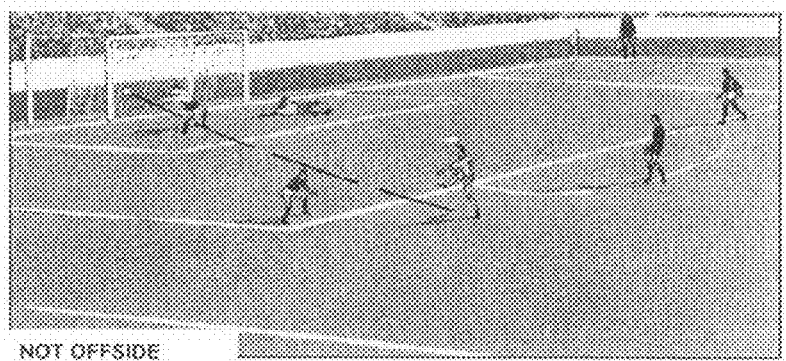

In the situation represented in FIG. 1B, even if the attacker is in offside position when the football is kicked by the team-mate with the shirt Nr. 8, he is not punishable as he does not participate actively in the game and does not obstruct the goalkeeper's motions.

Figure 1C:
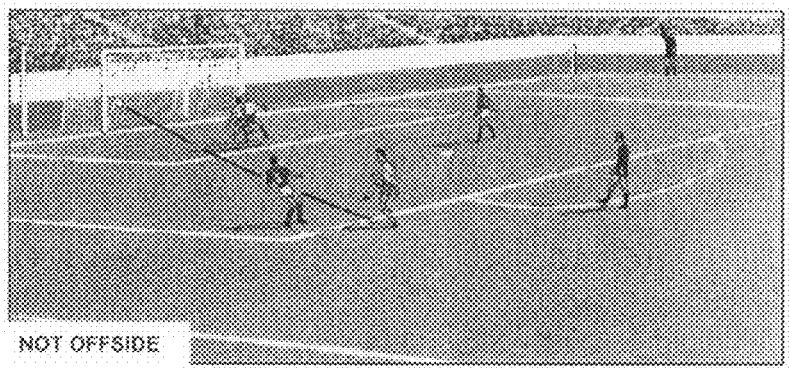

In the situation represented in FIG. 1C, the attacker Nr. 9 is in punishable offside position as he participates in the game by obstructing the goalkeeper's motion.

Figure 1D:
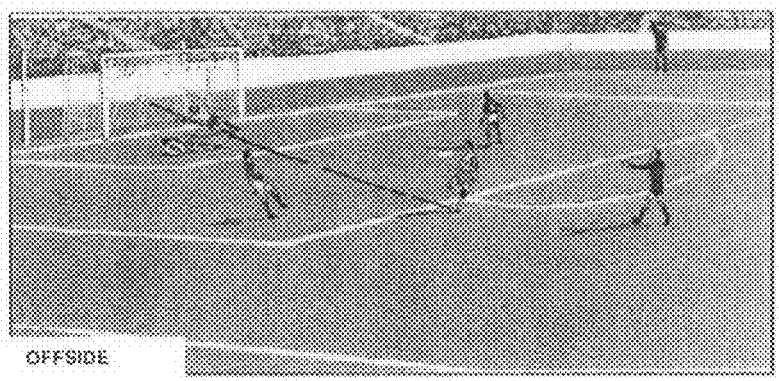
Figure 1E:
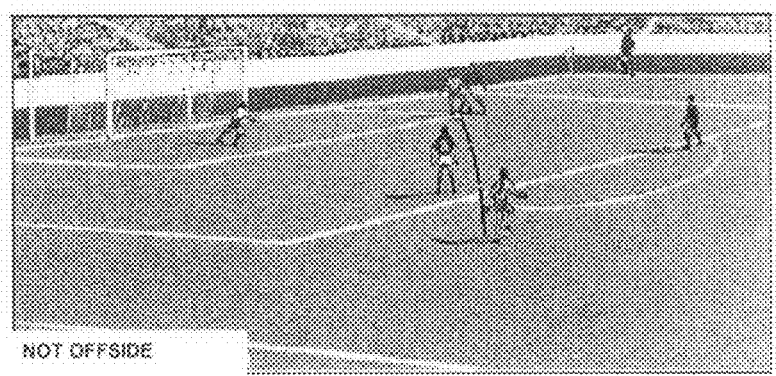

In the situation represented in FIG. 1D, the attacker Nr. 9 is in punishable offside position as he obstructs the goalkeeper's motion.

In the situation represented in FIG. 1A, the attacker receiving the ball from the team-mate Nr. 8 is not in offside position as he is in line with the penultimate defender when the ball is played.

Figure 1F:
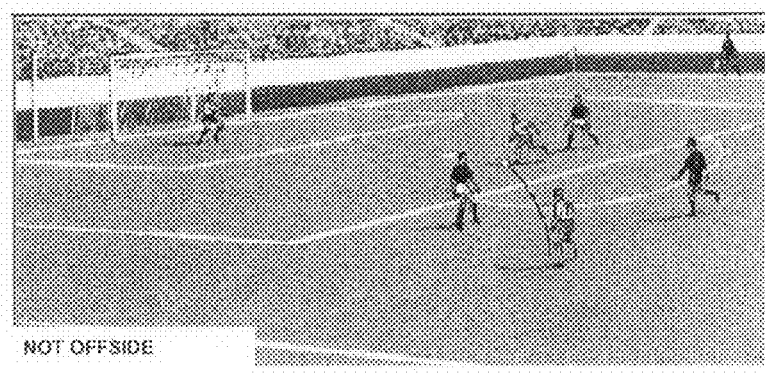

In the situation represented in FIG. 1F, the attacker Nr. 9 is not in offside position as he is in line with the penultimate defender when his team-mate Nr. 7 passes the ball to him.

Figure 1G:
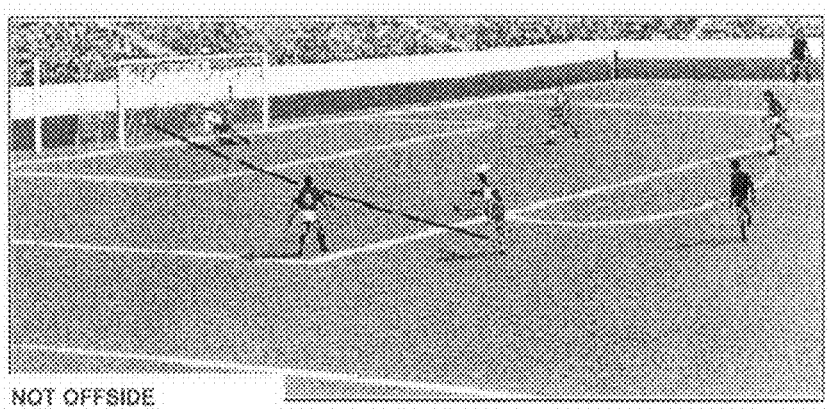

In the situation represented in FIG. 1G, even if the attacker is in offside position when the ball is played by his team-mate Nr. 10, he is not punishable as he does not participate actively in the game and he does not take advantage of his position.

Figure 1H:
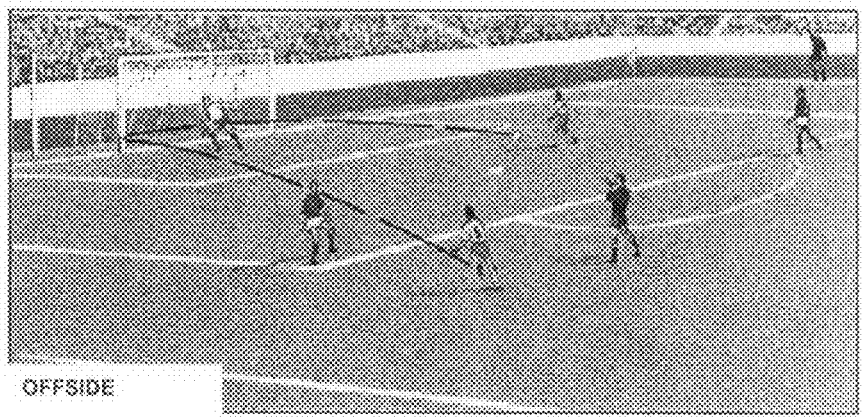

In the situation represented in FIG. 1H, the shot of footballer Nr. 6 bounces on the post and goes towards a team-mate who is punished as he takes active part in the game and takes advantage of his offside position wherein he was when the ball has been kicked.

Figure 1I:
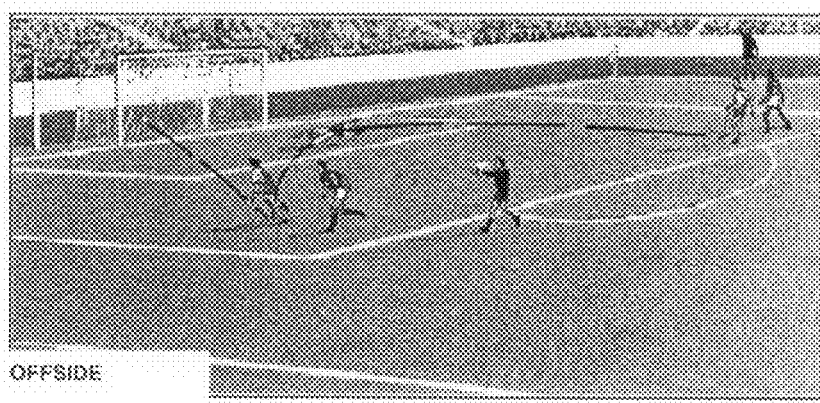

In the situation represented in FIG. 1I, the shot of a team-mate, returned by the opposing goalkeeper, goes to footballer Nr. 8, punishable due to his offside position as he takes active part in the game and takes advantage of that position wherein he was when the ball has been kicked.

The present invention then aims at facing the problems met during the offside detection, and in particular the following aspects:

analysis of the human errors for perceiving the offside event;

study of shooting optimal solutions for a better acquisition of events, by taking into account also the logistic aspects of the shooting positions and of the modes for connecting the cameras to the electronic devices for the digital recording of the video sequences;

analysis and choice of the technological solutions for imaging, recording and processing in real time the video sequences acquired by several cameras located at hundreds meters with respect to the direction position (location of the image-acquiring concentrator, of server and the multimonitor console);

strategy of automatic detection of the ball and evaluation of the parameters of the kinematics thereof;

strategy for detecting and identifying automatically the actors (players and the referee and the two linesmen);

strategy for tracking the ball, for determining the situation ball associated to a player, for evaluating the position of the players and then final evaluation of the offside event according to FIFA regulations;

evolved interface man-machine.

In order to verify the feasibility of the studied solutions a hardware and software demonstrator has also been developed, with various algorithms for processing the images in real time for the automatic detection of the ball and of the actors with the functions mentioned above. At last, for validating the proposed strategies and the algorithms, experimental shootings have been performed by acquiring some real matches by using cameras with high spatial resolution (1600×600 pixels) with frame rate of 60 images per second.

In order to better understand all aspects of the present invention, the possible errors which can be found in the offside determination will be analysed hereinafter one by one.

Analysis of the Human Errors in the Offside Determination

Hereinafter the error types contributing to the not correct evaluation from a human linesman of the offside event in the football game will be now analysed.

Although the human visual system is of stereo-binocular kind, able then to do remote measurements to evaluate which player is nearest to the goal line, in reality the visual system is limited and inadequate with respect to the dynamics of possible events and with respect to the triangulation measurements required by considering the distances between players and observer positioned on the edges of the side line of a playing field. A binocular vision system is characterized by the interocular distance, also called "baseline", and by the inequality measurement (a scene point projected onto the two retinae is on the same horizontal line but shifted by a value, the inequality value, due to the different observation position depending upon the baseline measurement).

In the visual system the baseline distance is equal to 50/60 mm, very small to have adequate distance measurement, by also considering the great distances between linesmen and players.

Figure 2:
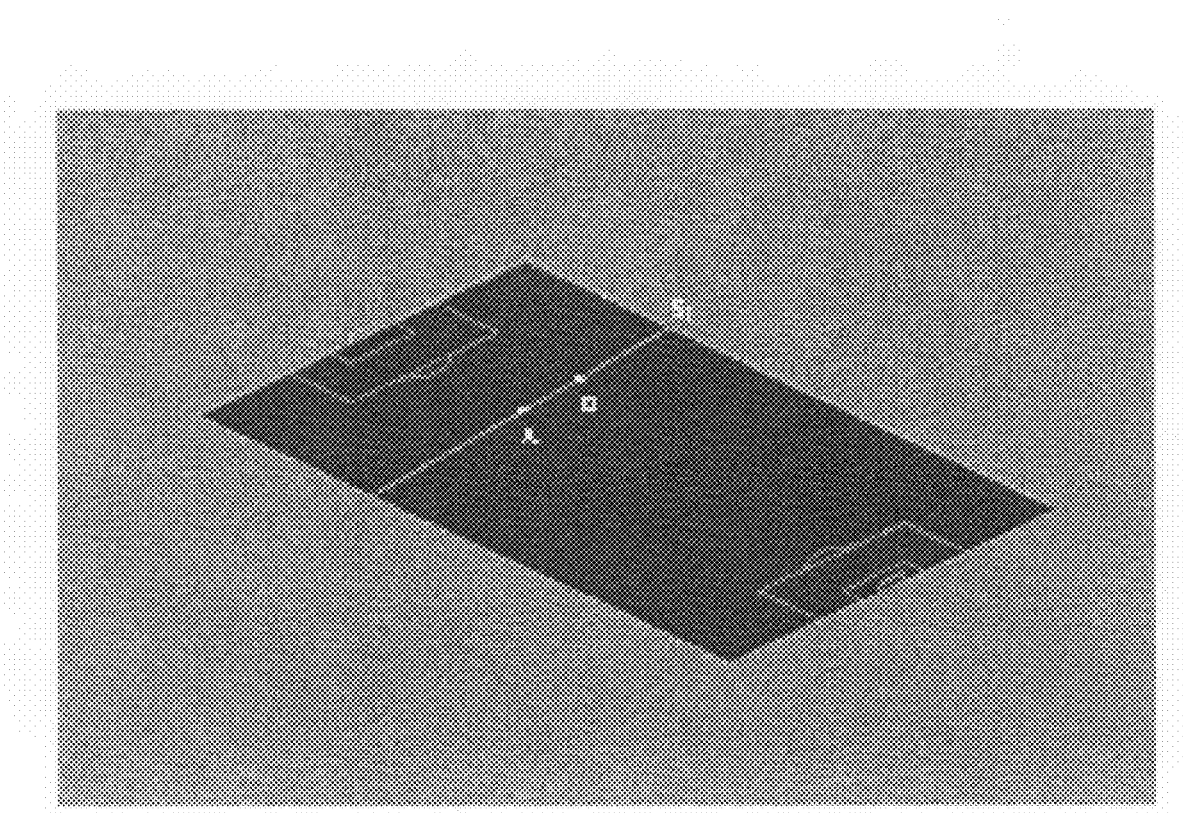
FIG. 2 shows an ideal operating configuration of the viewing system.

It follows that the biological vision system, in reality, for determining the offside, is as if it were utilized as a monocular vision system able to operate correctly only if the parallax error is minimum. FIG. 2 shows the configuration of ideal operativeness of the visual system players (A-attacker and D-defender) and observers (Si-linesmen) aligned for a correct offside evaluation.

Having said that, hereinafter the main error sources of a human linesman are analysed.

Perspective—Parallax Error.

This error is caused by the optics of the human visual system which, upon observing from the side edges of the field, perceives the players aligned when in reality they are separate, or viceversa, it perceives them separate when in reality they are aligned with respect to the ideal line parallel to the goal line. This substantially optic error depends upon the linesman position with respect to the position of players included in the view field of the linesman himself. This error is independent from the linesman professionalism.

By referring to FIGS. 3A to 3H the possible perspectives which can occur by considering the various positions of the players with respect to the linesman's observation points are underlined. In the FIGS. 3A to 3H, for each one of the possible perspectives, the ideal configuration between players and linesman (sketched line) is also underlined.

As a whole eight perspective configurations can be distinguished for the offside determination based upon the position of the players and of the linesman. Such configurations are listed in the following Table 1, wherein the designation FG designates an "Offside" (FuoriGioco) position, whereas the indication NFG designates "Not offside" ("NON-Fuori-Gioco") position. Furthermore A designates the attacker, D defender, P goalkeeper ed S linesman. The sketched line, instead, designates the ideal configuration with the observer Si aligned with the defender.

TABLE 1

Figure 3A:
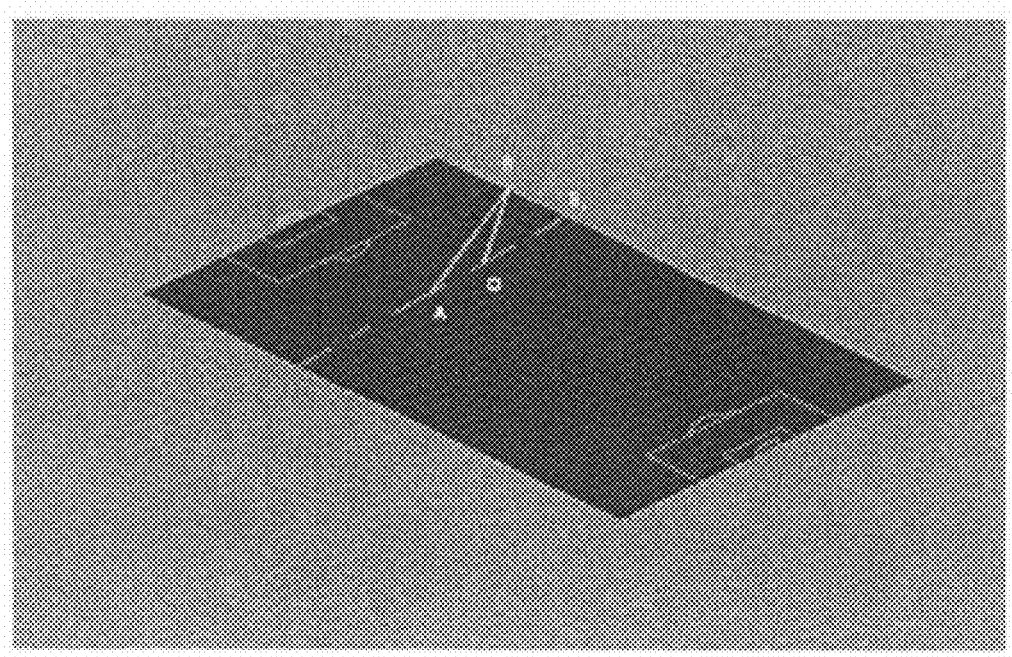
Figure 3B:
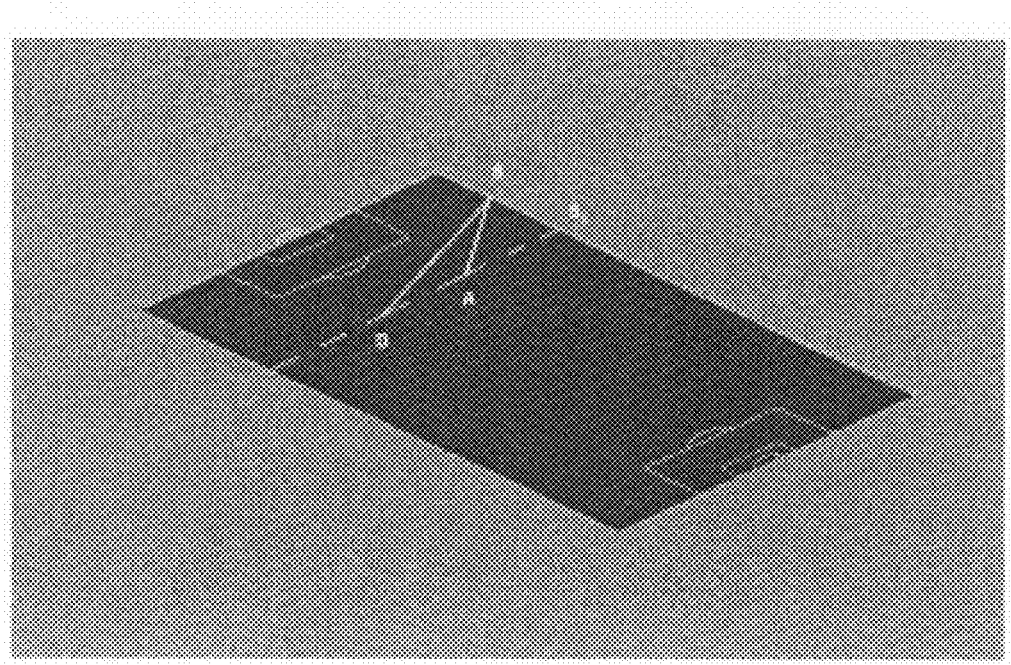
Figure 3C:
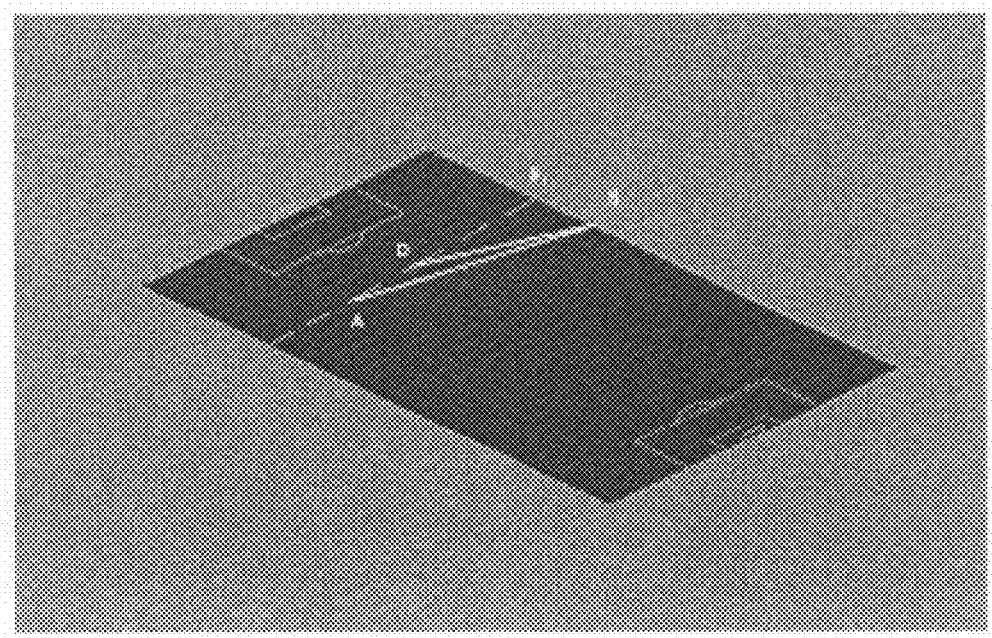
Figure 3D:
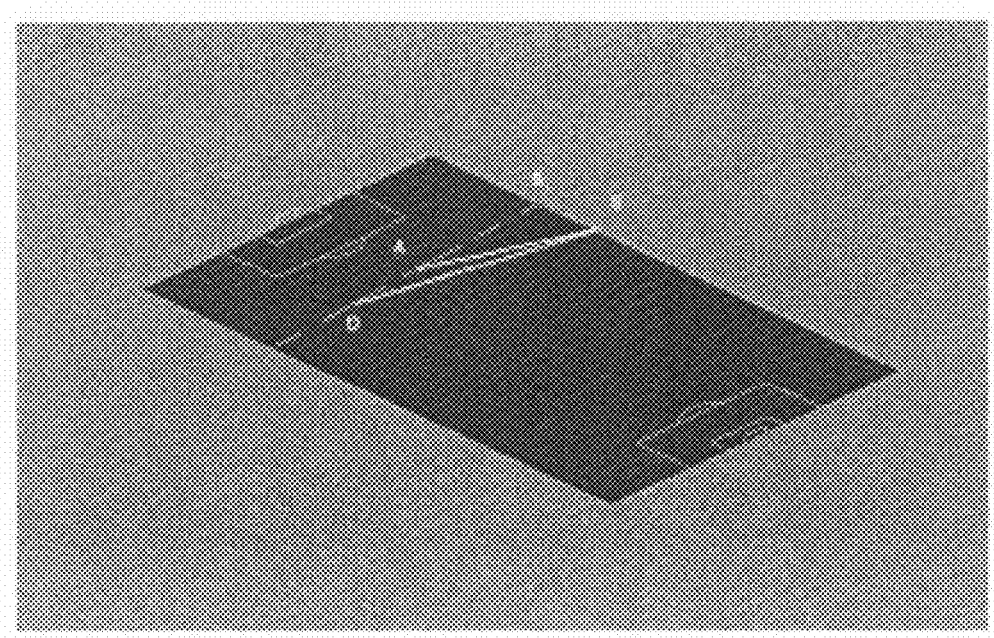
Figure 3E:
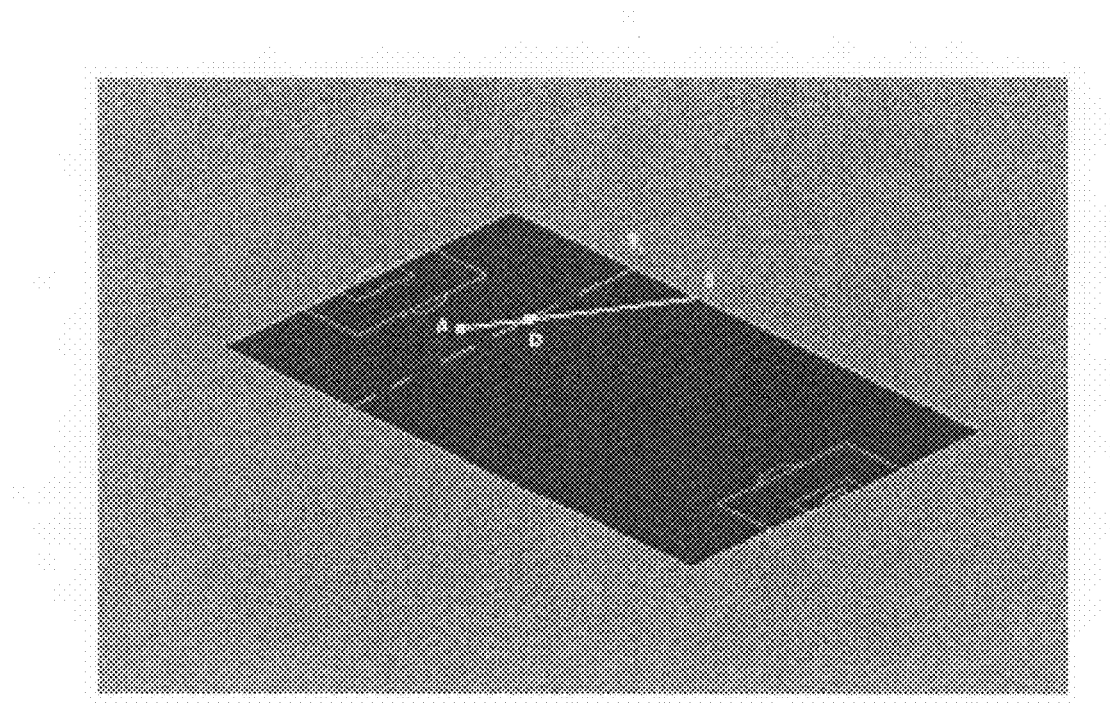
Figure 3F:
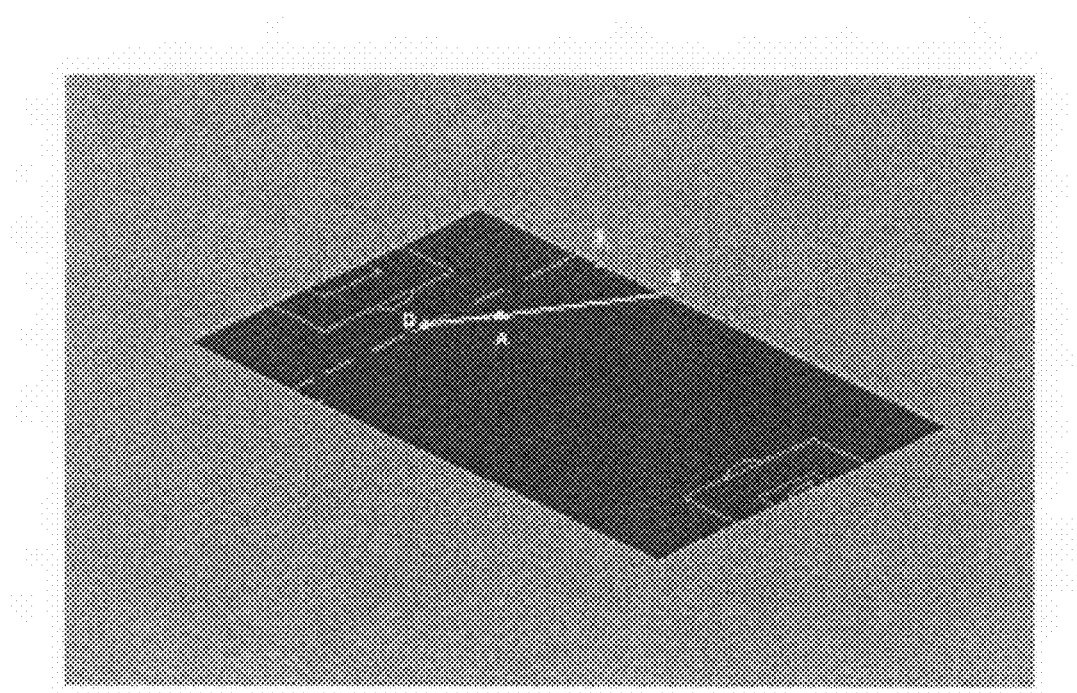
Figure 3G:
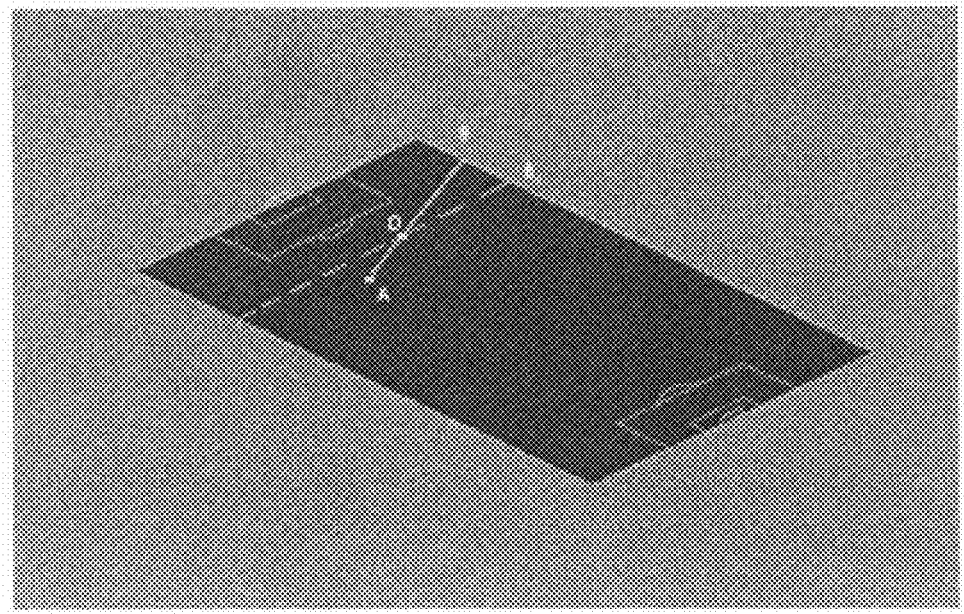
Figure 3H:
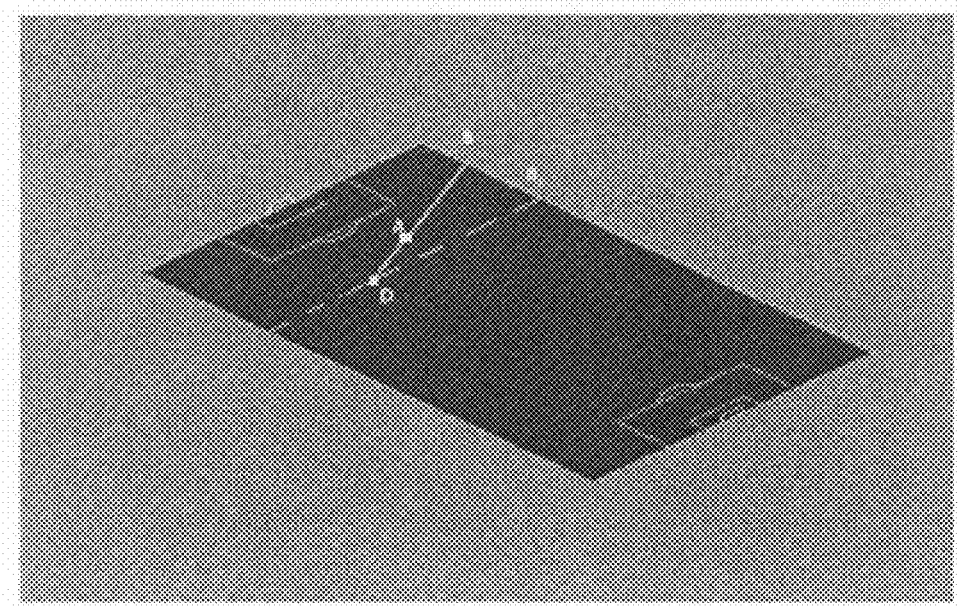

| Configuration | Real situation | Situation perceived by parallax error | Decision |
|---|---|---|---|
| 1 - FIG. 3A | NFG | FG | Error |
| 2 - FIG. 3B | NFG | NFG | Ok |
| 3 - FIG. 3C | NFG | NFG | Ok |
| 4 - FIG. 3D | NFG | FG | Error |
| 5 - FIG. 3A | FG | NFG | Error |
| 6 - FIG. 3F | NFG | NFG | Ok |
| 7 - FIG. 3G | NFG | NFG | Ok |
| 8 - FIG. 3H | FG | NFG | Error |

In FIGS. 3A to 3H the possible configurations wherein the linesman can stay to evaluate the offside event are shown.

The parallax error of the visual system induces it to four possible error configurations. In particular in the configurations 1 and 4 in reality there is no offside (NFG), but the linesman perceives the offside event (FG); on the contrary, in the configurations 5 and 8, in reality there is the offside, but the linesman perceives the NFG event. In the first case, for the errors 1 and 4, also called false positive errors, caused by the parallax error, the linesman sees the two players (attacker and defender) projected on his retina not aligned. If he had been in the ideal position Si he would have perceived them aligned. Viceversa, in the error typology related to the configurations 5 and 8, said also called false negative errors, the linesman sees the two players projected in a same point of the retina, that is he perceives them aligned. For the offside rules, if he had been in the ideal positions Si he would have seen them separate.

In the configurations 2 and 3, the players result to be aligned, that is they are onto the straight line parallel to the one of the goal line and therefore not under offside conditions, but the linesman perceives them misaligned. In both cases, he will consider the attacker in a more back position with respect to the defender and therefore, even if he is under parallax error conditions, the judgment is of Not offside (NFG) concordant with the reality.

In the configurations 6 and 7 the linesman perceives the players aligned, therefore not under offside conditions NFG, even if in reality they are not aligned as the defender is nearer to the goal line than the attacker. It derives that also in these two cases, the perspective does not generate wrong evaluations.

From these considerations it results that the parallax error produces an error probability equal to 50% in the offside evaluation, supposing that the number of situations of the considered eight error typologies are equiprobable. In reality, in each match the considered eight configurations can take place with different frequencies, therefore the possible errors in the offside evaluation depend upon the configurations which have occurred.

It is further underlined that the distance between players and linesmen can further differentiate the probability of the various configurations, in the sense that in a match the offside events themselves induce a greater number of errors if they occur at a greater distance with respect to the linesman.

Reactivity of the Human Visual System.

In addition to the parallax error, the event dynamics is to be considered, wherein the offside detection is placed. The offside evaluation is a complex event based upon the perception of two events which take place at the same time: the ball detachment from the player kicking it and the determination of the position of the players who potential can generate the violation condition. Supposing that these two simultaneous events can be observed in the view field of the linesman, a possible error source is due to the rapidity of the scene dynamics (speed of the ball and of the players) not compatible with the human perceptive reactivity limited in the order of fractions of seconds with respect to the event dynamics. This error is independent from the professionalism of the linesman, even if with the experience there can be different performances within certain limits.

The ball speed can reach and exceed even 120 km/h. It results that the analysis of the "ball detachment from the player" event dynamics, the reactivity limits of the human being will have to be considered upon determining adequately this event for offside evaluation purposes.

The graph of FIG. 4 shows the ball speed (the possible speed therewith the ball detaches from the player) in km/h on the abcissae and the ball shifting at the different time resolutions of a vision system able to acquire from 25 to 100 images/second (frame/sec.) on the ordinates. The human visual system operates at about 25 fps and from FIG. 12 it can be noted that the ball shifting in the time elapsing between two frames (¹/25 of second) becomes sensible (40 cm) even upon supposing that the ball moves at a limited speed (40 km/h.).

The problem of having to evaluate at the same time the players' position and dynamics is not less negligible. In the graph of FIG. 5 the relative speed among the players which can be reached in the offside context (it has been assumed up to 30 km/h, by considering that the two players can move at 15 km/h, but in the opposite direction) is shown on the abscissae and the run distance, that is the relative shifting of a player compared the other one, is shown on the ordinates. The different straight lines of the graph represent the distances run by the two players at different times of the linesman's reaction. Only in the ideal case of instantaneous reaction capability the linesman could capture correctly the positions of the players. In reality the reaction times, even if the order of fraction of second, can induce to consistent errors: by supposing a reactivity of 0.25 sec if the players move at a speed of 15 km/h the relative shifting occurred between the two players is of about 1 meter.

The FIGS. 6A to 6F show some photograms extracted from a match of the football championship series A 2004/2005 which demonstrate explicitly how the reaction time, even if it is reduced, can induce the linesman to error.

The shown photograms have been recorded at intervals of 0.16 s. Practically, between the first and the last photogram only 83 cents of second have elapsed, yet the configuration of the players in the field has deeply changed: in fact, one has passed from a not offside situation to a net offside situation.

Limited View Field.

It is possible that the detachment events of the ball from the player and the evaluation of the position of the players potentially in the offside configuration cannot be in the view field of the linesman, who is obliged to observe such events in a sequential way by practically introducing a fatal delay for determining the offside event, especially when the event dynamics takes place in strict times and not compatible with the time resolution of the human visual perception. This error is independent from the linesman professionalism, even if there could be different performances within certain limits.

The limit of the view field is to be added to the limit of the human visual system reactivity. Considering the extension of the playing field, the simultaneous events to be determined "Detachment of the ball from the player" and the "evaluation of the position of the players" take place not always in the view field of the linesman. This obliges the linesman to observe these events no more in simultaneous way, but in a sequential way by introducing an additional delay still in the order of fractions of seconds. For quantitative purposes, the same considerations made for the limits of human visual system reactivity, that is, the graphs of FIG. 4 for the relationship between the response time and shifting are valid. The response times, in this case, are to be considered as the sum of the reactivity one and the observation sequentiality one of the events.

Whereas the parallax errors wholly depend upon the linesman performances, the errors due to the reactivity and to the limits of the view field can be only partially influenced by such performances, in particular way the errors related to the limited view field cannot be avoided.

The present invention is based upon the use of algorithms for processing sequences of digital images in real time. Such algorithms must be adapted to the specificity of the subject problem and furthermore they must take into account the various scenarios of environmental visibility which can take place and the various possible configurations of events during the course of the playing actions.

Such events can have a dynamics variable so as to impose the use of not standard tele-detection systems in order to be recorded and captured in very strict time intervals.

Therefore, it results the need for selecting the digital acquisition technologies (imaging) of the images and for processing the images themselves (image processing), being adequate as much as possible to the solution of the technical problem. In doing this it is necessary to take into account different constraints imposed by the problem: the possible variations of the light conditions, the containment of the computational complexity required for processing the digital video sequences, the time limits typical for the natural course of the playing actions.

Methodologies for the Solution of the Offside Problem.

Considering the complexity of the offside events the whole process for identifying such events is divided into elementary sub-processes. In particular, according to the present invention a method for the detection and classification of an event taken place during the motion actions of one or more subjects in an area is provided, the occurrence or not of said event, depending upon predetermined rules related to said motion and to mutual positions of said subjects in a predetermined time instant, the method comprising the following steps:

acquiring a plurality of digital images in sequence of said area during the course of said actions;

processing each image of said plurality of images in order to extract first features apt to identify each one of said subjects and second features apt to determine the instantaneous position of each one of said subjects within said area;

classifying said subjects based upon said first and/or second features; and evaluating the occurrence or not of said event, by verifying said rules predetermined based upon said first and second features and upon said classification.

In particular, in case of the offside detection, the subjects mentioned above can be divided into two categories. The ball, for example, belongs to a first category, the players (in turn classified based upon the team), the goalkeepers and the referee and the linesmen belong to a second category. The discrimination between subjects is carried out based upon the sizes thereof, through a noise reduction procedure based upon a connectivity analysis.

In this case, such activities are articulated as follows:
1. Ball detection. This activity, in turn, has been articulated into the following phases:
   a. Ball recognition in the video sequences;
   b. Ball localization in the various images of the sequences;
   c. Ball tracking in the various possible playing dynamics, even during the momentary occlusions;
2. Analysis of the ball dynamics: detection of elementary events. This activity consists in the determination of the ball trajectories and calculation of the kinematics parameters in order to detect the instants wherein the ball is kicked and then wherein an offside situation can originate; and
3. Detection of the players and of the referee and linesmen. From the analysis of the sequences of digital images the motion structures (ball, players, goalkeeper, referee and assistants) are identified and for some of these structures the dynamics thereof in qualitative and quantitative terms (estimate of the trajectories, speeds or speed variations thereof) is determined. In order to reach such objectives the following algorithms have been studied:
   Background model adequate for the Offside context and the initialization thereof;
   Background updating;
   Determination and localization of the structures involved in the Offside;
   Recognition of the previously determined and localized structures (players and goalkeeper);
   Structure tracking and calculation of some kinematical and dynamic parameters (trajectories, motion, etc.).
4. Detection of the offside event. All information obtained by the previous algorithms, ball Detection and Tracking, Detection and Tracking of the players, and the time Detection of the ball detachment from the player, will be processed for the final evaluation of the possible events of the offside giving a qualitative evaluation and a quantitative estimation according to the game rules.

As far as the imaging technology and the technology for processing sequences of digital images is concerned, according to the present invention, a technology of not invasive type is used. The dynamics of the offside events is acquired by using tele-detection systems positioned in different locations in the stadium and far away from the playing field.

The results of the various tele-detection systems, including the acquired sequences, are made available to users (match judges, federation, etc.) through fixed and mobile multimedial interfaces, in order to be easily usable by any local and/or remote geographical location.

This aspect is fundamental in order to have also the objective crosscheck of the possible offside event, as well as of the false offside.

The choice of the imaging technologies strongly depends also upon the used algorithms and, above all, upon the possibility of using, at accessible costs, viewing systems with advanced technologies. The hardware will have to be compatible with the performances of the algorithms for automatically recognizing the structures (players and ball) and able to operate at the time resolution required by the playing events to be captured, by considering the dynamics of the ball (it can reach even the speed of 120 km/hour) and of the players (they can reach 50 km/hour).

The time resolution of the events to be determined strongly influences the systems for acquiring and processing the images which must be able to operate also in real time, at least for identifying and recording the offside event.

The offside automatic detection requires to control instant by instant the position of the players in the field, but, of course, also to evaluate the ball position and dynamics within the playing field in order to detect critical events therefrom the offside generate, such as, goal shots and passages.

In particular, with regard to the ball, it is necessary:
  detecting in each image the absolute position thereof and the relative position thereof with respect to the players in the field;
  studying the kinematics thereof to determine if the players have modified the motion thereof with shots or passages; and
  determining the trajectories of the shifting which combined with the data of the single players allow establishing the passage addressee and therefore the occurrence or not of the offside event.

For each one of such steps a detailed description of the possible here proposed solutions will be given hereinafter.

Ball Determination in the Images as "Pattern Recognition" Problem

The ball search inside acquired images falls in a wide examination area called "Pattern Recognition" which consists in the analysis of sensorial data in order to detect known structures (patterns).

The process is mainly constituted by two steps: the acquisition of the sensorial data (images, radar signals, acoustic signals, etc.) and the study thereof in different representation domains to compare the course thereof to the one associated to the searched pattern.

The recognition of a determined pattern is strongly conditioned by the time persistence of the pattern properties upon varying the contour conditions (sound, lighting, closeness to other objects, motion, etc.) and by how much the searched pattern is similar to the other ones existing in the data.

The object of the present invention is then to select the pattern features which better determine it univocally with respect to the other possible patterns and which possibly remain unchanged when the contour conditions vary. Often this second requirement is difficult to be satisfied and for this reason in several real applications more or less restrictive constraints on the contour conditions (constant lighting, still objects, not noisy signals, etc.) are necessary, without thereof the performance of the designed algorithms degenerate.

In the problem of detecting the ball the input data are the images acquired by means of digital cameras and the pattern to be searched is the ball.

The first consideration to do is that contrary to all classical applications of pattern recognition (recognition of textual characters, of the face or of simple objects such as pens, telephones, etc.) in case of the ball recognition it is not possible imposing any constraint onto the contour conditions. First of all the ball is subjected to strong lighting variations during the same match: presence-absence of the sun direct lighting (due to cloudy or clear sky), presence-absence of artificial lighting, shadows projected onto the ball and others cause that the ball strongly modifies its appearance also considering small time variations.

Furthermore, the ball motion can cause shape deformations thereof in the acquired images due to its physical properties or to the technological limits of the acquisition system and it is necessary to consider also the possibility of partial or total ball occlusion which obviously compromises the observability of its features.

In addition to what just said, it is also to be underlined that there are different typologies of homologated balls for the football matches and that some properties can vary by passing from a typology to another one (size, colour, etc.).

At last, in order to complete this introductive description of the problem, it has to be underlined that in this applicative context it is desirable to have available a system which processes a high number of images per second (at least 60 images per second) and which provides optimal detection performances to allow detecting with preciseness the actions' dynamics and the presence of possible critical events. The speed for acquiring, and then processing, the images is a fundamental point of the problem: to clarify this concept it is sufficient detecting that a ball moving at 120 km/h travels about 3 cm in a thousandth of second. This means that if only 25 images per second (television frequency) were processed between an image and the other one, the ball could have moved by more than one meter and therefore the detection of interesting events (deviations, etc.) could be vain.

Of course, there are technological limits to the high speed acquisition problem and it can be easily guessed that higher speeds can be reached by reducing the resolution of the acquired images.

The classical approaches to the pattern recognition problems in the field of the digital image processing can be classified in three categories: the approaches based upon the texture analysis, those based upon the shape analysis and those based upon the analysis of the time dynamics of the images and not upon the single image instance.

Each one of these techniques has advantages and disadvantages which have allowed it to find valid application only in determined context.

Considering that the ball detection is a critical application in the pattern recognition field due to the problems mentioned above, the present invention combines the advantages of the three classic approaches by limiting to the maximum the disadvantages thereof.

The approach underlying the present invention for detecting the ball utilizes grey-level images (8 bits in depth, 255 grey levels per pixel) and it is constituted by three operating modules: the first module detects inside the scene the motion objects with circular shape and with radius compatible with the one of the ball. The second module, based upon the shape and texture features, verifies if the areas extracted from the module 1 really contain the ball. The third module calculates frame by frame the parameters describing the ball dynamics based upon the available spatial information, thus making more accurate the search for the same in the subsequent images.

The use of grey-level images allows operating with higher acquisition frequencies by limiting the information in each single photogram. In fact, using the colour images would mean to have to process information equal to about 3 times the current one with grey-level images and therefore the times necessary for the calculation would be higher and the number of the processed images in each second would be lower.

The general layout of the methodology according to the present invention is illustrated in FIG. 7.

The sequences of acquired images are input to a module for the extraction of the image region wherein, based upon the shape information, the ball is more likely to be. Subsequently, the extracted region is validated by means of neural techniques and if it contains the ball the kinematics information (speed, trajectory, etc.) useful for detecting the offside are extracted.

The following sub-sections describe in detail the techniques for extracting and validating the region containing the ball and the obtained experimental results. The problems related to the ball kinematics and the related solutions according to the invention, instead, will be detailed hereinafter in the description.

Extraction of the Area Candidate to Contain the Ball

The detection of the areas containing objects with shape compatible with the one expected for the ball is the fundamental step of the method according to the present invention.

Traditionally the algorithms prefixed for detecting determined shapes (straight lines, ellipses, circumferences, . . . ) are based upon the Hough transform which operates by mapping the image in a parameterized space.

The main limitations of the such methodology are the considerable computational load, the possibility of looking for only well defined shapes (circumferences with fixed radius, etc.) and the result dependence from the contrast existing between the shape and the background.

Considering that during the football matches there is no control of the lighting conditions and that therefore it is possible that the shadow modifies the ball appearance by making it to assume shapes which cannot be described by means of elementary curves, the present invention represents a more robust solution which, starting from the theoretical fundamentals of the Hough transform, allows detecting general shapes. In this way, also the problem of being able to have balls with different diameter is solved.

In FIGS. 8A and 8B it is possible seeing the ball appearance variation upon varying the contour conditions. In particular, FIG. 8A represents a ball filmed with artificial lighting, whereas FIG. 8B shows a ball filmed with solar lighting and partial occlusion due to the footballer interposition.

Theoretical Principles of the Used Technique

As already said, the traditional techniques based upon the Hough transform allow finding known shapes (that is which can be expressed in analytic way) by means of a preliminary operation for extracting the contours and a subsequent transformation into an accumulation parametric space.

For example, in case of circumferences the analytic description is the following:

$$(x-a)^2+(y-b)^2=r^2$$

wherein a and b are the coordinates of the circle centre with radius r.

The Hough transform allows passing from the image representation in the space x, y to that in the space of the parameters a, b, r, which is a three-dimensional space. However, upon searching for circumferences with given radius, one reduces to the plane of the parameters a, b.

Having fixed r for each contour dot (x,y), the algorithm calculates the value of b for each a (it is simply a matter of solving the previous equation with respect to b, the other terms being known). Practically, the algorithm calculates all the possible positions of the centres of a circumference with radius r in the parametric space given the values of x and y.

Once ended this mapping process, the pair (a,b) with higher occurrence number in the previous calculation of the possible accumulation centres is chosen and all dots (x,y) which have contributed in that point of the parametric space are selected. Such dots (x,y) are the dots belonging to the circumference of radius r looked for in the initial space.

To reduce the computational load and the high number of detected false positives, in the last years, several modifications to this algorithm have been proposed. For example, in case of the circumferences, the use of information about the contour orientation is very helpful in looking for the dot (a|b) in the parametric space as well as the implementation by means of convolution allows reducing the computational times.

According to the present invention, in order to obviate to the problem of the variation in the ball sizes in the images, an operator has been defined, able to look for not only the circumference of fixed radius r, but having radius in a given interval of the [Rmin,Rmax] type.

The operator can be defined as $$u(x,y) = \frac{\int\int_{D(x,y)} \vec{e}(\alpha,\beta)\cdot\vec{O}(\alpha-x,\beta-y)d\alpha d\beta}{2\pi(R_{max}-R_{min})} \quad (E1)$$

wherein the domain D(x,y) is $$D(x,y)=\{(\alpha,\beta)\in\mathfrak{R}^2 | R_{min}^2 \leq (\alpha-x)^2+(\beta-y)^2 \leq R_{max}^2\} \quad (E2)$$

$\vec{e}$ the gradient versor $$\vec{e}(x,y) = \left[\frac{E_x(x,y)}{|E|}, \frac{E_y(x,y)}{|E|}\right]^T \quad (E3)$$

and $\vec{O}$ is the vector describing the kernel of the convolution containing a normalization factor to guarantee to search for all circumferences in the range of fixed radius $[R_{min},R_{max}]$:

$$\vec{O}(x,y) = \left[\frac{\cos(\tan^{-1}(\frac{y}{x}))}{\sqrt{x^2+y^2}}, \frac{\sin(\tan^{-1}(\frac{y}{x}))}{\sqrt{x^2+y^2}}\right]^T \quad (E4)$$

The use of the gradient versor has been introduced to obtain an operator the results thereof be independent from the contrast existing between the edge of the searched circumference and the background. This choice allows making the algorithm less sensible to the lighting conditions and to the acquisition conditions by allowing then a greater adaptability thereof to the ball detection problem.

Two examples of masks constituting the kernel vector are shown in the FIGS. 9A and 9B.

The masks' size is $(2\cdot R_{max}+1)\times(2\cdot R_{max}+1)$ and substantially they represent in each point the direction of the radial vector scaled through the distance from the centre. The convolution between the images containing the edges of the objects in the scene and these masks allows evaluating how many dots in the image have the gradient direction concordant with the gradient direction of a set of circumferences represented with the masks.

The peak in the accumulation space represents the centre of the area candidate to contain the ball.

The considerable advantage of this technique is that it is possible looking for objects with any shape by simply modifying the convolution masks. This is a huge advantage if one considers what has been said with respect to the impossibility of having a constant aspect for the ball.

In order to validate the illustrated theoretical considerations, three types of experiments have been carried out which are detailed hereinafter. The masks used and constituting the kernel vector are the ones shown in FIGS. 9A and 9B.

Some images used in the experiments are represented in FIGS. 10A to 10C.

Experiment 1 (FIG. 10A)

The experiment has been carried out on television images (25 images per second in interlaced mode) acquired during the match Udinese-Bologna of the football Italian championship 2003/2004. The images have size 720×576 pixels. The tests have been carried out on about 500 images containing the ball with a diameter variable between 18 and 22 pixels.

The percentages of correct extraction of the candidate area (that is the cases wherein the candidate area really included the ball) have been 93% under conditions of complete ball visibility and 80% under conditions of partial occlusion.

Experiment 2 (FIG. 10B)

The experiment has been carried out on images specifically acquired with fixed and movable cameras (25 images per second in interlaced mode) during the match Udinese-Chievo of the football Italian championship 2003/2004. The images have size 720×576 pixels. The tests have been carried out on about 5000 images. The images have been acquired with a focal able to guarantee to the ball a diameter variable from 5 and 20 pixels.

The percentages of correct extraction of the candidate area (that is the cases wherein the candidate area really included the ball) have been 90% under conditions of complete ball visibility and 75% under conditions of partial occlusion when the ball diameter was greater than 10 pixels. As it was expected, the performances are disappointing when the ball diameter reduces below 10 pixels since several patterns approach to the ball in the appearance and furthermore because it is difficult to maintain shape information with so low resolutions.

Experiment 3 (FIG. 10C)

The experiment has been carried out on images specifically acquired with fixed and movable cameras (60 images per second in not-interlaced mode) during a training match taken place at the stadium San Nicola in Bari. The images have size 1280×768 pixels. The tests have been carried out on about 15000 images. In the images used for the tests, the ball has a diameter variable between 8 and 10 pixels.

The percentages of correct extraction of the candidate area (that is the cases wherein the candidate area really included the ball) have been 90% under conditions of complete ball visibility and 80% under conditions of partial occlusion. In this case great part of the images wherein errors are performed in extracting the candidate area characterized by differently lightened areas (broad shade area alternated by strips lightened by the sun) hindering the acquisition system to operate under the best conditions.

Once detected the area containing the object candidate to be the ball by means of the previously described technique, it is necessary introducing a validation technique allowing to recognize the ball not only from the spherical shape thereof, but also from other properties, first of all the texture thereof.

To this purpose a technique for extracting these additional information and a supervised classifier to separate, based upon the features, the ball object from all other candidate objects from the first phase, are used.

According to the present invention the extraction technique of the features is a linear technique called "Wavelet analysis" which allows extracting the information onto the pattern both in the time domain and in the frequency one. The coefficients extracted from the analysis by means of this technique are then input to a neural network previously trained to classify the coefficients as those related to the ball or other objects in the scene.

The bidimensional wavelet transform allows the image decomposition in an approximation and three details, a horizontal one, a vertical one and a diagonal one. This image decomposition in four distinct partial and particular representations generally is designated as decomposition of first level and is carried out by means of horizontal and vertical image convolution with properly selected filters. In FIG. 11 the image is designated with (0), the approximation with (1,0), the horizontal detail with (1,1), the vertical one with (1,2) and the diagonal one with (1,3) wherein the first index designates the level and the second index designates the decomposition type. On the contrary, FIG. 12 represents a wavelet decomposition of an image until level 3.

The approximation, in turn, can be divided in order to obtain new partial representations of the image. The sum of the partial representations, each one thereof underlines some image features, reconstructs the whole image. By iterating this process, the divisions at the subsequent levels are then obtained. The simplest wavelet transform is the Haar transform.

For the images 2-D, the Haar transform of 1A level decomposes the image into four sub-signals:

Approximation LL: it represents the low frequencies and it is obtained by means of the horizontal and vertical filtering with a low-pass filter. The approximation image is similar to the original signal and it captures most part of the energy of the same.

Horizontal detail LH represents the high frequencies in horizontal direction and it is obtained by means of the horizontal filtering with a low-pass filter and a subsequent vertical filtering with a low-pass filter.

Vertical detail HL represents the high frequencies in vertical direction and it is obtained by means of a horizontal filtering with a high-pass filter and a subsequent vertical filtering with a low-pass filter.

Diagonal detail LL represents the high frequencies in diagonal direction and it is obtained by means of subsequent horizontal and vertical filterings with a high-pass filter.

The decompositions at the subsequent levels are obtained by iterating the decomposition onto the approximation image of the preceding level.

Once ended the decomposition according to the wavelet methodology, the new representation of the starting image is given as in input to an artificial neural network.

An Artificial Neural Network (ANN) is formed by a great number of independent units, connected the ones to the others by means of the connections. This is similar to the structure of the human brain, wherein the units are the neurons and the connections are the axons and the synapses. Each unit is connected to other units, which, in presence of a stimulus (input) of enough intensity from the units placed "before" them, activate and send the signal to the connected units. The connections have the capability of attenuating the signal, so that it moves according to different routes and it switches off in some "directions" (that is it is not sufficient to activate any neurons). An example of neural network is shown in FIG. 13.

A neural network has then an algorithm which modifies the weights (attenuations) of the connections, so that it adapts to provide a certain output in reply to a determined input. There are various types of neural networks and therefore various modes to classify them. The most common classification is the one which divides them into supervised and not supervised ones.

An input is shown to the networks of the first category and the generated output is observed, at this point, by taking into account the output which was wished, the connection weights are updated and a new input is shown to the network. This procedure is called network "training". The "supervision" indeed consists in knowing that which reply is to be expected from a determined input. A neural network, subsequently, is able to give coherent replies even to inputs which had not been presented during the training phase. The most common network of this kind, which is also the most famous one, is the multi-layer one (that is, wherein the nodes are placed in parallel layers, generally 2 or 3, at maximum 4) with forward propagation (feed forward) equipped with an learning algorithm with back propagation which allows the network to train by minimizing the errors made onto the known set of data.

Experimental Results

In the validation phase of the area candidate to contain the ball, areas with size of 25×25 pixels are considered as input, surrounding the maximum accumulation point calculated by means of the Hough transform. The size is fixed to allow having a constant number of wavelet coefficients and it is sufficiently great to be able to contain all balls present in the images considered for the tests. The validation is made by means of a neural network with three layers of feed-forward type and trained by means of the back propagation algorithm by using examples of balls and examples of "not ball" (areas containing the players' shirts, advertisement boards or other).

Both in the test phase and in the training phase a candidate area has been processed by means of the wavelet transform and the extracted coefficients have been given as input to the network.

In the training phase the value of output 1 is associated to the areas containing the ball and 0 to the areas containing other objects of the scene. The network sets then its parameters for connecting the neurons in order to have a value proximate 1 when the inputs are similar to those associated to the areas containing the ball. In the test phase different areas with respect to the training ones are evaluated and a decisional threshold has been set to 0,7: a classification of the inputs as containing the ball has been made to correspond to an output of the network above the threshold and a classification of the inputs as not containing the ball has been made to correspond to an output of the network below the threshold.

In order to evaluate the capability of generalizing the introduced methodology, that is the system capability of recognizing patterns with also different features with respect to those learned during the training phase, a series of experiments has been performed, the results thereof are reported hereinafter.

Experiment 1: Patterns Used in the Training Similar to Those Used in the Test Phase Such experiment has been carried out on a series of sequences acquired at the stadium Friuli in Udine during the match Udinese-Fiorentina of the championship of series A season 2004/2005. Due to the adverse atmospherical conditions the whole match has been acquired under conditions of artificial lighting.

The training set was constituted by about 600 examples (200 examples of ball and 400 negative examples). The test has been carried out on about 15000 frames with percentages of correct recognition of the ball proximate 99% and a very small number of false positives (the system has revealed the ball when it was not present) equal to less 0.5% of the examined cases.

Experiment 2: Patterns Used in Training Different from Those Used in the Test Phase In this experiment the same training set described in the experiment 1 has been then used to verify the ball occurrence on some sequences acquired during the match Lecce-Sampdoria still of the championship of series A season 2004/2005.

In particular the experiment has been carried out in two phases. In the first one 10000 images acquired under conditions of artificial light have been used for the test. Under such conditions the percentages of correct ball recognition in this case are reduced to 90%, with a greater number of failed ball recognitions (false negatives) due to the strong appearance differences of the patterns associated to the ball in the training and in the test due to the different lighting.

The number of false positives, instead, has maintained constant with respect to the experiment 1.

In the second phase, instead, sequences extracted from the second half of the match that is under conditions of artificial light, have been used. In this case the recognition percentages have returned to be compatible with the ones shown in the experiment 1 by underlying that the lighting conditions are the most important variable to be controlled since it is able to vary strongly the pattern appearance. On the contrary, it does not result that the system is sensible to the ball texture.

Experiment 3: patterns used in the training containing different ball typologies acquired in different matches and with different lighting conditions. Tests on patterns similar to a part of those used in the training.

In such case the training set has been constructed by using patterns extracted both from the sequences acquired during the match Udinese-Fiorentina and during the match Lecce-Sampdoria. Patterns extracted both under condition of natural light and artificial light have been used.

The test has been then carried out on about 25000 frames, that is the same used in the experiments 1 and 2.

The recognition percentages have been proximate 95% but parallely also the number of false positives has increased, with respect to the experiments 1 and 2 (about 2%).

FIG. 14 shows some positive (first line) and negative (second line) examples used to train the neural network of the experiment 3.

FIG. 15 shows some images wherefrom the ball has been positively extracted by means of the Hough transform and then it has been recognized by means of the just described neural approach. In the images a white rectangle designates the area wherein the ball has been recognized.

All algorithms for searching for the ball described so far are implemented on each one of the processing units connected to the cameras for acquiring the images.

By considering that the arrangement of the cameras allows having a double view of the same scene, in order to make the algorithms more robust it is useful an interpretation level which allows verifying the coherence of the information coming from the different cameras.

To this purpose a supervision process has been introduced which, once received as input the ball detection data from each one of the processing stations connected to the cameras, it verifies the compatibility thereof by allowing in this way to eliminate the sporadic cases of failed or wrong detection occurred during the experimental phase.

This allows obtaining optimal detection performances, proximate 100% highly desiderable upon considering the importance which has this ball search phase in the whole offside detection process.

The possibility offered by the supervisor of optimizing the ball search processes by exploiting the cooperation between adjacent cameras to limit the ball search areas is not less important.

In fact, in this case the ball search can be restricted only in the areas wherein, based upon the information coming from other cameras, it is more probable that the ball enters the view field by introducing a multi-view tracking concept which allows a considerable reduction of the computational times.

The previously described experiments have underlined the good system capability of recognizing correctly the ball, but at the same time they have originated the problem of its sensibility to the different ball lighting conditions. Considering that during the same match the lighting conditions can vary a various number of times (alternating clear sky or cloudy sky, turning-on and turning-off of the artificial lighting, . . . ) the system could be equipped with a series of neural networks, each one trained to recognize the ball under different lighting conditions and a lighting sensor should make the system autonomous in choosing the neural network. In this way the recognition performances obtained in the experiment 1 would be guaranteed. Of course, the choice of the network number and of the related training sets would be quite complex and however not predicted situations could exist.

Another alternative could be that of utilizing a single neural network trained to recognize the ball under different lighting conditions.

Even if the obtained results demonstrate that the recognition performances are slightly lower (95% of experiment 3 against 99% of experiment 1) and above all some false positives, that is ball detections on patterns containing other objects, are introduced, it is necessary to take into account that several of these errors can be controlled globally by means of the multi-view supervision and locally by means of the integration of the information coming from the other system modules, starting from those which analyse the motion of the ball and of the players which will be described hereinafter.

What previously described as far as the ball detection and the recognition is concerned is based upon the analysis of the information included in each single frame acquired by the optical systems.

However, the offside automatic detection in the football game requires not only to recognize the ball position instant by instant, but also to construct a system able to detect elementary events, such as shots, passages, ball deviations, etc., that is those events thereat the "offside" event can occur or not.

However, the detection of these elementary events requires that information about the ball motion are added to the information about the ball position in order to determine trajectories and speed variations which can be ascribed to interactions between the players and the ball itself.

Fundamentals of the Introduced Methodologies

The study of the ball dynamics is based upon the calculation of the speed and trajectory onto the image plane (in fact, it is not possible estimating the ball trajectories in the 3D space of the scene since the imaging system does not provide multiple acquisitions of the same scene—stereovision—which, among other things, is strongly not recommended in this context due to the computational complexity).

The ball speed has been calculated according to the following formula:

$$V = \sqrt{V_x^2 + V_y^2} \text{ with}$$

$$V_x = \frac{(P_{x_t} - P_{x_{t-1}})}{T} e V_y = \frac{(P_{y_t} - P_{y_{t-1}})}{T}$$

wherein $Px_t$ represents the ball position with respect to the axis X at time t and $Py_t$ represents the ball position with respect to the axis Y. T represents the time elapsed between two consecutive frames which can be calculated by the relationship:

$$T = \frac{1}{\text{framerate}}$$

and it is expressed in seconds.

It results that the speed is expressed in pixels per second. The considered reference system is centered in the pixel placed on top left of the image as exemplified in FIG. 16 for an image with resolution 1600×600 pixels.

The shifting direction can be obtained, instead, as:

$$\theta = \arctan\left(\frac{V_y}{V_x}\right)$$

wherein θ is the angle formed by the vector shifting and the axis X measured counterclockwise according to the usual conventions onto the vectorial theory (see FIG. 17).

The information about the shifting speed and direction calculated at time t have been utilized at first, together with the known ball position, to predict the ball position at time t+1 (Tracking) and subsequently to determine the occurrence of a series of elementary events (shots, passages, deviations, . . . ) therefrom offside situations can generate.

Ball Tracking

According to the present invention, a relationship for calculating the area of the image acquired at time t+1 wherein the probability of finding the ball is maximum based upon the available information obtained from the preceding images is introduced.

The abcissa and the ordinate of the point wherein, in the image acquired at time t+1, the look-up window is centered (equal to 2 times the ball radius) are given respectively by:

$$Px_{t+1} = Px_t + V_x e Py_{t+1} = Py_t + V_y.$$

The failed ball detection in the detected area by means of the prediction of the motion thereof involves the progressive enlargement of the look-up area still centered in the point obtained by means of the shown formula.

In particular, the window is enlarged (until reaching the image ends) by extending the side of the square describing it by a value equal to the shifting between two consecutive frames of the ball which moves at the speed of 120 Km/h. Such shifting obviously depends upon the imaging system and therefore it can vary each time.

Obviously when the prolonged failed ball detection causes that the look-up area be equal to the whole image, practically the condition is returned wherein information about the scene dynamics are not available.

Detection of Events (Shots, Passages, Deviations, . . . )

Apart from increasing the reliability and the execution speed of the ball detection methodologies in the single images, the information about the ball dynamics have been utilized also for introducing a software module for automatically detecting the "ball detachment" event which characterizes the fundamental events such as passage, deviation or a shot. The output data of this module should be then combined with the information about the motion dynamics of the actors in the field (the players) in order to distinguish the various events and consequently detect if there are the conditions so that the offside event has occurred.

The "detachment" event has been detected by verifying two conditions in logic OR and based upon
1) the comparison between the ball speed at the instant t and the average speed thereof in the previous n detections
2) the comparison between the ball direction at time t and the ball direction in the last available detection.

As far as the item 1) is concerned, the speed V at time t is compared with the speed obtained according to the following relationship:

$$\overline{V} = \sqrt{\overline{V}_x^2 + \overline{V}_y^2}$$

wherein $$\overline{V}_x = \sqrt{\frac{\frac{(P_{x_t} - P_{x_{t-1}})}{T} + \frac{(P_{x_{t-1}} - P_{x_{t-2}})}{T} + \ldots \frac{(P_{x_{t-N+2}} - P_{x_{t-N+1}})}{T}}{N}}$$

and $$\overline{V}_y = \sqrt{\frac{\frac{(P_{y_t} - P_{y_{t-1}})}{T} + \frac{(P_{y_{t-1}} - P_{y_{t-2}})}{T} + \ldots \frac{(P_{y_{t-N+2}} - P_{y_{t-N+1}})}{T}}{N}}.$$

In the previous relationships N represents the number of measurements which contribute to calculate the average.

The comparison between V and $\overline{V}$ is obtained based upon an adaptive threshold.

Practically, the event is detected if $|V-\overline{V}|>Th$. In particular, if $|V-\overline{V}|>0.4\overline{V}$.

Practically, the ball detachment event by a player is detected if a speed variation equal to at least 40% of the average speed detected previously is associated thereto.

As said previously, the ball detachment event can be also detected by observing the possible motion direction variations.

In this case the developed module detects the detachment event if there is a direction variation equal to at least a $\pi/6$ radiants with respect to the previous detection.

Experimental Results

The experimental phase of the methodologies now introduced can be conveniently described in two separate phases: the phase for validating the tracking module and the phase for testing the module for the automatic detection of the ball detachment event.

In the first phase practically the preceding experiments have been repeated by integrating the ball detection module with the described intelligent tracking module.

In all three experiments practically the number of ball wrong detections (false positives) has been zeroed, whereas the number of failed detections has passed from 99% to 100% in the experiment 1, from 90% to 92% in the experiment 2 and from 95% to 97% in the experiment 3.

Furthermore, the times for processing an image have been reduced on the average by 50% by allowing to operate in real time (that is, to process in a second all 60 frames acquired by the imaging system used for the acquisition).

In FIG. 18 it is possible observing the graph of the ball speed of about 800 frames extracted from the sequences of the match Udinese-Fiorentina. Speed values equal to −1 designate the lack in sufficient information for calculating the ball speed.

FIG. 19, instead, shows the graph related to the ball shifting directions in the same frames of FIG. 18. Also in this case, values on the ordinate axis equal to −1 designate the lack in sufficient information for calculating the shifting direction.

The tracts without strong discontinuities in the two graphs relate to the playing phase wherein the ball has moved without subjecting interaction with the players in the field and in such phased the ball tracking algorithms operate correctly, by allowing obtaining benefits in terms of performance and computation. The sporadic and more or less strong discontinuities of the courses relate to the time instants wherein external forces (ascribable to the interaction with the players) have modified the ball motion. At such time instants the tracking methodologies fail, but they are a fundamental tool to detect automatically the base events of the football game, such as shots, passage, etc.

The second phase of the experimentation relates to the test of the module for detecting these events. Also in this case the experimentation has been carried out on the sequences extracted from the matches Udinese-Fiorentina and Lecce-Sampdoria.

Table 2 shows the results obtained for detecting the base events.

TABLE 2

|  | Touch and Run | Passage | Goal Shot |
| --- | --- | --- | --- |
| Sequences Udinese-Fiorentina 2004/2005 | 27/28 | 13/13 | 2/4 |
| Sequences Lecce-Sampdoria 2004/2005 | 15/17 | 16/17 | 5/5 |
| Total | 42/45 | 29/30 | 7/9 |

In the performed experiments, in case of goal shots, the failed event detection depends upon the fact that the ball was moving at great speed and therefore the conditions wherein the system for detecting the ball fails have occurred. Hereinafter the possible solutions to obviate to such inconvenient will be described.

In other cases, instead, the elementary events are not detected by the system since the ball was subjected before and after the event to motion parallel to the optic axis.

In these cases the speed variation perceived by the acquired image is almost null and, considering that also the shifting direction remains unchanged, even the human eye is not able to determine precisely if and when the ball touch has really occurred.

However, it has to be underlined that in any case these cases are of little interest since an offside situation could never originate therefrom.

It is also important to underline the fact that in 2 cases the system has detected events ascribable to the interaction with the players when, actually, no player has interacted with the ball (false positives).

The two errors have generated in presence of a change in the ball speed and direction due to the force of gravity on occasion of shots in vertical direction (often called "chip shot").

Such inconvenients, which even if rare could generate a malfunction of the offside detection system, can be eliminated if the information about the position of the players in the scene, obtained from the modules which will be described hereinafter, are considered. If no player were near the ball, it is easy to deduct that the variations in the ball speed and direction are not ascribed to interventions of the players in the field, consequently excluding the possibility of detecting the offside event.

In FIGS. 20A and 20B it is possible appreciating the same graphs of the previous figure with added automatic detections of the detachment event. Values equal to 1 designate the occurrence of the detachment event and differentiate from the not-detection cases associated to the value −1.

It is possible observing that often base events such as shots, passages and other kinds of interactions between the ball and the players are often characterized both by a variation in speed and direction.

From the performed experiments it is possible concluding that the system according to the present invention is able to detect precisely the instants wherein events take place therefrom the offside can generate, such as shots, passages, deviations and other. Furthermore, the techniques based upon the study of the ball dynamics have allowed further improving the performances of the ball correct detection.

Additional improvements can be made by integrating information related to the players in the field which are obtained by means the technique and the methodologies which will be described hereinafter.

As already said, the players and all other actors in the scene (referee, linesmen, . . . ) belong to a second category of subjects. Their correct detection is a fundamental step for detecting offside actions. In fact, if on one side it is necessary detecting and following constantly the ball position to understand when a passage or a shot is performed, at the same time it is also of fundamental importance detecting the players and the position thereof on the playing ground, to decide if one is facing an offside situation or not.

In this sense it is necessary pre-arranging a system module which is able automatically of:
1. detecting the actors present on the scene, in any situation of lighting and atmospherical conditions;
2. classifying the various actors detected as belonging to a team, or another one, or to the referee and the two linesmen;
3. handling possible (probable) occlusions between the same agents;
4. determining clearly and univocally the position of the players themselves, to be able to decide if there is or there is not an offside situation.

As it can be easily guessed, all these four items are equally important and they are strictly correlated, and therefore in order to function at the best it is necessary that each one of these steps provides consistent results. For example, if the system is not able to handle lighting exchanges, it will not able to detect correctly the presence of objects onto the scene, consequently it will not be able to detect and classify correctly the players and therefore as a whole it will not provide acceptable results.

Hereinafter an approach for handling this delicate phase will be proposed and furthermore some preliminary results obtained with the proposed method will be provided. The crucial aspects of the proposed algorithms will be further underlined, by evaluating adequately restrictions and operability conditions.

Also for such phase for recognizing the subjects belonging to the second category, a sub-phase, for extracting a region candidate to include such second subject is provided, based upon an analysis of the intensity levels of each dot in the image under examination. Such analysis can be performed on images with grey levels, acquired by means of sensors in form of Bayer grids. Alternatively, it can be performed on colour images, by operating on RGB or HSI bands.

FIG. 21 represents a flow chart of the salient steps of the process for detecting and classifying the actors in the field. Such process is integrated in the global scheme of the offside detection system.

As it is evident from observing the figure, the system for classifying the actors provides the following main steps:
  Detection of motion object (Motion detection);
  Classification of the motion objects;
  Tracking.

The first phase consists in detecting and extracting the motion outlines. Such operation, which is called "motion detection", is constituted by a series of steps which will be analysed in detail hereinafter in the description. The objective of such phase is to segment the image, that is to detect and label individually each one of the motion objects present in the scene. Still in such phase it is provided to eliminate possible noise and to eliminate shadow residues from each outline.

The so-obtained outlines are ready to be classified. First of all sufficiently representative features are extracted therefrom, therefore such features are sent to a neural SOM-network based classifier. At the end of this phase, each outline will be assigned to a relative belonging class (team A, team B, referee and linesmen class).

Once having this information, each outline is passed to a module which deals with the analysis of the dynamics of the in-field players' shiftings in order to predict the positions thereof in the subsequent instants based upon the information relating to the previous instants. This module, by extracting and examining the kinematical parameters of each motion object, allows interpreting the evolution of the playing dynamics and facilitating also the task of the other algorithms involved in this processing phase.

The localization on the image plane of each actor, the belonging class thereof and the direction of the shifting thereof are the global outputs of the process.

This information, combined with that coming from the previously described modules relating both to the ball recognition and tracking and to the detection of the elementary events such as shots and passages, constitute the bases whereon the system is able to decide automatically upon the possible offside position.

Additional details on the proposed algorithms will be provided hereinafter and the results obtained on images acquired in different matches of the Italian football championship of series A 2004/2005 will be illustrated.

The first step towards the actors' classification inside the scene, as it is clear from FIG. 21, is to extract the motion outlines in a way as much detailed and reliable as possible; to do so, a Motion Detection algorithm is used. Such algorithm is graphically represented in FIG. 22.

From an analysis of the chart of FIG. 22 it is possible to detect the salient steps of this algorithm:
  Creation of the background model;
  Subtraction of the background;
  Updating of the background model;
  Removal of the shadows;
  Segmentation of the motion outlines.

In literature such problem is very topical and still open; it has great importance for many applications, such as for example the telesurveillance, the traffic control, etc.

It is based upon the motion detection by means of the punctual subtraction of the chromatic values detected at the instant t and those of a reference model (background), constructed dynamically and up-dated constantly in order to handle automatically the changes of the acquisition context, first of all the lighting conditions.

The output of this process is a bordered image comprising the players' outlines, which however require an additional processing in order to eliminate possible noise, and above all the shadows which, even if they are portions of the motion image, alter the information shape and the contents of the outlines, not allowing the subsequent classification and localization.

Downwards this process, the image pixels with strong chromatic differences with respect to the reference model are aggregated in regions based upon spatial information.

At the end of this motion detection phase, the outlines of the actors present in the scene are disposable, which then can be passed to subsequent classification and tracking modules.

At this point the subsequent step is to classify the players in one of the 5 possible classes: player team A, player team B, Referees, goalkeeper team A and goalkeeper team B.

Creation of the Background Model (Background Creation)

The detection of the motion objects (Motion Detection) is a classic problem in the field of the computer vision. One of the more efficient approaches for the solution to this problem consists in subtracting a reference image, called background image (for this reason the technique is shown in literature as Background Subtraction) to each acquired image.

The initial step of such technique is exactly to create the background image in an opportune way. Such phase has a fundamental role for the whole motion detection process, in fact, starting from a wrong background models the motion objects could be detected not correctly or however they would be detected without maintaining the shapes by making impossible the subsequent processings which are required to detect the offside cases.

Differently from most part of the already existing techniques, providing the supervision of an operator for creating the background model, the technique according to the present invention, instead, is based upon a model construction of the not-supervised type.

Starting from some hundreds of images, one has chosen to perform a time average on the three RGB channels, by storing the average and variance values for each dot. In order to exclude the players from the so-created model, a time window (with width equal to 100 photograms) has been made to scroll on the whole training sequence, by storing, in turn, the average and variance values related to the statistical points of the whole window. In this way the players or any other motion object has been excluded from the calculation. Such window is made to scroll several times, until the above statistical values have been correctly assigned to all dot of the image. The so-obtained model is quite solid and robust to be utilized by a background subtraction algorithm. Formally, if $I_0$ designates the first photogram of each sequence of W frames, it results:

$$M_R(x, y) = \frac{1}{N_W} \sum_W I_R(x, y) \text{ if } |I_R(x, y) - I_0(x, y)| < th$$

$N_W$ represents the number of times the dot (x,y) has remained constant in the window with a length equal to W frames. If such value is higher than 90% of W, then the value $M_R$ is considered a reliable evaluation of the average intensity value for the dot (x,y) on the band R, otherwise it is eliminated and the same is re-calculated in the subsequent window of W frames. An analogous discourse is performed for the other two colour bands (G and V) and for the various variances. At each step of the algorithm the number of pixels thereto the average and variance statistical values have been assigned increases. The features of the context under examination (very fast motion subjects) and the numerous performed texts have underlined that a relative low number of photograms is sufficient to model completely the background. Such number, in each performed test, has never been higher than 1000, that is 10 iterations with windows with size 100. Considering the acquisition speed (60 frames/sec.), this means that about 15-17 seconds of observation are sufficient to create the reference model.

Such technique has revealed robust also under critical conditions such as the presence of animated advertisement hoardings on the field edge.

Background Subtraction and Updating

Once created the reference model, as explained previously, it is subtracted from the current image. In this way a difference image is obtained, wherein each pixel is labelled or not as belonging to motion objects which in the case of the football match images should coincide with the players and the referee and the linesmen.

The approach chosen for this phase operates separately onto the 3 RGB colour bands and it considers a pixel as moving if it deviates from the model wished value in at least one of the three bands (practically it concretizes in a logic OR between the results obtained for each one of the three bands). In other terms a pixel is labelled as moving if at least one of the bands deviates from the wished value by at least 2 times the variance value wherein the wished value and the variance in each band for each pixel are obtained automatically in the model-creating phase described in the previous paragraph. This approach, then, eliminates the problem, found in literature, of having to establish the not-adaptive thresholds which do not allow handling automatically different acquisition contexts. Formally, if $I_{OUT}(x,y)$ designates the binary output of the subtraction operation (1=static dot, 0=notion), $M_R$ and $V_R$ respectively the average and the variance related to the band R (analogous notation for the other 2 bands) for the dot under examination, it is obtained:

$$I_{OUT}(x, y) = \begin{cases} 0 & se \quad |I_R(x, y) - M_R(x, y)| > 2 * V_R(x, y) \lor |I_G(x, y) - M_G(x, y)| > 2 * V_G(x, y) \lor \\ & |I_B(x, y) - M_B(x, y)| > 2 * V_B(x, y) \\ 1 & altrimenti \end{cases}$$

Once detected the motion pixels (which, it is worth reminding, are currently still single pixels, not yet objects, for us), it is then necessary to perform the updating of the background model: such phase has a fundamental role, since as a matter of fact it is responsible for the time consistence of the background image. Without such updating, considering that the environmental conditions (enlightening in primis) tend to vary continuously, it is very probable that after few frames the created background model becomes obsolete with respect to the new conditions and then that the system starts to provide very noisy subtraction results between current image and the model which cannot be used for detecting the offside.

In other words, each environmental change has to be continuously englobed in the background model, wherein under environmental change the variation in the lighting, both natural and artificial, has to be meant, as well as each change due to the atmospheric agents, or at the physical acquisition conditions of the camera. In the system proposed to perform the updating of the background model an exponential filter is utilized, by mediating, with different weights, the current value in the background image and the value recorded in the current frame. In this way, by acting onto the value of the coefficient weight, one can think to give a greater importance to the current value rather than to the historical one. Formally, if a designates the coefficient weight, by keeping the same notation seen previously (excluding the time indication, now necessary but omitted in the preceding formula in order not to burden the same, since it was equal for all values, all being referred at the same time instant) there will be:

$$M_R^{t+1}(x,y) = \alpha * M_R^t(x,y) + (1-\alpha) * I_R^t(x,y)$$

In order to avoid that objects stationing onto the scene for a certain number of frames be englobed in the background, as it happens for several methodologies existing in literature, the updating is performed only for the pixels which the preceding phase has detected as static. In this way, a motion object, even if it had to stop for a quite long time period, will never become part of the background model and therefore it will continue to be seen always as motion object. If one wishes to include such observation in the updating formula, it becomes:

$$M_R^{t+1}(x, y) = \begin{cases} \alpha * M_R^t(x, y) + (1 - \alpha) * I_R^t(x, y) & \text{if } I_{OUT}(x, y) = 0 \\ M_R^t(x, y) & \text{if } I_{OUT}(x, y) = 1 \end{cases}$$

Analogous discourse is to be made for the variance and subsequently extended to the remaining colour bands.

This way of proceeding allows then not to include a player, for example the goalkeeper, into the background model, who remains still for a certain number of frames.

Generalization to Other Colour Spaces

The approach described previously has been initially implemented by working onto the three bands with RGB colour. In order to pre-arrange the system to operate in different contexts it has been chosen to implement the background subtraction procedure also in other operating environments.

As first approach it has been chosen to operate in another colour space, in particular in the HSI. The procedure described previously substantially does not change, simply the information term characterizing before each dot was formed by the RGB chromatic components, whereas now that same term is formed by the three HIS components. The results of the comparison between the current image and the reference background model are put in logic OR therebetween, so that it is sufficient that one of the three components deviates from the wished value to cause that that dot be classified as motion. Formally:

$$I_{OUT}(x, y) = \begin{cases} 0 & \text{if } |I_H(x, y) - M_H(x, y)| > 2 * V_H(x, y) \vee |I_S(x, y) - M_S(x, y)| > 2 * V_S(x, y) \vee |I_I(x, y) - M_I(x, y)| > 2 * V_I(x, y) \\ 1 & \text{otherwise} \end{cases}$$

Subsequently, in order to pre-arrange other possible solutions, above all to face possible problems linked to computational times, it has been chosen to implement the procedure of the modeling background and subtracting of the same directly onto the native image acquired by the optical sensors, that is onto the Bayer grid. In this case all operations described previously operate on each single dot, as if it were an image with grey levels. The result of this phase will be a binary mask which will then utilized to decide which image portions have to be coloured and which ones not (in this way there is a double advantage: on one side time relative to coloration has been gained, since it will be provided to colour only a part of the image; on the other, working onto one single component rather than three components greatly reduces the calculation times for modeling, subtracting and updating the model).

Segmentation

Once detected in each frame the pixels with strong variations with respect to the background model according to the procedures described in the previous paragraphs, subsequently it is necessary establishing spatial relationships between motion pixels in order to determine which ones belong to the same object. This phase is often reported in literature as segmentation and in order to perform it an approach based upon the connectivity analysis has been chosen.

The connectivity analysis is a methodology which associates adjacent pixels based upon the distance thereof and then it allows detecting and labeling the objects in the scene starting from a map of the motion pixels; furthermore, it allows purifying the image from possible pixels which cannot be associated to real motion objects and due to the noise introduced in the system by the acquisition system. This last step is performed by creating a threshold on the area of the detected regions which allows keeping areas compatible with the sizes of the persons in field only.

Practically, the procedure scans the whole image looking for a dot labelled as motion dot; once found, a recursive algorithms activates (an iterative, simpler version has been implemented) which, starting from this dot, marks it with a univocal code and it examines all dots adjacent thereto and which have not yet ever labelled: if they are motion dots too, they are labelled and examined in turn. When this procedure ends-up, the main scanning on the whole image starts again as from it had been interrupted, again looking for a motion, not examined/labelled, dot. This process continues until examining the whole image.

The segmentation has also the task of labelling each detected object and of calculating additional information which will be then useful in the subsequent tracking phase (area, coordinates of the centre of gravity, width, height, . . . ).

Practically, by means of the segmentation procedure the data interpretation is raised by one level, passing from the pixel concept to the region concept: only downwards such important step it is possible activating the procedures for classifying the players and the referee and the linesmen which are the fundamental step for interpreting the scene and for determining the possible offside situations.

Evaluation of the Methods for Detecting the Footballers and the Referee and the Linesmen The tests related to the results obtained by the segmentation of the footballers will be now described. The tests have involved 4 different sequences the details thereof are illustrated in FIG. 23.

FIG. 24 shows the results of the segmentation phase illustrated previously obtained on some images extracted from the test sequences shown in FIG. 23.

In particular the experiments performed onto the sequences related to the matches Udinese-Chievo and Lecce-Sampdoria have produced, in general, more reliable results with respect to those obtained with the sequences acquired at the stadium in Bari. This is due above all to the optics of better quality used for shooting the two above matches. Upon examining the image a) of FIG. 3 it is clear that in the relative sequence there are not big problems: the only ambiguous case is the detection of a single blob when two players overlap.

Such situation can be handled by analysing the dynamics of the players' motion by means of specific methodologies (tracking) which will be detailed hereinafter.

Upon examining the image b), acquired at the Stadium San Nicola in Bari, it can be noted instead that on the left side, the shadow of a player is detected as if it were a real object. The presence of shadows, greatly altering the objects' contours and consequently the measurements of the players' position, can generate serious errors for the purpose of the offside evaluation; to this purpose, a specific technique, described subsequently, has been developed. Moreover, from a global examination of the output images, it has resulted that the lighting conditions of the stadium in Bari have made the results a little less reliable than those obtained with the images of the match Udinese-Chievo.

In particular, sometimes in the light-shade transition regions the motion presence has been detected, to say the truth not-existent; still due to not perfect lighting, sometimes player has been broken into two adjacent blobs. Both these problems, however, have been solved by implementing the module related to the tracking.

Table 3 shows the computational times related to each single process phase. For each involved operation, time in ms used on the average is shown (evaluated on 50 executions of the same algorithm on the same images). The size of the test images is of 1600×600 pixel. The test platform is a PC based upon a processor Intel Pentium® IV 1.5 GHz, with 768 Mb memory RAM, operating system Windows XP®.

Table 3, however, by simple way of representation, shows only the computational times required by the phases to be performed necessarily in real time. The operations whereupon particular computation requests do not fall (for example, the creation of a background initial model, which can be performed in the field a few minutes before the match start and which is made just once) have been excluded from the table.

TABLE 3

| Operation | Times |
|---|---|
| Background subtraction | 72 ms |
| Background updating | 76 ms |
| Connectivity analysis | 47 ms |

The data shown in Table 3 are purely representative, having been obtained without any optimization on the code; for example, a series of improvements to decrease the calculation times could be devised, such as:
  performing the updating of the background model periodically, and not at each frame;
  minimizing the dynamic allocation during the processing;
  exploiting the information related to the tracking to limit image areas wherein the processings are to be performed.

However, they give a draft indication about the computational complexity of the implemented algorithms and they leave the doors opened to the possibility of working in real time without turning to any compromise or to specialized hardware.

Shadow Removing

As seen previously, the segmentation phase of the motion objects exploits the information deriving from the comparison between the image under examination and the available background model. In this way the players are extracted together with their shadows and this involves an alteration of the physical features of the players themselves, with heavy consequences for the players' classification and the subsequent offside detection. Therefore, it has resulted to be necessary introducing specific algorithms for removing the shadows able to operate also in presence of different lighting conditions (artificial light, intense natural light, soft natural light). The introduced algorithms for removing the shadows are based upon two different approaches: the first one is based upon the texture analysis, whereas the second one is based upon the study of the region topology. Both approaches will be detailed in the following two sub-paragraphs.

Texture Analysis

The first approach used for removing the shadow areas originates from the observation that the shadows have not their own coloration and texture features like the other objects present on the scene, but they are not else than regions wherein there is only a variation in the light intensity with texture and coloration features almost unchanged with respect to the background model.

In other words, the shadows have not their own features, but simply maintain the features of the corresponding background regions, with only a variation in the spectral content of each dot (in the case in point a dimming, since the light quantity spreading over the ground is less in presence of shadow).

By exploiting this feature of the shadow regions the technique developed for each region detected as "motion" region, controls the content in terms of texture: if such texture is different from the background model in the same region, then one is facing an object with its own well-defined features, for example a player; on the contrary, if such region has the same texture in the current image and in the background model, then one is facing a shadow region. In order to perform such control, the region under examination is initially divided into a series of sub-regions, based upon the uniformity of the photometric gain:

$$\Lambda^t(x, y) = \frac{I^{t+1}(x, y)}{B^t(x, y)}$$

wherein $I^{t+1}(x,y)$ is the spectral content of the pixel under examination and $B^t(x,y)$ is the corresponding value in the background model.

In this way, areas with similar photometric gain are grouped by dividing in this way each motion region into sub-regions, with the purpose of separating the shadow areas from the remaining part of the object (which, in turn, presumably will be divided up into several sub-regions).

At this point, for each one of the previously detected sub-regions, the texture content is evaluated: if such content is similar in the current image and in the background image, then the sub-region will be labelled as "shadow" and removed.

Such comparison between textures can be performed in various way, for example by evaluating the correlation level between the regions; but in order not to burden the system with particularly complex calculations, it has been chosen to implement a less onerous algorithm from the computation point of view and based upon the comparison between adjacent pixels of the same region.

Practically, by comparing the relationships between adjacent pixels belonging to the same sub-region, if such value is similar in the current image and in the background image, then the dot is candidate to be shadow. Formally, for each dot of the sub-region under examination, it is evaluated:

$$D = \begin{cases} \left| \frac{I(i,j)}{I(i,j+1)} - \frac{B(i,j)}{B(i,j+1)} \right| & \text{if } j < \#col \\ \left| \frac{I(i,j)}{I(i+1,j)} - \frac{B(i,j)}{B(i+1,j)} \right| & \text{if } j = \#col \end{cases}$$

if D is greater by a certain threshold value, then the dot (i,j) is strictly correlated to the dot (x,y), and therefore they will be marked as shadow points.

At the end of this control, a verification of the number of pixels labelled as shadow in each sub-region allows deciding if it will have to be removed or not (for example if it includes 90% of shadow dots, then it will be removed).

FIG. 25 shows the same image of FIG. 23 (D) but after having performed the shadows' removal: it can be noted that the players on the left bottom are now separated therebetween and the relative bounding boxes are centred precisely around the real outlines, without the shadow.

In order to make the system more robust variants on the previously described algorithm have been tested. In particular, relatively to the segmentation of each object into sub-regions in order to separate the shadow from the remaining part of the outline, a technique based upon the spectral uniformity has been implemented successfully. The creation of the sub-regions has not been based upon the uniformity of the photometric gain, but upon the uniformity of the spectral content: adjacent pixels with similar contents in terms of RGB term have been agglomerated into a single region. Such technique could seem less solid from a scientific point of view, but it guarantees good results thanks to the particular applicative context: in fact, in a football field it cannot be assumed that the playing ground be almost uniform in the coloration and therefore the same will occur also in presence of a shadow region. By proceeding in this way a very good segmentation has been obtained, similar to the previously seen one, based upon the uniformity of the photometric gain.

Topologic Analysis

The described techniques for removing the shadows produce the best results in presence of not particularly marked shadows, then mainly during the matches with artificial light or with little intense natural light (for example with cloudy sky). In case of intense solar lighting, the texture content of the shadow regions is lost, since the histogram tends to saturate towards low values and the shadow region appears always almost wholly black.

Under these conditions in the shadow areas it is no more possible distinguishing the microstructure existing in the image and the relationship signal-noise tends to assume extremely low values.

In order to eliminate the shadows also under these lighting conditions an alternative technique has been implemented, based upon the geometrical-spectral prediction of the shadow position in the image. Starting from sure data which are the match date and time (that is the position of the luminous source with respect to the playing field), it is possible to construct artificially a model of solar lighting and to predict shape and direction of the footballers' shadows. Such geometrical information will be then integrated by a control of spectral type, aimed at selecting among the dots, candidate to be removed as shadows, those which really have a reduction of the intensity levels of the RGB term with respect to the background image.

Also such technique has been tested on the test sequences and also in such case the results have been positive.

Classification

In order that the whole system is able to detect the possible offside situations it is necessary introducing a classifying module of the objects previously detected by means of the already segmentation algorithms.

The objective of the classification phase is to distinguish, based upon the chromatic information, the typology of the agents existing on the scene: players, referees, goalkeepers.

It is necessary noting that this phase can be seen as constituted by two sub-processes, one aimed at extracting the features which better represent the object to be classified and another one which consists in the real classification, as it is evident from observing FIG. 26. Hereinafter the single phases will be examined in detail.

Features Extraction

The object of such phase is to detect the information which can best characterize the object to be recognized, in our case the footballers and the referees.

The selected features must have well precise properties; in particular, they will have:
  to be able to be extracted easily and quickly; this requirement is of fundamental importance, in order to not preclude in advance each possibility of operating in real time.
  to keep information on the "spatial" distribution of the chromatic features of each motion region in order to facilitate the recognition process. Such shrewdness avoids, for example, that a player with yellow shirt and black shorts is confused with one with black shirt and yellow shorts, which will be very probable if the selected features contain exclusively overall information about the outline coloration, without any reference about their physical distribution.
  be sufficiently representative, that is having capabilities of dividing the output space into clearly separated n (number of looked-for classes) iperspaces, without (or limited to the minimum) overlapping of the same (clusters' compenetration).

The solution according to the present invention is to utilize a variant of the projections of the vertical histograms. In particular, a matrix of h lines and 3 columns is associated to each outline to be classified, wherein h is the height of the outline under examination. Then, for each line, the three corresponding values will include average values, for each band with RGB colour, of the dots of the object under examination. Formally, x(i,j) designates the element in position (i,j) in the matrix, it will be given by:

$$x(i,j) = \frac{1}{N} \sum_{k=1}^{N} I^j(i,k)$$

wherein N is the pixel number of the object in the line i, and the notation $I^j(i,k)$ designates the intensity value, relatively to the band of colour j, of the pixel of position (i,k) in the original image.

The here described procedure for extracting the features has been shown in a wholly similar way in the space of HSI colour, in order to prepare the environment for new contexts in case the RGB space demonstrates not suitable to the purpose.

The Classifier

Once determined the descriptive features of each motion region in the scene it is necessary verifying their capability in discriminating the looked-for classes by choosing properly a classifier.

Even if usually the supervised approaches are more precise and immediate, according to the present invention an approach of not-supervised type will be used: the SOM classifier.

Such choice has been dictated by the problem nature and by the need of limiting to the minimum the human intervention. Practically, it has been chosen to increase the complexity of the system's design phase to the advantage of a greater usage simplicity by the final user.

In particular, one has aimed at implementing a system which, together with the advantages deriving from the classifier's intrinsic features, has a series of devices to make the whole further strengthened. The main advantages of such solution are:

- high flexibility in the classification phase; at the end of the training phase, the system will have properly divided the output space and it will have constructed a representative for each one of these classes; at this point, each new element is compared to the various representatives, the most similar one will be considered the winner.
- low dependence from the quantitative features of the training set; few elements for each typology of objects can be sufficient to obtain a representative however significant for such class.
- low sensibility to acquisition conditions, in particular to the lighting. With the time passing, the light conditions in a match change sensibly, to the extreme point that it is possible starting with natural light and ending with the lights; in this sense, it is provided assigning a reliability index to each performed classification. Each element the index thereof has resulted to be very high (in our experiments higher than 95%) has been inserted again in the training set and a new training has been periodically performed, exactly to face such variations.
- high training flexibility; since no manual intervention of the human operator is requested, but everything is based upon an automatic selection of the elements, it could be performed immediately before the match start, when the teams prepare themselves in the field. On the contrary, in case of supervised approaches, it would be necessary to arrange it manually in advance, based upon information about shirts, shorts, etc., which presumably should be provided before the match; therefore, also the problem of handling a database of all the possible uniforms of each team, for all teams, and under all possible lighting conditions, would arise, which is a quite onerous work, difficult to be handled.

SOM Classifier

The SOM (Self Organizing Map) classifier is a particular not-supervised classifier which incorporates inside thereof also great part of the qualities of the classic neural networks.

A SOM network is constituted by a bi-dimensional layer of neurons connected to a common set of inputs (FIG. 27).

Each input vector "excites" a local group of neurons. The map self-organizes in the sense that, after a not-supervised learning phase, which provides the presentation of an input set to the network, the spatial positions of the groups of excited neurons of the map represent a topological map of the input vectors. This means that the distance relationships in the inputs' n-dimensional space are represented approximately by distance relationships on the neural bi-dimensional map.

The neural map is a bi-dimensional grid of neurons. The reply of a neuron in the position 1 of the grid is the scalar product:

$$y_1 = X \cdot W_1 = |X||W_1|\cos \Theta$$

of the input vector X and of the weight vector $W_1$ of the neuron. $\theta$ is the angle comprised between X and $W_1$. The weights $W_1$ are the weights on the connections between the inputs and the neuron.

The learning process, together with the presentation of an input X, provides to modify the weights of the neurons near the position m of the grid, therefore the reply $X \cdot W_m$ is at maximum. More precisely, the weights are modulated in terms of the neurons' distance from m. To this purpose, a function him is utilized, which assumes greater values for positions 1 near m; usually the function is a Gauss function:

$$h_{lm} = \exp\left(-\frac{\|l-m\|^2}{\sigma^2}\right)$$

the variance σ/2 thereof controls the radius of the group of excited neurons.

The function $h_{lm}$ defines the a neighborhood of the dot m inside thereof the neurons' weights are adapted in decreasing way with the distance from m. In particular, the vectors of the neurons' weights of the neighborhoods are brought closer the input vector.

Consequently, "near" neurons will tend to specialize in recognizing similar inputs. This specialization will allow defining, at the end of the learning process, the mapping between the inputs' space and the map's discretized space: each vector X will be mapped in the location m associated to the neuron therefore $X \cdot W_m$ is at maximum. Such neuron is called "winner neuron".

Practically, in the SOMs it occurs that near neurons in the map learn recognizing near areas in the inputs' space. In this way, as one understands from what said previously, the self-organizing maps learn both the distribution and the topology of the vectors therewith they are trained.

It is necessary noting that the main factors which distinguish a SOM network from a usual not-supervised clustering algorithm are two:

- the winner selection does not take place simply by means of a definition of a metric (distance) and a banal threshold on such value, but by means of a neural process, which is a quite much more complex, but also more robust and reliable operation, as all theories on the neural networks, which have developed in the years, demonstrate.
- the updating involves not only the winner node, but also all the nodes existing in a neighborhood of the same, in a way proportional to the winner distance; the definition of the radius which such neighborhood should have is very important: a too high value could involve the updating also for nodes which could be destined to the recognition of objects of another class, causing dangerous oscillations in the training phase, which could transform into a not correct definition of the classes. On the contrary, a too low value could have the consequence of not allowing an adequate (and fast) grouping of the neurons, thus by making necessary a much longer and robust training.

Experimental Results for the Classification Phase

The previously described classification system has been tested on real images acquired at the stadium during the football match Lecce-Sampdoria, series A, championship 2004-2005.

In particular, the motion regions have been provided as input during the phase for extracting the features and for each one thereof the related matrix has been extracted.

Subsequently, given the features of the classifier, which being a neural network implies a prefixed number of inputs, the outlines of the elements randomly selected for the training have been normalized so as to have everyone the same length. In other words, a normalization on the footballers' height has been performed, in order to compare therebetween the areas belonging to the same part of the outline. Without such operation, the results would not have consistence, since the same input of the network could include information, for example, related to the abdomen of a footballer in one case, to the head in another one, or even to the shorts in still another one: therefore, every meaning to be associated to such input would not exist.

The so-obtained vectors have been passed to a SOM network. According to the present invention a bi-dimensional network with grid-like topology is used, constituted by a matrix of 9*11 neurons. At the end of the training phase, it has become necessary to use a clustering algorithm in order to associate logically a block of adjacent neurons on the plane to the same output class.

Practically, what happens to the system after the training phase is that the neurons have moved from the initial configuration and they have grouped in a certain number of groups, as many as the output classes. At this point, by providing any other test element to the system, as reply it would result the neuron which has most excited, but this information would lose importance if a clustering had not been performed in advance in order to associate logically each group of neurons to a particular class.

As clustering algorithm one has chosen to use one of the most known in literature, the k-means. In this case, it is necessary to fix the number of wished output classes, in our case 5 (footballer team A, footballer team B, goalkeeper team A, goalkeeper team B, the referee and the linesmen).

According to the present invention the system is pre-arranged to operate, in case, only with the clustering procedure, without the use of SOM. In this case the feature vectors would be inputted directly to the k-means algorithm, which then would distribute them in the prefixed number of classes, without the neural contribution provided by the SOM. Such technique, which after all has provided quite similar results to those obtained with the SOMs (which means that probably the features' quality has a relevant importance, rather than the classifier per se), could be necessary in case one chooses faster and more incremental solutions, since the training necessary to train a SOM is quite high and therefore one cannot think to exploit the match progress to modify the training of the classifier itself. This, instead, could be made in case one decides to work with the clustering algorithm only.

The tests have been carried out on the images acquired before a football match during thereof the lighting conditions have changed greatly, passing from a first half with natural light to a second half with artificial light.

As a whole, 10680 images have been examined, in each one thereof several agents were present (footballers, referee, ... ). Table 4 shows the results obtained from the classification process, whereas Table 5 shows the summary of the detailed features of the training set. It is necessary to specify that in the examined images the goalkeeper of team B was never present, that is why one has chosen to limit the number of output classes to four.

TABLE 4

|  | Player team A | Player team B | Goalkeeper team A | The referee and the linesmen |
|---|---|---|---|---|
| Test elements | 25782 | 23244 | 1680 | 5822 |
| Correctly classified | 25750 | 23161 | 1680 | 5325 |
| % of success | 99.87% | 99.64% | 100% | 91.46% |

TABLE 5

|  | Player team A | Player team B | Goalkeeper team A | The referee and the linesmen | Total |
|---|---|---|---|---|---|
| Nr. examples | 56 | 44 | 14 | 6 | 120 |

A quite immediate representation of how the performed tests distribute can be obtained by analyzing the scattering matrix:

| REAL DETECTED | Player team A | Player team B | Goalkeeper team A | The referee and the linesmen |
|---|---|---|---|---|
| Player team A | 25750 | 71 | 0 | 0 |
| Player team B | 15 | 23161 | 0 | 0 |
| Goalkeeper team A | 7 | 12 | 1680 | 497 |
| The referee and the linesmen | 10 | 0 | 0 | 5325 |
| TOTAL | 25782 | 23244 | 1680 | 5822 |

Evaluation of the Classifier

An accurate analysis of the results has brought to the following conclusions:
- the players of the two teams are recognized perfectly in most part of the cases;
- the footballer's posture does not assume a particular importance: it has been noted that the footballers are recognized correctly even if they are in particular positions, such as for example in slide position or even when they are jumping to strike with the head.
- the footballer size does not influence the recognition position; the importance of such observation is in that a footballer is correctly recognized both if he is in the field portion nearest to the camera (biggest outline) and if he is farthest (smaller outline). The choices performed relatively to the imaging phase have allowed having outlines the relative size thereof, inside the same view, is not too different. But nevertheless, there are some variations, as it can be noted in the underneath table, in particular upon observing the footballers of team B, but such variation is wholly not influencing to the purpose of the classification, above all thanks to the process for normalizing the outlines performed during the phase for extracting the features.

the unique errors worth noting have occurred on the class 'the referee and the linesmen', which sometimes has been recognized as 'goalkeeper team A'. This is due most probably to the features of the training set: from a crosscheck performed later it has been verified that it was constituted by well few elements exactly for the classes 'goalkeeper team A' and 'the referee and the linesmen'. Therefore, it is quite reasonable that the system had not been able, starting from so few examples, to deduce the peculiar features of these two classes, among other things very similar visually. The use of a broader and more variegated training set would bring to the solution to this problem.

the problem of handling the occlusions between the footballers remains open: currently, the system is not able to recognize the presence of 2 or more footballers overlapped inside the same region. Such problem has been solved by implementing a tracking module of the footballers.

FIG. 28 shows examples of correctly classified footballers, whereas in FIG. 29 a case is proposed wherein the classifier fails.

An Additional Classification Technique: Supervised Approach

Even if optimum classification results have been obtained by means of the not-supervised approach, a supervised classification algorithm has been also implemented, which one could use during the system initialization phase, if particular and unexpected conditions should make unreliable the not supervised learning phase.

Such supervised algorithm is based upon the implementation of a classifier at minimum distance wherein the starting features are the same seen previously, but this time divided into the related classes by means of the operator's manual intervention.

By means of such supervision the system, in the training phase, is able to create the prototypes of the representatives of each class and in the test phase to assign the element to be classified to the class with representative at minor distance.

Formally, by keeping the same notations seen previously, the distance d between a general vector x related to the outline to be recognized and a vector r related to the representative of one of the clusters will be given by:

$$d(x, r) = \frac{1}{N}\sqrt{\sum_{i=1}^{N}\sum_{j=1}^{3}[x(i, j) - r(i, j)]^2}$$

Once evaluated this value for each one of the representatives, the winning class will be the one corresponding to the representative at minimum distance from the test element, that is:

$$v = \min_i d(x, r_i)$$

At the end of each classification, a coefficient indicative of the classification reliability is calculated and if such value is higher than a prefixed threshold, then the just classified element is inserted into the training set and consequently it contributes to define again the class representative.

In this way, the spectral features of the representatives will adapt to the variation of the lighting conditions during the match, by guaranteeing in any moment the presence of prototypes of the up-dated representatives of classes.

The below tables show the results obtained by the supervised classifier on the same test sequences whereon the above not supervised algorithm has been tested.

In particular, for the guided creation of the representatives 15 elements of each class have been used, as illustrated in Table 6, whereas Table 7 shows the numeric results, with the related scattering matrix.

As it can be seen, the classification percentages are further improved, until being able to consider the system really reliable. The errors are sporadic and due to strange assets of the players' outlines under examinations. Probably the use of a more substantial training set could further improve the classification.

TABLE 6

|  | Player team A | Player team B | Goalkeeper team A | The referee and the linesmen | Totale |
|---|---|---|---|---|---|
| Nr. examples | 15 | 15 | 15 | 15 | 60 |

TABLE 7

|  | Player team A | Player team B | Goalkeeper team A | The referee and the linesmen |
|---|---|---|---|---|
| Test elements | 25782 | 23244 | 1680 | 5822 |
| Correcly classified | 25770 | 23237 | 1680 | 5769 |
| % of success | 99.95% | 99.97% | 100% | 99.08% |
| REAL DETECTED |  |  |  |  |
| Player team A | 25770 | 6 | 0 | 8 |
| Player team B |  | 23237 | 0 | 0 |
| Goalkeeper team A | 7 | 1 | 1680 | 45 |
| The referee and the linesmen | 5 | 0 | 0 | 5769 |
| TOTAL | 25782 | 23244 | 1680 | 5822 |

Tracking

Subsequently to the methodologies by segmentation and classification of the motion regions, a tracking algorithm has been implemented for tracking actively each object existing in the image.

The objective of such phase is to label univocally each object existing in the scene and to follow the trajectory thereof in the subsequent photograms.

A tracking module allows several advantages and, in particular, allows solving the situations underlined in the previous paragraphs. In detail, by means of tracking one is able:

to limit the phase for searching for the players only in the image areas wherein it is possible finding motion based upon the information obtained in the previous frames: in this way the computational times for the segmentation and classification phases can be greatly reduced.

to provide possible occlusions between the players, in particular to provide if the occlusion is taking place between two players of the same team or of different teams. This is fundamental to the offside's purpose, since, upon reminding what is stated by the rules: "a footballer is in line with the defender and therefore there is not offside situation, when their body trunks result to be aligned parallely to the goal line".

to provide possible occlusions between players and ball; in such case, if the system for searching for the ball fails exactly because it is at a player's body, the tracking algorithm, by keeping trace of the position of the player himself, would ease the ball search (which could be performed, in a more massive way, exactly at such player).

to strengthen and validate each one of the preceding phases: thanks to tracking, there are "historical" information about each player, therefore one is able to handle a possible sporadic classification error (if a player has been labelled as belonging to the team A in the previous n frames and in the current frame is labelled differently, then one is sure to face a classification error).

In order to perform the tracking for each object on the scene the following information are stored:
coordinates of the center of gravity;
height and width;
area;
speed;
belonging class.

In such way each motion player is labelled univocally and, in the subsequent photograms, it is possible making the matching between the historical information of each player and the expected information for that player in the current frame.

In this way, by means of a simple control of the physical information (coordinates of the centre of gravity, height and width) and kinematical (speeds) of each player, one is able to provide the overlapping of two of more footballers, and to act consequently to the offside purpose.

Supervision with Multi-Views

All algorithms illustrated so far have to run on each one of the machines assigned to detect the offside.

In this sense, the cameras' arrangement which has been adopted, as it can be seen from FIG. 31, suggests that each action in the nevralgic area of the field will be simultaneously observed by two cameras each time.

This observation suggests that it is possible to strengthen all what said so far, above all the players' tracking, by exploiting exactly this multi-view concept.

Each machine, after having performed its own processings, transmits the obtained results to a supervisory process, which will be responsible for assembling and coordinating all stations, by means of the information in his possession.

The fact that the supervisory process, for each instant (in our context, for each photogram), has available all information deriving from the simultaneous processing on each workstation, causes that it is able to coadiuvate and coordinate the whole operation, helping the single workstations by means of a series of additional information which otherwise the same could not have.

This means that everything relating to the classification of each player, and the tracking of the same, will take advantage from the matching with the same results obtained instead from the other camera looking at the same field portion, but from another (front) position.

Apart from this, the supervisor will be able to understand when a player is going out of the view of a camera, to enter the view of the adjacent camera; by exploiting such information, the players' tracking is performed no more in a single image, but in the whole field, with obvious advantages in terms of strength and reliability of the algorithms illustrated so far.

The detection of the footballers and of the referee and the linesmen is a quite complex operation, which can be seen as the concatenation of a series of modules interdependent therebetween.

First of all, the Motion Detection module, by means of the background subtraction, detects the motion dots; subsequently, by means of a segmentation algorithm one passes from the pixel concept to the region concept, by detecting and labelling the n objects existing on the scene. Therefore, an algorithm for removing the shadows provides to remove its own shadow, or any other possible noise due to the lighting conditions, from each object.

At this point, the belonging class of each player is determined in a not supervised way by means of a SOM network. In order to avoid delicate situations such as the occlusion, a specific algorithm for tracking the players has been developed.

At the end of these modules, the agents present on the scene can be detected and classified correctly, even in presence of highly critical situations such as shadows and variations in the lighting conditions.

According to the present invention, it is further provided a real-time integrated viewing system for helping the referee in detecting the offside situation in the football game.

The viewing system has to be able to satisfy the minimum specifics to guarantee the good operation of the techniques and of the methodologies described previously.

It results that the choice of the focal length of the lens, of the framed view field, of the number of frames acquired per second (frame rate) and of the resolution of the TV camera must be made by keeping into consideration the minimum needs required by the experimented algorithms.

As far as the ball detection is concerned, the experimental tests described hereinafter have underlined the need to represent on the image plane the ball with a diameter of at least 10 pixel. Considering that the rules of the football game define the ball as "a sphere with minimum circumference of 68 cm and maximum circumference of 70 cm", this means that the ball diameter can vary from a minimum of 21.6 cm to a maximum of 22.2 cm and therefore that the choice of the parameters of the acquisition systems has to be so as to guarantee that each pixel is descriptive of a scene portion not greater than 2 $cm^2$.

Another very important aspect is the definition of the maximum speed of the ball. Considering that the ball can move at high speeds (even 120 km/h) it is necessary utilizing technologically advanced electronic devices able to acquire a high number of frames per second and furthermore able to guarantee good visual quality also for rapidly motion objects.

The high number of frames acquired for each second guarantees the possibility of detecting events which otherwise could be lost considering the very small period of time wherein they appear. In order to better understand this concept, FIG. 30 shows the graph of the relationship ball speed vs. ball shifting and frame rate. Obviously, the effect on the image is a ball shifting by a smaller or larger number of pixels in two consecutive frames.

From the graph it can be understood, for example, that if standard camera (25 fps) were utilized, a ball moving at 100 km/h would travel more than one meter between a frame and another one. In this way it would be difficult to detect correctly the scene dynamics, for example it would be almost impossible detecting the instant wherein the ball has been kicked and consequently it would be also difficult interpreting the game progress and the possible offside cases.

Given these premises, the problem to be set in determining the viewing system for detecting and tracking the ball is the following: Assuming that the ball has a minimum size of 10 pixels, which maximum speed it has to have so as to be able to determine exactly the time instant wherein the same has been kicked?

Based upon what previously said, in order to determine if the ball has been kicked by a player it is necessary calculating the acceleration and to do this almost three ball consecutive detections are needed.

Assuming that when the ball is kicked it is subjected to a uniformly accelerated motion at least for 1 meter of shifting (even if it is surely larger). This means that three consecutive frames acquired by the TV camera must cover 1 meter. Therefore, in two consecutive frames the ball will move by about 30 cm. By analysing the graph, it can be seen that a TV camera with 50 fps allows determining 30-cm shiftings if the ball moves at 60 km/h. A TV camera with 90 fps allows determining 30-cm shiftings if the ball moves at 100 km/h. Therefore, the range 50-90 fps is the one necessary for TV cameras able to record events which can occur at the speed of 60-100 km/h (possible interval of the ball speed).

Another determining aspect is the view field framed by the TV camera. That is how much space is framed on the left and on the right of the ball. Such parameter is linked to the resolution of the camera TV. Assuming the ball of minimum 10 pixels, each pixel subtends an area of (ball diameter)/(10 pixels)=(22.2 cm)/10=2.22 cm A TV camera with standard resolution has 768×576 pixels. This means that along the lines the view field which can be framed at maximum is 768 pixels*2.22 cm=17.04 mt and along the columns 576 pixels*2.22 cm=12.78 mt Let's consider a TV camera which keeps a fixed framing (that is without moving, rotating or zooming) and sees a ball moving at 60 km/h (=16.66 m/s) entering on the left and outgoing on the right. If the TV camera acquires a 50 fps (17.04/0.33=51.63 frame) the time elapsing between 2 frames corresponds to $\frac{1}{50}$ s=0.02 s, therefore it results that the shifting between two consecutive frames is of 16.66 m/s*0.02 s=0.33 m. It results that the space of 17.04 m of the view field would result acquired with 50 frames and the ball will remain in the view field for 1 s.

If the ball moves at 100 km/h with the same TV camera (50 fps) 30 frames will be necessary and the ball will take 0.6 s to cross the view field.

With a TV camera with a higher frame rate (90 fps) but same resolution (768×576) more frames will be obtained (100 frames if the ball moves at 60 km/h and 63 frames if the ball moves at 100 km/h), but the ball will remain in the view field for the same time.

The time taken by the ball to cross the view field is important since the processing time, that is the time used by the processing technique to determine the ball in the image, is linked thereto. If to verify the kicked ball situation 3 consecutive detections are needed, then in case the ball moves at 60 km/h the processing time is minimum 1.02/3=0.34 s. In case the ball moves at 100 km/h such time is 0.6/3=0.2 s.

As it is not possible reducing the algorithm computational complexity in order not to jeopardize the reliability of the same, to increase the performances thereof it is necessary to utilize more powerful calculation hardware.

An alternative is to increase the time for crossing the view field by increasing the resolution of the TV camera, but also this with a cost increase. If a TV camera with 1024×768 pixels were used, the view field would be 22.73 m and it would be crossed in 1.3 s (ball at 60 km/h) and 0.82 s (ball at 100 km/h). Table 8 summarizes such data for several resolutions of TV camera available on the market.

TABLE 8

| TV camera resolution | Horizontal view field (in mt) | Crossing time at 60 km/h (in sec) | Crossing time at 100 km/h (in sec) |
|---|---|---|---|
| 768 × 576 | 17.04 | 1.02 | 0.60 |
| 1024 × 768 | 22.73 | 1.36 | 0.82 |
| 1280 × 1024 | 28.41 | 1.72 | 1.02 |
| 1600 × 1200 | 35.52 | 2.14 | 1.28 |

The increase in the crossing time is fundamental if servomechanisms are to be used to orient the TV camera to allow framing always the ball (tracking) since the time for activating stepping motors is higher than the one related to the image acquisition.

The considerations made on the constraints imposed in choosing the vision system from the ball-detecting algorithms can be mostly repeated as far as the problems of the detection of the players and of the referee and the linesmen are concerned.

First of all, it is necessary defining which is the footballer's minimum size in pixel for a reliable automatic detection. The algorithm for segmenting the persons' outlines imposes that the minimum size be 50 pixels in height and 20 pixels in width. Considering that a person is 170-cm high on the average, each pixel subtends an area of 3.40 cm.

According to the rules of the football game:

"The playing field must be rectangular. In any case, the length of the side lines must be longer than the length of the goal lines.

| Length: | minimum m. 90 |
| | maximum m. 120 |
| Width: | minimum m. 45 |
| | maximum m. 90 |

International Matches

| Length: | minimum m. 100 |
| | maximum m. 110 |
| Width: | minimum m. 64 |
| | maximum m. 75" |

Considering that the maximum length is 120 m, the view field of the TV camera must be 60 m. Table 9 shows the view fields for the TV cameras available on the market:

TABLE 9

| TV Camera Resolution | Horizontal view field (in mt) |
|---|---|
| 640 × 480 | 21.76 |
| 768 × 576 | 26.11 |
| 1024 × 768 | 34.81 |
| 1280 × 1024 | 43.52 |
| 1600 × 1200 | 54.40 |

As far as the frame rate is concerned, it must be considered that the speed of a running footballer is 30 km/h therefore the fastest event to be considered is that two footballers run each one at the maximum speed in opposite direction (one toward the other one) therefore the relative speed is 60 km/h. Therefore a 50-fps TV camera (see graph 1) is surely sufficient to appreciate separations between footballers equal to 30 cm in the worst case and they have a good price-performance relationship.

As the described event is an extreme case, surely the separations between footballers will be less, since in the faster situations, the footballers start from the still position or they move in the same direction. Therefore at an average speed of 30 km/h the separation between footballers, which can be recognized by the mentioned TV cameras, is about 13 cm.

As far as the view field to be covered (60 m) is concerned, several choices can be used:

single Tv camera and in this case the only possibility is the 1600×1200 one several coupled TVs with reduced resolution, for example three 640×480 cameras.

Surely the last solution is the cheapest one and furthermore the choice of the single tv camera or more tv cameras do not influence the performances of the recognition techniques.

The solution proposed with the present invention provides the use of several static TV cameras, arranged so as to cover the whole playing field, obviously by complying with the constraints imposed by the analysis techniques upon the size of the footballers, of the ball and of the opportune frame rate. The configuration is the one shown in FIG. 31.

Considering that the main constraint is the speed for detecting the events and therefore for what said before a good compromise is to use TV cameras with frame rate comprised between 50-90 fps which at a ball speed of 60 km/h allow having a spatial resolution of 20-25 cm (see FIG. 1). The other constraint is linked to the size in pixel of the footballers and of the ball which, as requested by the analysis techniques, must be at minimum, respectively, of 70 pixels and 10 pixels. Such parameters are linked to the focal length of the lens to be used (wide-angle vs zoom) and obviously from the position therefrom the shootings are performed. The last constraint is the framed view field indication that the number of TV cameras necessary to cover the whole playing field. Such parameter is linked to the resolution of the TV camera.

Furthermore, as the acquired images are utilized both for determining the ball and for segmenting the footballers, they must be colour images.

A suitable TV camera with respect to the constraints mentioned above is DALSA 2M30, the features thereof are listed hereinafter:

2-megapixel resolution: 1600×1200 pixels, 7.4 µm×7.4 µm size

Frame rates up to 30 fps, or, if using an area of interest, up to 250 fps

2×40 MHz data rate via Camera Link high speed serial interface

Electronic, global non-rolling shutter for "Stop Action" imaging

Programmable area of interest

Single 11V to 25V power supply

Binning (DS-21-02M30 only)

Robust and compact design

Colour option (DS-22-02M30)

Such TV camera has a single CCD with coloration by means of bayern patter and which can be used in our context with a resolution of 1600×600 pixels in order to obtain a frame rate of 60 fps. FIG. 32 is an example of acquired image.

The parameters to be defined are then: position of the TV cameras in the stadium, lens to be used and number of required TV cameras. Considering that the TV cameras must be arranged along the side lines (at a pre-fixed distance) each one thereof must resolve at maximum, in depth, as far as half field (relatively to the ideal line passing by the centre of the two goals). Therefore, the minimum position wherein the ball and the footballer must have the required sizes in pixel is related to the height of the half field.

Figure 35:
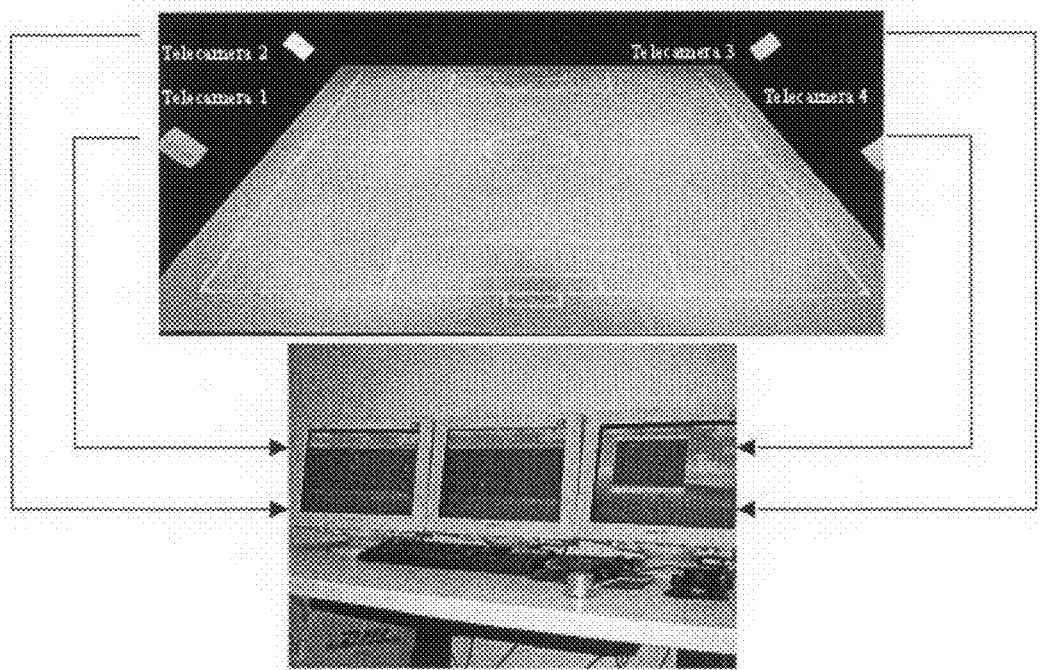

By imposing such constraint the following values are obtained:

§ position of the TV Camera at about 100 meters from the field centre positioned onto the stands. Obviously such position depends upon the specific stadium. For example, in Udine it is possible arrange a TV camera at 100 mt, whereas in Lecce the allowed maximum distance is 70 mt. For the positioning of the TV cameras please refer to FIG. 35.

§23-to-33 mm focal depending upon the distance

§ number of TV cameras 2 to 5 for each side (4 to 10 in total) depending upon the stadium.

Hardware Configuration

Each station of TV camera is an independent acquisition, recording and processing unit and it comprises the following hardware:

1. TV Camera DALSA 2M30 1600×1200
2. PC biprocessor with at least 3 Ghz each one, 1 GB RAM, PCI-X bus, 2 SCSI U320 channels with RAID 0 support for a maximum of 3 disks per channel, 6 Disks Seagate with 73 GB SCSI U320 SCA 10000 RPM
3. Optic link for dislocating the PC in remote position with respect to the TV Camera
4. X64 Coreco Acquisition card Each unit processes the current images and sends the results to the other units, via LAN, for an integration thereof.

Architecture of the Acquisition System

The device according to the present invention is a wholly digital and modular slow motion system, suitable for accepting any number of cameras synchronous therebetween. Each camera has the feature of shooting colour images, with a number of frame per second higher than the television standard, so as to shoot, with a time definition never seen before, the events occurring during a football game. Also the image definition in pixel is remarkable. In fact, to validate such architecture the cameras of DALSA, 2M30 have been tested which allow acquiring 57 photograms per second, with an image definition of 1600 pixel per 600. Such definition can be increased until reaching 1600 per 1200 pixel. For a comparison we can note that the definition of a television image is 768 pixel per 576.

In order to guarantee the modularity of the shooting system, one has thought to implement a three-level architecture, as schematized in FIGS. 33 and 34. A first level is formed by the single acquisition units. A second level is formed by the network architecture and a third level is formed by the Multimedial Interface and image processing system.

Acquisition Level

The acquisition level is composed by N identical units labelled with a progressive number. Each unit represents a camera installed in the football field and therefore a view. Such units are dedicated only to record the images acquired by the camera and to display the same in times and modes decided by the Multimonitor Multimedial Interface. Such units are not equipped with keyboards and mouse, since the commands are given via network. Each one thereof, instead, has a monitor with sizes sufficient to display what acquired plus some additional information.

The general unit can then comprise the following components:

CCD colour camera with the transferring of the raw image two Fiber Cameras Link Repeater acquisition server dual processor XEON chipset Intel 7520 with X64 Coreco card two batteries of disks in RAID 0 with 3 disks of 73 GB SCSI SCA 10K each one programmable graphic card compatible with the OpenGL 2.0 standard monitor Several tests have been made by proving the performances of different cameras. Furthermore, writing tests on RAID 0 have been performed to evaluate the architecture performance, in order to be sure of succeeding in performing all required operations in the required times.

Hereinafter the selected units with the most salient features and the performed tests are reported:

Camera DALSA 2M30

DALSA 2M30 is a single CCD colour camera which sends the acquired image directly in Bayer mosaic, without re-coloration. It has a sensibility to the light radiation which starts already from 300 nm until arriving to 1000 nm with the sensibility peak at 500 nm. The CCD is sold without the application of special filters for the visible spectrum, so as to make it suitable for any ultraviolet, visible and infrared use. In the specific case it has become necessary the application of a pass-band filter, with frequency lower than inferiore 400 nm and higher than 750 nm n. Such filter allows having image colours perfectly aligned to the real colours, however lessening the whole brightness of the camera by 10%.

The camera can accept lens with 42-mm mount, but there are (provided by same DALSA) F-pass mounts. In the case in point we have used lens which are created for digital cameras, with the lens clutch onto the camera body modified by us to allow the manual opening of the diaphragm. The choice of the focal distance has been made by taking into consideration the geometry of the football stadium to equip with such instrumentation. For example, in the stadium in Udine a 24-70-mm zoom positioned on 35 mm has been used.

The camera communication bus is the CameraLink and two taps are necessary to transfer the acquired image. With a resolution of 1600×1200 pixels, the camera acquires 30 fps. With the chosen resolution, that is 1600 times 600 pixels, one works at the speed of 57 fps. The transfer rate is around 53 Mbyte/sec. The recording system architecture must be then support this average load.

Optic Camera Link

Each camera needs a calculator in order to operate. The calculator, by means of the CameraLink interface, adjusts all camera's parameters and controls the frame acquisition. The frame, once acquired, is sent from the camera itself towards the PC through the same CameraLink interface. The programmer, then, has only the task of manipulating the image and vehiculate it correctly towards the required channel, which can be the stream video, the storing stream or the processing stream. Such bus appears like a cable with a 6-mm multipolar diameter which, due to the data transmission speed, cannot exceed 15 mt. Therefore it has believed to be necessary, to physically separate the PC from the cameras, to discouple them by means of two optical fibre repeaters. Such repeaters on one side allow converting the signal coming from the optical fibre camera and on the other one to reconvert the optical fibre signal into its original format (CameraLink). The optical fibre can have a maximum distance of 500 mt, above thereof it is necessary to interpose signal optic amplifiers. The selected repeaters are by Mikrotron and the operation thereof has been tested from the same manufacturing house both with 2M30 cameras and with frame grabber X64 of the Coreco Imaging.

The Acquisition Server

The acquisition server is a calculator placed in the control room. It deals with all control functions of a camera for acquiring the frame, for filing the same and for displaying the last acquired frame. Furthermore, at Multimonitor Multimedial Interface's command, it is possible displaying sequences of images already stored on the disk whereas the server is still engaged with the acquisition operations.

The general acquisition server must be equipped with a X64 card of Coreco, two Ultra SCSI 320 buses and for each bus three HD made each one of 73 GB configured in RAID 0 hardware, for a total of 220 GB of disk for each bus. The camera, then, handles two virtual disks made each one of 220 GB.

The acquisition server must be adequately configured since it must perform the lower-level following tasks:
  collecting the images from the camera and record them on HD continuously without loosing frame until the maximum speed of 57 frames/sec for images at the resolution of 1600×600 pixels.
  recovering, whereas the recording proceeds, a previously acquired image and display it without slowing down the recording process.
  displaying always the colour images, without slowing down the recording process.

In order to verify if it is possible concentrating these activities in one single camera, a demonstrator composed as follows has also be constructed:
  Supermicro X6DH8-G2-O mother board
  Two Intel Xeon 3.0 GHz 1 MB 800 MHz Box Pass
  Two SCSI U320 channels with support for RAID 0 for a maximum of three disks per channel
  Six HD Segate 73 GB SCSI U320 SCA 10000 RPM, three for each SCSI channel
  X64 Coreco full card
  NVIDIA 7800 GT graphic card Some tests have been then performed. First of all the HD writing capability has been tested, by creating a specific programme able to obtain the maximum performance in terms of sustained transfer rate, both during the writing phase and during the reading phase. Therefore, a software class has been developed, able to perform an asynchronous, not bufferized writing onto the disk. Such class has the only limitation of reading/writing data blocks with multiple size of one sector. At last, the writing speed has been tested, by succeeding in sustaining 184 MB/sec.

However, the raw image coming from the camera is coded through the Bayer grid. Such image, for a subsequent processing and utilization thereof at the display purpose, must be interpreted and converted into a RGB image.

The coloring process, usually expensive from the computational point of view, be accelerated, both resorting to the use of instructions of SIMD (single instruction multiple data) type on the processors existing in the system and remitting the calculation to other units, connected to the acquisition system. The advantage of the local coloration by means of SIMD instructions originates from the possibility of operating on already available data, where a solution requiring the intervention of outer units connected to the system requires the passage of the information on some kind of bus, however with the advantage of releasing completely the processor from the coloration phase. The appearance of high-performance buses, such as the Pci-Express, allows performing the data shifting in times which well adapt the subject task. This allows to remit the coloration task to other units, by releasing the system processors for other activities.

One of the possibilities is to entrust these tasks to a programmable graphic card. In such context, the data coming from the camera are sent to a graphic card, which, properly programmed, carries out the coloration for the display, if required, and in case by returning the colour image in RGB format.

Furthermore, it is possible exploiting the graphic processor for extracting, from the RGB image, the dye information (the H channel H in the HSL colour system), to be used in the subsequent image processing phases.

Network Level

The network level has the purpose of putting into communication the acquisition level with the processing and Multimonitor Multimedial Interface level. It is physically represented by a gigaswitch ethernet able to connect the machines point to point therebetween. With a rapid calculation, it can be demonstrated that the network level is able to connect point by point two machines therebetween which exchange images therebetween. In fact, supposing that the frame has a size of 1600×600 bytes and that the images are acquired at 57 fps, the required throughput is then 417.5 MBps. The network has a 1-GBps band, therefore it is required less than half of the network band.

Multimonitor Multimedial Interface and Processing Level

The Multimonitor Multimedial Interface (FIGS. 35 and 36), according to the present invention, is the level which coordinates the recording, display activities and if it is necessary it coordinates the image processing and the visualization on display of the results. As far as the image processing is concerned, it results necessary to configure the processing operation in order to not make heavier or occupying uselessly the acquisition calculator, which would risk losing some frames due to the processor engagement with other operations. Therefore, once determined which units have to be used in the processing, it has sense that such units establish an ethernet communication with the acquisition PCs, wherein the frame to be processed is sent and the information to be displayed are received together with the frame.

By doing this, the acquisition units will have three operation modes:
- they record the frames by displaying the last acquired one sub-sampling the display frequency according to the granted CPU time
- they recorder the frames by displaying instead the frame which the Multimonitor Multimedial Interface has requested
- they record the frames by sending a selected frame to the processing units. Once received the required information, they display the frame with the information overimpressed in a specific graphic format.

In order to accelerate the work of the processing units, expensive from the computational point of view, they will be implemented in hardware by using specialized cards dedicated only to image digital processing.

Additional details about the multimonitor multimedial station will be provided hereinafter.

According to what described previously, the system proposed for detecting the offside comprises then:
1) a set of stations equipped with the hardware and software tools for the synchronized acquisition and the storage of the digital images
2) a multimonitor multimedial console for the supervision and the coordination of the activities of the acquisition and recording stations
3) software modules for processing the acquired image.

The proposed system architecture is schematically illustrated in FIG. 33. Previously the algorithmic and methodological details related to the software modules for processing the images (ball detection, elementary event detection, detection and classification of the players and of the referee and the linesmen) and the technical and technological details related to the image acquisition and recording stations have been provided.

On the contrary, hereinafter a multimonitor multimedial console will be described, by underlying the possible operation modes. Furthermore, the first experimental results will be shown, obtained by analysing digital video sequences of the football Italian championship 2004/2005.

The Multimonitor Multimedial Console

Base Configuration (FG/MAN)

The base elements of a multimedial console (FIG. 36) are:
- the monitors for displaying the sequences acquired by the various cameras
- a multimedial interface for navigating the sequences
- calculation unit adequate for handling the communication with the digital acquisition units of the video sequences and of the optimization of the computational loads
- a joggle-type device (FIG. 39) for the quick access and centralized to different system functions.

Each monitor of the multimedial console displays the scene acquired by one of the different cameras placed in the acquisition or storage stations.

On the market there are video cards supporting one or more monitors but, generally, they are not able to guarantee acceptable performances from the graphic acceleration point of view. For this reason the use of two video cards is convenient, one thereof is specialized in handling one single monitor, which guarantees optimum results from the point of view of the compatibility with the graphic libraries used for the virtual view (OpenGL) and optimum acceleration qualities and the other one equipped with multimonitor capability, thereon however particular needs from the 3D acceleration point of view do not lie.

The recommended sizes for the monitors, start from a visible surface of 17", possibly of 16:9 "widescreen" type so as to be more suitable to display the images (which singularly have resolution of 1600×600 pixels, not much suitable to be represented in the 4:3 common format).

Apart from the images coming from the various cameras, the multimedial console offers, on a separated monitor, a control window for handling the sequences.

On the control window there are a series of video controls (stop, play, pause), which play functions wholly analogous to what found on the common dvd-video readers or videorecorders.

Through the control window it is possible to see again a previously acquired sequence and to scroll the frames which compose it at different frame rates in order to interpret best the scene.

It is to be noted that these commands are mostly destined to display a part of the game sequence and in any case they do not interfere with the live recording activity, which takes place always simultaneously to the regular course of the match on the prearranged units associated to each camera.

Figure 36:
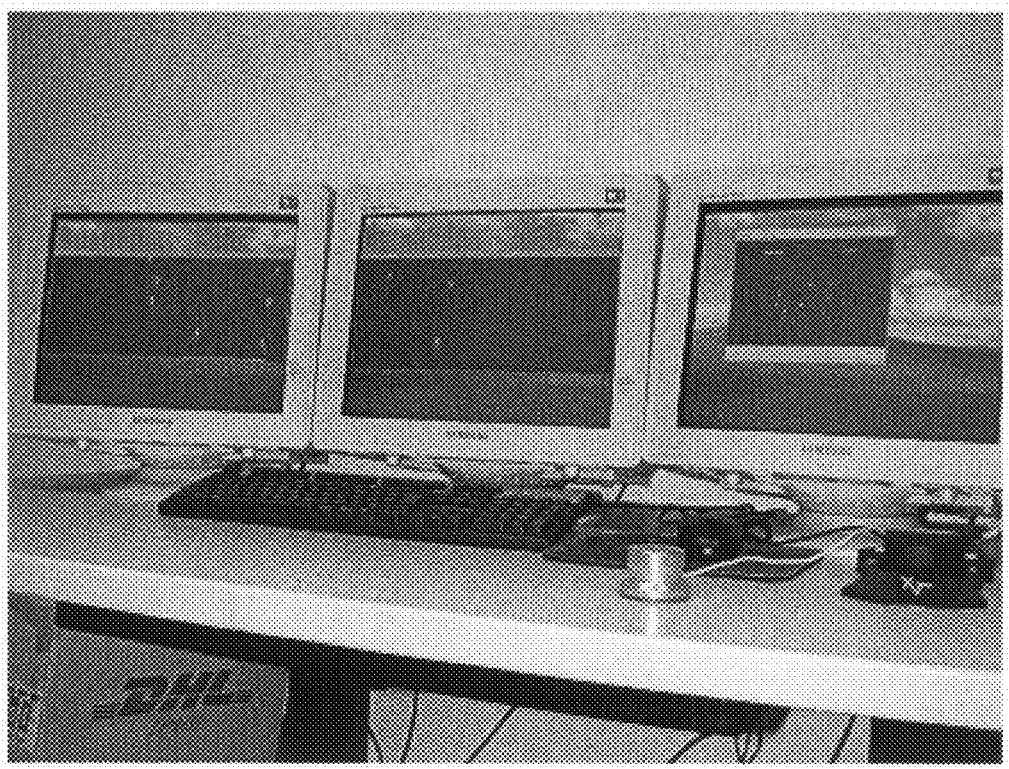
Figure 37:
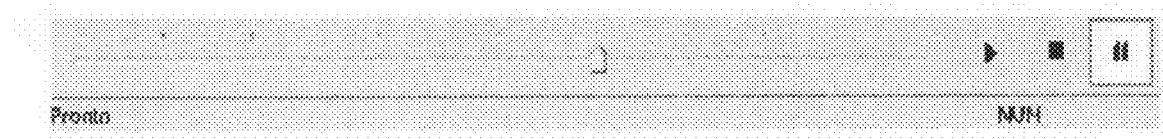

FIG. 36 shows a photograph of the multimedial console prepared and used for this feasibility study. The two monitors on the left display the synchronized sequences acquired by two different cameras whereas the one further on the right includes the control window for displaying the sequences (thereof it is then possible to see an enlargement in FIG. 37).

The control window represents then a first advanced tool for interacting with the system and it allows passing from the real time display on all monitors of the multimedial station of the acquired images ("live mode") to the replay display of a particular sequence ("slow motion mode"). In this second display mode all monitors will be pre-arranged to reply to the requests of navigation between the user sequences, whereas the recording peripheral units will continue to acquire and record the images in real time.

In "slow motion" mode the various views provided through the monitors will be always synchronized and therefore it will be possible to see and see again a sequence acquired previously from all the possible available views.

The use of a multimonitor multimedial console with synchronized views allows solving at the same time the main error sources of the linesmen: the problem of the limited human view field, of the reaction time and of perspective distortion. In this way it will be possible observing at the same time the moment of the ball detachment and the position of the players involved in the offside, by making use of a privileged perspective, without any perspective distortions.

Figure 38:
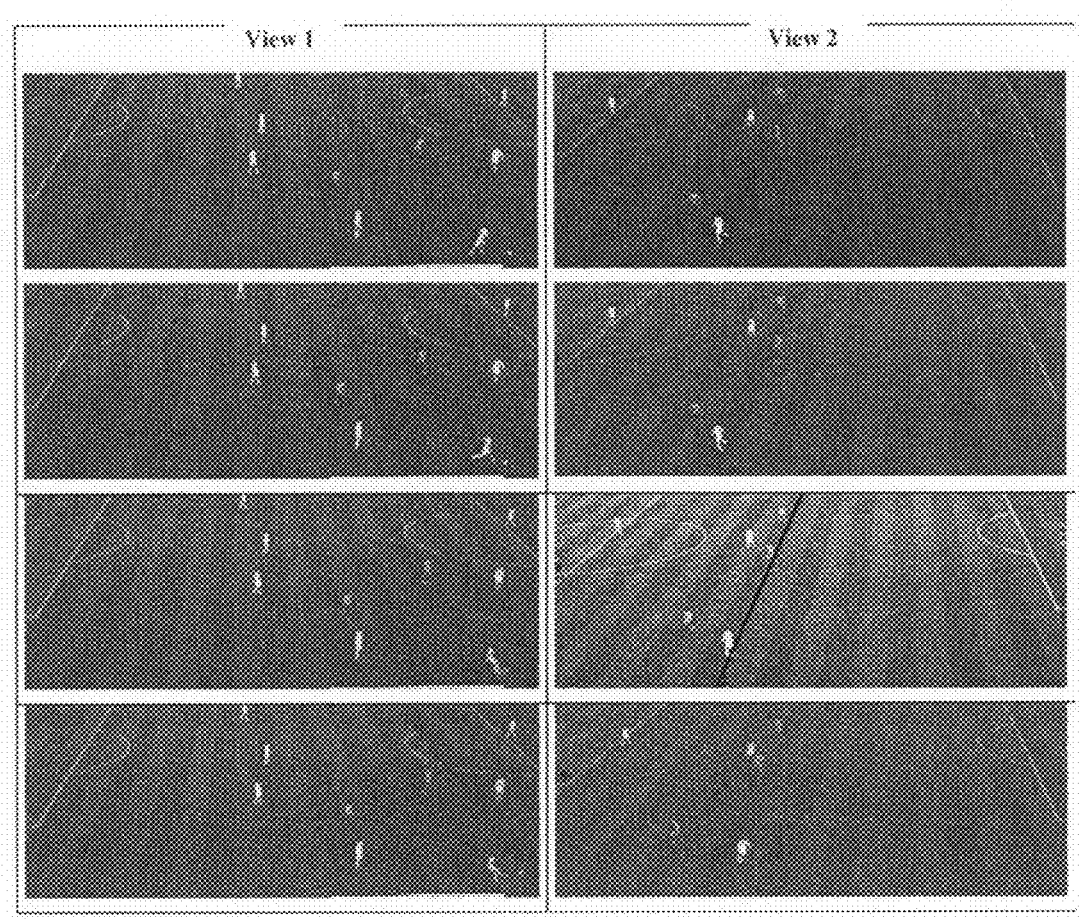

FIG. 38 shows an example useful to understand the advantages of using synchronized multiple views of the FG/MAN system for interpreting possible offside situations. The example relates the use of two different synchronized views.

As it can be observed, the ball and the players to be controlled at the offside purpose are not in the same view field of the linesman. Furthermore, the players and the ball have a high kinematics which makes difficult for the linesman to keep aligned with the last defender (to avoid the perspective error) and perceive the events correctly (due to its finished reaction time).

Only by observing the action with multiple view and coadiuvated by the functions of the control window it is possible analysing the scene, reducing to the minimum the possibility of wrong interpretation.

In FIG. 38 it is also possible noting an additional functionality of the FG/MAN system which allows to the operator (for example the fifth man) to position onto the image lines parallel to the field bottom line so as to facilitate the scene analysis. In figure the parallel line has been positioned by the operator in the view 2 at the last defender (in yellow-red) when the attacker (in white), in the view 1, performs the deep throw towards a teammate. In this case the superimposed line allows perceiving better the alignment between the attacker and the defender and therefore being able to decree the not offside situation.

In order to facilitate the user's interaction with the system one has thought to equip the multimedial console with specific peripheral units of "joggle" type. (FIG. 39).

Peripheral units of this kind, for example, can be connected to the monitoring system and allow scrolling a sequence in replay in a way wholly analogous to what happens with the new videorecorders or with the high-level controllers destined to the video editing, they allow to go forward and backward in a sequence, frame per frame.

The subject device, apart from allowing to turn the knob on the right and on the left, intercepts also the push of the knob itself, so as to interpret different combinations of these simple movements.

The events which can be intercepted in this way become six:
Left
Right
Click (push)
Double click (push repeated at brief distance twice)
Click+left
Click+right It is possible exploiting these different combinations for localizing most part of the functions necessary to the replay on this single peripheral unit, so as to maximize the system usability.

Particular actions can be associated to each one of these configurations, in particular for:
Right: To wind forward by a frame at a time manually
Left: To rewind by a frame at a time manually
Click+Right: To wind forward at a variable speed for the sequence
Click+Left: To rewind at a variable speed for the sequence
Click: switch between live visual mode to replay and vice-versa The possibility of intercepting also events such as the double click can allow an additional personalization of the actions which can be associated to the device, such as the possibility of jumping directly to another "slow motion" situation occurred previously.

In addition to devices of joggle type for moving the offside line in the offside manual signalling mode, it is possible exploiting devices such a graphics tablet, or even pen display. The use of a graphics tablet, as replacement or complementary to the use of joggle, allows a quicker positioning of the offside line.

The possible tracking modes are two:
with respect to the playing field: the tablet area identifies the virtual playing field. The centre identifies the midfield, on the extreme right and left there are the respective goals. The offside line follows the pen motion
with respect to the single camera: by means of the console, the operator chose which one of the active cameras has to be used as reference. The tablet area identifies the framed field area. The offside line follows the pen motion. The buttons existing on the pen allow changing the reference camera or leaving the offside manual signalling mode.

The use of the pen display instead of a simple tablet, operating only with respect to a single camera, allows selecting directly onto the image, where the offside line has to be positioned. In this way, the pen display is connected to the console by means of usb, but it receives the video flow to be utilized by a video switch with n+1 input images, n thereof corresponding to the connected camera and one corresponding to the console and one only output (displayed by the pen display). The switch programming is entrusted to the console, which, based upon the inputs coming from the pen display and from the other input devices, displays one of the n+1 video inputs.

The multimonitor multimedial console in the base configuration is practically a "digital" slow motion for the objective crosscheck, in real time, of the events of the football game (in particular the offside) which are taking place without interferences with the digital detection and recording system which continues to operate regularly.

Semi-Automatic Advanced Configuration (FG/SEM)

The multimonitor multimedial console in the base configuration described in the previous paragraph is a powerful tool for inspecting rapidly the acquired sequences in order to interpret best the events contained therein by exploiting the synchronized views.

Therefore it exploits the acquisition, storage and display technologies of the sequences, but it does not use the algorithms for processing the images described previously.

The system proposed in the advanced configuration, called FG/SEM, operates instead in a semi-automatic way, by including the software implementing the algorithms for processing the digital video sequences. The multimedial console of the FG/SEM system makes available to the user (for example the fifth man) an "evolved" interface by displaying, as the FG/MAN system, the video sequence related to the offside, but integrated with a wealth of graphic-pictorial information for the objective crosscheck of the event and an optimum support for the final decision of the fifth man.

Such evolved interface includes the following additional elements:
1) a virtual view of the playing field with indication of the real position of all actors (players, referees, linesmen) and of the view field of each one of the prearranged cameras
2) a signalling device, by means of graphic-pictorial elements superimposed to the acquired sequences, indicating:
   a the position, the speed and the direction of the ball shifting
   b. the classification, the position and the shifting of each actor in the field,
   c. the moment when the ball is subjected to kinematics variations so as to make to suppose a touch (the ball throw moment),
   d. the player nearest the ball at time of the detected event (ball throw);
   e. the players in possible offside situation and the relative distance according to the offside rules in force;

In the FG/SEM system the multimedial console is also able to select automatically the significant views to the purposes of the displayed sequence analysis for determining the offside event.

Practically, each time, on one of the monitors of the multimedial console the video sequence including the event to be examined by the operator will appear. If the action has taken place by involving several cameras, the video sequence synchronized by the cameras involved in the event will appear on the monitor.

By means of graphic-pictorial tools, the information extrapolated (item 2) by means of the algorithms for processing the images described in the preceding chapters are superimposed onto each one of the significant views.

All this information is visible in the sequences of real images and in the global virtual view wherein all actors and the view field of the involved cameras are visible.

In the following paragraphs some concrete examples for using the multimonitor multimedial console will be illustrated and each time greater details about the information made available by means of graphic-pictorial functions will be provided.

Automatic Advanced Configuration (FG/AUT)

This automatic advanced configuration of the offside detection system is substantially identical in the hardware and software components to the FG/SEM system. The substantial difference is constituted by the automatic operative mode, that is the presence of a supervisor software component suggesting, in "automatic" way, the possible offside condition. Whereas in the preceding configurations, respectively in the FG/MAN and FG/SEM systems, through the graphic-pictorial tools of the console, the event objective crosscheck is offered to the fifth man and he analyses it, in the automatic advanced configuration the FG/AUT system signals in automatic way the possible offside condition.

Experimental Results

An experimentation has been made by acquiring, with a limited number of cameras, under real operating conditions, the match of the Italian football championship of series A Lecce-Sampdoria which has taken place at the stadium in Via del Mare in Lecce on 19 Dec. 2004.

In particular, the configuration of the utilized system provided the use of two cameras located on the same field side and able to cover the field portion underlined in FIG. 40 by means of the demonstrator's virtual view. Of course, in order to guarantee the complete covering of the playing area at least further two cameras positioned on the opposite side of the field would be required.

Let's see now some concrete examples, extrapolated exactly from the subject match, in order to underline the system functionality in the offside detection.

EXAMPLE 1

System and Linesman Determine Correctly the not Offside Situation

In the first example (FIG. 41) a player of Sampdoria A1 throws deeply a teammate A2. The linesman, visible only partially on the bottom, at time of the throwing is aligned with the last defender of Lecce D1 and he is intent on running by trying to keep the alignment.

In this case there are the ideal conditions to avoid the error since, thanks to the linesman's skill, the parallax error is negligible and furthermore the ball starts from a position near the one wherein there are the attacker and the defender.

To say the truth, after a hesitation moment and a quick exchange of remote consents, the action correctly is made to proceed.

Figure 41:

In FIG. 41 it is possible observing the output of the multimedial console in advance configuration when the system has detected the throw critical event therefrom an offside situation could generate.

In this case the algorithms for processing the digital images described in the preceding chapters have correctly determined the "critical" moment of the throw by superimposing all extracted information to the images.

In FIG. 41 the graphic-pictorial information automatically superimposed by the system are well visible. From the analysis of this information it can be deduced that at the moment of the throw the player of Sampdoria is in regular position (the system detects that his centre of gravity is 21 cm further back with respect to the last defender of Lecce).

In FIG. 41, the first number on the left (321) designates the frame position inside the inspectioned sequence, whereas further on the right it is possible seeing the ball speed at time of the throw (37 Km/h) and the throw direction with respect to the illustrated reference system.

The ball direction and shifting speed are also expressed graphically by means of a speed vector with green colour with the application point centered onto the ball, direction coincident with the one of the ball shifting and module proportional to the ball instantaneous speed.

Figure 42:
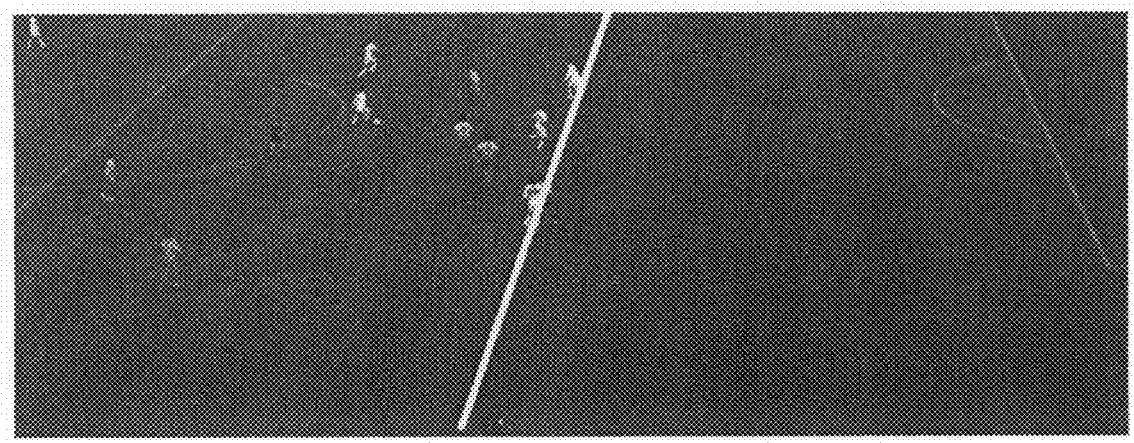
Figure 43:

With the system in FG/MAN manual mode the fifth man would see the same scene of FIG. 41 without the additional graphic-pictorial information provided with the evolved interface of the FG/SEM system. FIG. 42 shows the output of the FG/AUT system interface for the example 1. In correspondence of the last defender a bar parallel to the goal line has been positioned manually by the operator (by means of the Joggle device).

EXAMPLE 2

The System Confirms the Linesman's Decision in Doubtful Situation of not Offside In the second example (FIG. 43), a player A1 of Sampdoria sets in motion with a long vertical throw a teammate A2. In this case the linesman, correctly aligned with the last defender D1, closes an eye on it and the demonstrator admits he is right by underlying, as usual, all scene information in the critical moment when the ball starts moving.

The throw is automatically detected in the frame 127 of the sequence, the ball moves at 77 km/h with an inclination of 22 degrees and the distance between the two players is 15 cm.

EXAMPLE 3

Wrong Evaluation of the Offside Event by the Linesman

Also in the third example a player A2 of Sampdoria is thrown by a teammate A1 thereof.

In this case the linesman (at first not visible) stops the offside action. The doubts about the correctness of the decision of the referee and the linesmen are many and in fact the players of Sampdoria protest strongly.

Figure 44:
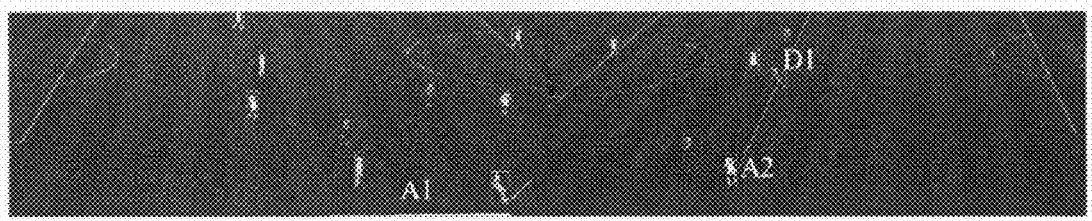

FIG. 44 shows the screenshots of the two monitors of the multimonitor station at time of the throw.

In this case, contrary to the preceding study cases, the action starts with the throw which is detected by the camera 1 whereas the players to be monitored are in the view field of the camera 2.

The automatic system for detecting the offside in this case detects that the centre of gravity of the attacker is "only" 11 cm forward with respect to the centre of gravity of the last defender.

The system, correctly, shows/indica that the attacker position is regular since the distance between the two centres of gravity is below the minimum threshold to be able to state, according to the rules, that there is free space between the two players which can then be considered in line. This consideration finds objective crosscheck from the observation of the mutual position of the players in FIG. 44 and therefore one can conclude that the action is to be considered regular and it had to make to proceed.

The linesman's error is mainly due to three factors: parallax, view field and high dynamics of the scene.

It can be observed that at time of throwing the linesman is not aligned with the last defender since the latter, when he has perceived the intention of a passage to a more advanced attacker, moves quickly towards the midfield, leaving the linesman in a more advanced position with respect to the new assumed position. Practically, the linesman remains positioned in the direction of the defender old position and consequently he has a distorted vision of the relative distance between attacker and defender. The linesman, practically, finds in a position therefor a perspective error occurs.

Secondly, it can be observed that the player performing the passage and the player thereto it is destined are not at the same time in the same view field of the linesman which therefore cannot absolutely determine exactly the position of the players at the precise moment of the throw. If to this it is added that as it happens often defender and attacker move quickly in opposite directions it can be understood that in that time fraction wherein the linesman moves his eyes from the ball to the players, the scene has deeply changed by inducing him to the error. This types of error had been previously analysed and it results clear the human impossibility in determining correctly this type of events with the systematic consequence that the final decision is based upon subjective fundamentals and they are of pure casual evaluation.

Figure 45:
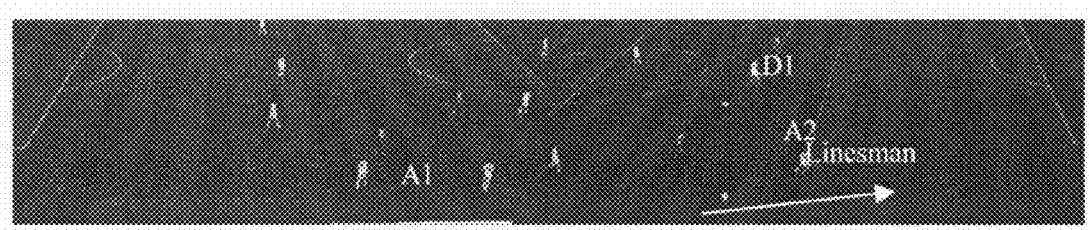

In the specific case, the linesman raises the flag 1.25 seconds after the throw, when by now, practically the attacker of Sampdoria A2 is further ahead by more than 6 meters with respect to the defender of Lecce D1. FIG. 45 shows the frame wherein the linesman detects the event with the measurement of the distances perceived by the linesman.

It is underlined that the proposed system, by observing in real time all areas of the playing field through the various cameras, can determine and show simultaneously the ball detachment events and players' position without introducing errors.

The event crosscheck is tangible and it can be used to base the final decision upon objectivity fundamentals.

EXAMPLE 4

Figure 46:

The System Confirms the Linesman's Offside Decision and it Stills all Doubts Therefrom the Attackers' Strong Protests Originate In this example, yet another time a player of Sampdoria A1 throws deeply his teammate A2. The action involves both available views (FIG. 46).

The linesman decides that the attacker, at time of the throw, is in offside.

The attackers of Sampdoria, seeing that a clear goal occasion has been interrupted, protest strongly believing that the position of their attacker is regular. The system provides a clear interpretation of the scene which stills all doubts. From the graphic-pictorial information made available from the evolved interface it is possible finding objectively that, at time of the throw, the attacker A2 is about 1 m further ahead with respect to the last defender D1. Therefore, the linesman's interpretation is right.

EXAMPLE 5

Figure 47:
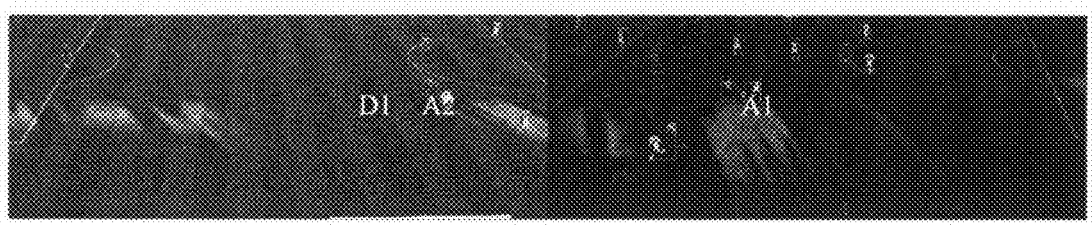

Objective Crosscheck of the System, Under Critical Lighting Conditions, about a Correct Interpretation of the Linesman of a not Offside Situation The last example reported here is the one with simplest interpretation, both for the linesman and for the proposed system (FIG. 47). Upon the throw of the attacker A1, the position of the attacker A2, in fact, is clearly regular (about 1 meter) with respect to the one of the defender D1 and the linesman as well as our system indicate that the game can continue.

This example provides the cue to observe that the proposed system operates correctly also when the scene lighting situation modifies deeply. In this example, in fact, contrary to the preceding examples, the scene is lightened with natural light and there are areas with different chromatic intensities due to the architectural structure of the stadium in Lecce.

Despite these unfavorable conditions, however, the evolution of the dynamics of players and ball is correctly analysed and the offside events are monitored without problems.

After having examined, in the previous chapter, the multimonitor multimedial console and having concretely checked with experiments on real images the potentialities of the proposed system the possible use scenarios will be now outlined.

Three scenarios for using the offside detection system result: Manual, Semi-automatic and Automatic.

Each scenario characterizes for the configuration type of the multimedial console (base or advanced) and for the way in which, in case of using the advanced configuration, the information made available by the algorithms for processing the images are received by the fifth man.

Manual Mode: FG/MAN

In the manual operating mode the detection system captures the video sequences and makes them usable by the operator through the multimonitor multimedial console in base configuration.

The video sequences acquired by the cameras can be seen simultaneously in real time on the monitors of the multimedial console. While the systems records, the operator through the multimonitor multimedial console can display without any constraint the synchronized video sequences already acquired by one or more cameras for the objective crosscheck of the event and the evaluation thereof. The operator will exploit the specific control window and the devices of joggle type to select the sequences, to move easily between the sequence flames and in case to overlap, onto the selected video images, graphic-pictorial information for a better readability of the event to be examined.

For example, in correspondence of the players he could overlap bars parallel to the one-sided line to have qualitative and quantitative information related to the perspective and position of some players.

In the manual operating mode it is up to the operator to make the global evaluation of the event based upon the video sequences offered by the multimedial console.

The system performs automatically only the synchronized recording of the video sequences acquired with the cameras configured on the offside.

Semi-Automatic Mode: FG/SEM

In the semi-automatic operating mode the system comprises the same digital and recording components of the manual mode, but it utilizes the multimedial console in advanced configuration, that is with the addition of calculation devices and software specialized for processing in real time image sequences.

The specialistic calculation devices have been described previously. The software comprises all modules for the automatic detection of the ball, the automatic detection of the elementary events for the offside identification, the detection and classification of the errors. With the FG/SEM system the operator always analyses the video scenes and evaluates the event as for the FG/MAN system, but in this operating mode he is helped by the "Intelligent" software components. The FG/SEM system in real time extracts automatically from the video sequences a wealth of graphic-pictorial information, which can be seen through the operator console to evaluate the event in a more effective and prompt way.

The operator can use the wealth of the multimedial console in advanced configuration to examine the event in qualitative or quantitative way having information about the dynamics of the ball and of the players involved in the event.

The FG/SEM system operates continuously by underlining the offside potential events to the operator, thereto the final decision about the event evaluation will be remitted.

Automatic Mode: FG/AUT

This operating mode requires the same hardware and software components of the FG/SEM system.

In this operating mode the system will determine automatically, and in real time, if offside conditions generate from the dynamics of the event in the field.

In such operating mode the determination and the evaluation of the offside event is entrusted to the FG/AUT system. Whereas the first two operating modes can be used immediately by the fifth man and they have no impact on the course of the playing actions, in the automatic operating mode the FG/AUT system could signal in real time, to the referee and the linesmen, some information about the playing events.

The final decision would always remain to the referee and the linesmen based upon what they have perceived and based upon the information provided by the system.

Whereas the FG/MAN and FG/SEM systems can be used immediately by the fifth man since they do not generate any impact on the course of the match, apart from a crosscheck of the event by the fifth man when required, in case of the system in the FG/AUT automatic mode one will have to evaluate concretely how making usable the information detected automatically by the system without altering the usual course of the match.

The present invention has been so far described according to preferred embodiments thereof, illustrated by way of example and not for limitative purpose. It is to be meant that other embodiments can be provided, all belonging to the protective scope of the same, as defined by the enclosed claims.

The invention claimed is:

1. Method for detecting and classifying an event occurred during motion actions of one or more subjects in an area, the occurrence or not of said event depending upon predetermined rules related to said motion and to mutual positions of said subjects in a predetermined time instant, the method comprising: acquiring a plurality of digital images in sequence of said area during the progress of said actions; extracting a reference image by identifying static points in said images based on average and variance values for each dot in said images and by scrolling a time window in multiple iterations and storing the average and variance values related to statistical points of the whole time window over each iteration; processing each image of said plurality of images for extracting first features apt to identify each one of said subjects and second features apt to determine an instantaneous position of each one of said subjects within said area; classifying said subjects based upon said first and/or second features; and evaluating the occurrence of said event, by verifying said predetermined rules based upon said first and second features and upon the result of said classification.

2. Method according to claim 1, wherein said step of processing each image comprises a step of recognizing each one of said subjects inside said image.

3. Method according to claim 2, wherein recognizing said subjects comprises a sub-phase of removing the noise, based upon an analysis procedure of point connectivity, in order to extract said first features to detect a first category of subjects and a second category of subjects, by discriminating them based upon respective sizes.

4. Method according to claim 3, wherein said phase of recognizing said subjects comprises the sub-phases of: extracting a candidate region of said digital images to contain said subjects; verifying the presence of said subjects in said candidate region; calculating one or more parameters identifying the dynamics of said subjects, parameters to be utilized for recognizing the same subjects during the processing of a subsequent image.

5. Method according to claim 4, wherein said phase of recognizing said subjects comprises an additional sub-phase of constructing said reference image.

6. Method according to claim 5, wherein said phase of recognizing said subjects comprises an additional sub-phase of comparing the current image to the reference image, in order to detect said subjects.

7. Method according to claim 5, wherein said sub-phase of constructing a reference image is repeated in time, so as to use always a current reference image.

8. Method according to claim 5, wherein said phase of recognizing said subjects comprises an additional shadow removal sub-phase.

9. Method according to claim 8, wherein said shadow removal sub-phase is performed by comparing a texture content of a sub-region of the image under examination with a texture content of the reference image, and labeling the sub-region as shadow if the texture contents are similar.

10. Method according to claim 4, wherein said calculating one or more parameters identifying the dynamics of said subject is based upon a procedure or predictive type.

11. Method according to claim 4, wherein said sub-phase of extracting a candidate region to contain a first subject belonging to the first category of subjects, comprises a step of extraction of the contours of the subjects existing in the image, by obtaining a bordered image.

12. Method according to claim 11, wherein said sub-phase of extracting a candidate region comprises a step of constructing a correlation map by means of a bordered image convolution operation with a filter apt to characterize spatially said first subject.

13. Method according to claim 12, wherein said filter is constituted by a bidimensional convolution mask bearing dimensional and spatial information of said first subject.

14. Method according to claim 13, wherein said sub-phase of verifying the presence of said first subject in said candidate region comprises a step of calculating one or more characteristic parameters of a texture of said object.

15. Method according to claim 14, wherein said calculation is performed by means of a transform operation of Wavelet type.

16. Method according to claim 15, wherein said transformation operation is based upon a Haar transform.

17. Method according to claim 14, wherein said sub-phase of verifying said first subject in said candidate region comprises a classification step based upon said characteristic parameters.

18. Method according to claim 17, wherein said classification is performed by means of one or more artificial neural networks.

19. Method according to claim 18, wherein said neural networks are pre-trained by means of algorithms of "back propagation" type.

20. Method according to claim 4, wherein said sub-phase of extracting a candidate region to contain a second subject belonging to the second category of subjects, comprises a step of analyzing the intensity levels of each image dot.

21. Method according to claim 20, wherein said step of analyzing the intensity level of each image dot is performed on grey-level images, acquired by means of sensors under the form of Bayer grids.

22. Method according to claim 20, wherein said step of analyzing the intensity levels of each image dot is performed on color images, operating on RGB bands.

23. Method according to claim 20, wherein said step of analyzing the intensity levels of each image dot is performed on color images, operating on HIS bands.

24. Method according to claim 20, wherein said step of verifying the presence of said second subject in said candidate region is based upon a procedure for extracting statistical information related to said second object.

25. Method according to claim 24, wherein said statistical information comprises an average and a standard deviation calculated for each line of the image related to said candidate region.

26. Method according to claim 25, wherein said step of calculating the average and the standard deviation is performed for each band of RGB color.

27. Method according to claim 25, wherein said step of calculating the average and standard deviation is performed for each HIS band.

28. Method according to claim 24, wherein said sub-phase of verifying the presence of said second subject in said candidate region comprises a classification step based upon said statistical information.

29. Method according to claim 28, wherein said step of classifying the objects utilizes a not supervised classifier (SOM).

30. Method according to claim 28, wherein said step of classifying the objects utilizes a not supervised clustering algorithm (k-means).

31. Method according to claim 29, wherein said classifier is trained by means of normalized examples with respect to said statistical information.

32. System for the detection and the classification of an offside event occurred during motion actions in a football game of one of more subjects in an area, the occurrence or not of said event depending upon predetermined rules related to said motion and to mutual positions of said subjects in a predetermined time moment, the system comprising one or more units for acquiring digital images of said area during the course of said actions, wherein each one of said units comprises: means for extracting a reference image by identifying static points in said images based on average and variance values for each dot in said images and by scrolling a time window in multiple iterations and storing the average and variance values related to statistical points of the whole time window over each iteration; means for processing each image of said plurality of images for extracting first features apt to identify each one of said subjects and second features apt to determine an instantaneous position of each one of said subjects within said area; and means for classifying said subjects as player team one, player team two, referee and linesman based upon said first and/or second features; the system further comprising a supervision unit to evaluate the occurrence of said event, by verifying said predetermined rules based upon said first and second features and upon the result of said classification.

33. System according to claim 32, wherein each one of said acquisition units comprises a high resolution camera.

34. System according to claim 33, wherein said camera operates with a resolution of 1920×1080, according to a CAMERALINK® reading standard.

35. System according to claim 32, further comprising one or more units for storing in real time the acquired images.

36. System according to claim 32, further comprising means for connecting said acquiring units to said supervision unit.

37. System according to claim 32, wherein said supervision unit further comprises interface means for the display and/or analysis of the results.

* * * * *